US008884852B2

(12) United States Patent
Yamamoto et al.

(10) Patent No.: US 8,884,852 B2

(45) Date of Patent: Nov. 11, 2014

(54) DISPLAY DEVICE HAVING A PIXEL THAT SYNTHESIZES SIGNAL VALUES TO INCREASE A NUMBER OF POSSIBLE DISPLAY GRADATIONS AND DISPLAY METHOD

(75) Inventors: Tetsuro Yamamoto, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 659 days.

(21) Appl. No.: 12/662,175

(22) Filed: Apr. 5, 2010

(65) Prior Publication Data

US 2010/0289830 A1 Nov. 18, 2010

(30) Foreign Application Priority Data

May 12, 2009 (JP) ................................. 2009-115197

(51) Int. Cl.

| | |
|---|---|
| ***G09G 3/30*** | (2006.01) |
| ***G09G 5/00*** | (2006.01) |
| ***G06F 3/038*** | (2013.01) |
| ***G09G 5/10*** | (2006.01) |
| ***G09G 3/32*** | (2006.01) |

(52) U.S. Cl.

CPC ...... *G09G 3/3241* (2013.01); *G09G 2300/0852* (2013.01); *G09G 2300/0819* (2013.01); *G09G 2310/0251* (2013.01); *G09G 2310/0262* (2013.01); *G09G 2300/0866* (2013.01); *G09G 2300/0814* (2013.01); *G09G 3/3233* (2013.01)

USPC ................ 345/78; 345/77; 345/211; 345/690

(58) Field of Classification Search

USPC ...................................................... 345/76–89

See application file for complete search history.

(56) References Cited

U.S. PATENT DOCUMENTS

| | | | | |
|---|---|---|---|---|
| 6,104,365 | A * | 8/2000 | Towler et al. | 345/89 |
| 2003/0034947 | A1* | 2/2003 | Tanaka et al. | 345/89 |
| 2004/0046164 | A1 | 3/2004 | Kobayashi et al. | |
| 2005/0206590 | A1 | 9/2005 | Sasaki et al. | |
| 2008/0030443 | A1* | 2/2008 | Yamashita et al. | 345/84 |
| 2008/0224964 | A1* | 9/2008 | Tanikame et al. | 345/76 |
| 2008/0297449 | A1* | 12/2008 | Yamashita et al. | 345/76 |
| 2009/0201231 | A1* | 8/2009 | Takahara et al. | 345/76 |
| 2009/0251496 | A1* | 10/2009 | Saito et al. | 345/690 |
| 2009/0284515 | A1* | 11/2009 | Tsuge | 345/76 |

FOREIGN PATENT DOCUMENTS

| | | |
|---|---|---|
| JP | 2003-150116 A | 5/2003 |
| JP | 2003-255856 | 9/2003 |

(Continued)

OTHER PUBLICATIONS

Japanese Office Action issued Nov. 27, 2012 for corresponding Japanese Application No. 2009-115197.

*Primary Examiner* — Ryan A Lubit

(74) *Attorney, Agent, or Firm* — Rader, Fishman & Grauer PLLC

(57) ABSTRACT

Disclosed herein is a display device including: a pixel circuit for generating a signal value for display by synthesizing signal values input within one horizontal period, and making display at a gradation corresponding to the signal value for display; a signal line disposed in a form of a column on a pixel array where the pixel circuit is arranged in a form of a matrix; a scanning line disposed in a form of a row on the pixel array; a signal line driving section configured to output signal values as a signal value to be supplied to each pixel circuit to the signal line within one horizontal period; and a scanning line driving section configured to sequentially introduce the signal values within one horizontal period, the signal values being generated in the signal line, into the pixel circuit in each row by driving the scanning line.

16 Claims, 35 Drawing Sheets

(56) References Cited

FOREIGN PATENT DOCUMENTS

| | | | |
|---|---|---|---|
| JP | 2003-271095 | A | 9/2003 |
| JP | 2005-157347 | A | 6/2005 |
| JP | 2006-154521 | A | 6/2006 |
| JP | 2006-208744 | A | 8/2006 |
| JP | 2006-208745 | A | 8/2006 |
| JP | 2006-208746 | A | 8/2006 |
| JP | 2007-286453 | A | 11/2007 |
| JP | 2008-191682 | A | 8/2008 |

* cited by examiner

DISPLAY DEVICE HAVING A PIXEL THAT SYNTHESIZES SIGNAL VALUES TO INCREASE A NUMBER OF POSSIBLE DISPLAY GRADATIONS AND DISPLAY METHOD

BACKGROUND OF THE INVENTION

1. Field of the Invention

The present invention relates to a display device having a pixel array in which pixel circuits using an organic electroluminescence element (organic EL element) or a liquid crystal element are arranged in the form of a matrix, and a display method.

2. Description of the Related Art

An active matrix type display device using for example an organic electroluminescence (EL) light emitting element in pixels is known. This display device controls a current flowing through the light emitting element inside each pixel circuit by an active element (typically a thin film transistor: TFT) provided inside the pixel circuit. That is, because the organic EL element is a current light emitting element, an amount of current flowing through the EL element is controlled to obtain a coloring gradation.

[Patent Document 1]

Japanese Patent Laid-Open No. 2003-255856

[Patent Document 2]

Japanese Patent Laid-Open No. 2003-271095

FIG. 35 shows an example of an existing pixel circuit using an organic EL element.

Incidentally, though only one pixel circuit is shown in FIG. 35, an actual display device has pixel circuits as shown in the figure arranged in the form of an m×n matrix, and each pixel circuit is selected and driven by a horizontal selector 101 and a write scanner 102.

This pixel circuit has a sampling transistor Ts formed by an n-channel TFT, a storage capacitor Cs, a driving transistor Td formed by a p-channel TFT, and an organic EL element 1. The pixel circuit is disposed at a part of intersection of a signal line DTL and a writing control line WSL. The signal line DTL is connected to one end of the sampling transistor Ts. The writing control line WSL is connected to the gate of the sampling transistor Ts.

The driving transistor Td and the organic EL element 1 are connected in series with each other between a power supply potential Vcc and a ground potential. The sampling transistor Ts and the storage capacitor Cs are connected to the gate of the driving transistor Td. The gate-to-source voltage of the driving transistor Td is denoted by Vgs.

In this pixel circuit, when the writing control line WSL is set in a selected state, and a signal value corresponding to a luminance signal is applied to the signal line DTL, the sampling transistor Ts conducts to write the signal value to the storage capacitor Cs. The potential of the signal value written to the storage capacitor Cs becomes the gate potential of the driving transistor Td.

When the writing control line WSL is set in a non-selected state, the signal line DTL and the driving transistor Td are electrically disconnected from each other. However, the gate potential of the driving transistor Td is retained stably by the storage capacitor Cs. Then a driving current Ids flows through the driving transistor Td and the organic EL element 1 in a direction from the power supply potential Vcc to the ground potential.

The current Ids at this time is a value corresponding to the gate-to-source voltage Vgs of the driving transistor Td. The organic EL element 1 emits light at a luminance corresponding to the value of the current.

That is, in the case of this pixel circuit, the voltage applied to the gate of the driving transistor Td is changed by writing the potential of the signal value from the signal line DTL to the storage capacitor Cs. The value of the current flowing through the organic EL element 1 is thereby controlled to obtain a coloring gradation.

The source of the driving transistor Td formed by a p-channel TFT is connected to a power supply Vcc, and the driving transistor Td is designed to operate in a saturation region at all times. The driving transistor Td is therefore a constant-current source having a value shown in the following (Equation 1).

$$Ids = \frac{1}{2}\mu\frac{W}{L}Cox(Vgs - Vth)^2 \qquad \text{[Equation 1]}$$

where Ids denotes the current flowing between the drain and source of the transistor operating in the saturation region, μ denotes mobility, W denotes a channel width, L denotes a channel length, Cox denotes a gate capacitance, and Vth denotes the threshold voltage of the driving transistor Td.

As is clear from this (Equation 1), the drain current Ids of the transistor in the saturation region is controlled by the gate-to-source voltage Vgs. Because the gate-to-source voltage Vgs of the driving transistor Td is retained at a constant level, the driving transistor Td operates as a constant-current source to be able to make the organic EL element 1 emit light at a constant luminance.

SUMMARY OF THE INVENTION

The voltage (signal value) input to the gate of the driving transistor Td in this case is a voltage corresponding to a gradation. In general, a large number of gradations correspondingly enhances color reproducibility. However, a large number of gradations means a correspondingly large size of a signal driver of the horizontal selector 101, which is disadvantageous in terms of cost reduction.

Further, the voltage of one gradation is determined by a difference between a voltage at the time of white display and a voltage at the time of black display (a maximum signal value voltage and a minimum signal value voltage) and the number of gradations. When the number of gradations is increased without changing the voltage at the time of white display and the voltage at the time of black display, the voltage of one gradation is reduced, and variations such as deviation or the like of the signal driver appear as stripes in a picture.

It suffices to set the difference between the maximum signal value voltage and the minimum signal value voltage large as a measure against the problem. However, the power consumption of the signal driver is correspondingly increased, which is disadvantageous in terms of cost reduction.

In view of such points, the present invention is to enable display representing many gradations beyond the number of gradations that can be output as signal values by a horizontal selector (the number of steps of signal values). That is, it is desirable to be able to achieve display of more gradations without changing the voltage resolution (gradations) of the signal driver of a horizontal selector or a range between a maximum signal value voltage and a minimum signal value voltage.

According to an embodiment of the present invention, there is provided a display device including: a pixel circuit for generating a signal value for display by synthesizing a plurality of signal values input within one horizontal period, and making display at a gradation corresponding to the signal value for display; a signal line disposed in a form of a column on a pixel array where the pixel circuit is arranged in a form of a matrix; a scanning line disposed in a form of a row on the pixel array; a signal line driving section configured to output a plurality of signal values as a signal value to be supplied to each pixel circuit to the signal line within one horizontal period; and a scanning line driving section configured to sequentially introduce the plurality of signal values within one horizontal period, the plurality of signal values being generated in the signal line, into the pixel circuit in each row by driving the scanning line.

For example, the signal line driving section outputs at least a first signal value and a second signal value to the signal line within one horizontal period, and the pixel circuit generates the signal value for display by synthesizing the first signal value and the second signal value input within one horizontal period on a basis of a difference between the first signal value and the second signal value and a ratio between capacitances present within the pixel circuit.

In addition, the pixel circuit includes: a light emitting element; a driving transistor for applying a current corresponding to the signal value for display, the signal value for display being input to the driving transistor, to the light emitting element; a capacitance having one end as a point of input of the signal value for display to a gate node of the driving transistor; a first switch element connected between the one end of the capacitance and the signal line, and conduction-controlled by a potential of a first scanning line; and a second switch element connected between another end of the capacitance and the signal line, and conduction-controlled by a potential of a second scanning line. When the first signal value is output to the signal line, the scanning line driving section makes the first switch element and the second switch element conduct to input the first signal value to both ends of the capacitance, and when the second signal value is output to the signal line, the scanning line driving section makes only the second switch element conduct to input the second signal value to the other end of the capacitance, whereby the signal value for display resulting from synthesis of the first signal value and the second signal value is obtained at the input point.

In addition, the pixel circuit includes: a light emitting element; a driving transistor for applying a current corresponding to the signal value for display, the signal value for display being input to the driving transistor, to the light emitting element; a first switch element having one end connected to the signal line, and conduction-controlled by a potential of a first scanning line; a first capacitance; a second capacitance having one end as a point of input of the signal value for display to a gate node of the driving transistor; and a second switch element having one end and another end each connected between one end of the first capacitance and the one end of the second capacitance, one of the one end and the other end of the second switch element being connected to another end of the first switch element, and the second switch element being conduction-controlled by a potential of a second scanning line. When the first signal value is output to the signal line, the scanning line driving section makes the first switch element and the second switch element conduct to input the first signal value to the one end of the first capacitance and the one end of the second capacitance, when the second signal value is next output to the signal line, the scanning line driving section makes only the first switch element conduct to input the second signal value to one of the one end of the first capacitance and the one end of the second capacitance, and then the scanning line driving section makes only the second switch element conduct to connect the one end of the first capacitance and the one end of the second capacitance to each other, whereby the signal value for display resulting from synthesis of the first signal value and the second signal value is obtained at the input point.

In addition, the pixel circuit includes: a liquid crystal element; a capacitance having one end as a point of input of the signal value for display to the liquid crystal element; a first switch element connected between the one end of the capacitance and the signal line, and conduction-controlled by a potential of a first scanning line; and a second switch element connected between another end of the capacitance and the signal line, and conduction-controlled by a potential of a second scanning line. When the first signal value is output to the signal line, the scanning line driving section makes the first switch element and the second switch element conduct to input the first signal value to both ends of the capacitance, and when the second signal value is output to the signal line, the scanning line driving section makes only the second switch element conduct to input the second signal value to the other end of the capacitance, whereby the signal value for display resulting from synthesis of the first signal value and the second signal value is obtained at the input point.

In addition, the pixel circuit includes: a liquid crystal element; a first switch element having one end connected to the signal line, and conduction-controlled by a potential of a first scanning line; a first capacitance; a second capacitance having one end as a point of input of the signal value for display to the liquid crystal element; and a second switch element having one end and another end each connected between one end of the first capacitance and the one end of the second capacitance, the second switch element being conduction-controlled by a potential of a second scanning line. When the first signal value is output to the signal line, the scanning line driving section makes the first switch element and the second switch element conduct to input the first signal value to the one end of the first capacitance and the one end of the second capacitance, when the second signal value is next output to the signal line, the scanning line driving section makes only the first switch element conduct to input the second signal value to one of the one end of the first capacitance and the one end of the second capacitance, and then the scanning line driving section makes only the second switch element conduct to connect the one end of the first capacitance and the one end of the second capacitance to each other, whereby the signal value for display resulting from synthesis of the first signal value and the second signal value is obtained at the input point.

A display method according to an embodiment of the present invention is a display method of a display device, the display device including a pixel circuit, a signal line disposed in a form of a column on a pixel array where the pixel circuit is arranged in a form of a matrix, a scanning line disposed in a form of a row on the pixel array, a signal line driving section configured to output a signal value to be supplied to each pixel circuit to the signal line, and a scanning line driving section configured to introduce the signal value generated in the signal line into the pixel circuit in each row by driving the scanning line. The signal line driving section outputs a plurality of signal values as the signal value to be input to the pixel circuit to the signal line within one horizontal period, the scanning line driving section sequentially introduces each of the plurality of signal values output to the signal line within one horizontal period into the pixel circuit, and the pixel circuit generates a signal value for display by synthesizing the plurality of signal values introduced sequentially, and makes display at a gradation corresponding to the signal value for display.

In the present invention, a plurality of signal values, for example a first signal value and a second signal value are supplied to a pixel circuit within one horizontal period. The pixel circuit then synthesizes the plurality of signal values using a capacitance. For example, the first signal value and the second signal value are synthesized on the basis of a difference between the first signal value and the second signal value and a ratio between capacitances present within the pixel circuit, thereby generating a signal value for display. Then display is made at a gradation corresponding to the signal value for display. Thus, signal values for display of more gradations than the number of gradations that can be represented by signal values can be created by combinations of a plurality of signal values, and display at a large number of gradations beyond the resolution of the signal values can be achieved.

According to an embodiment of the present invention, a signal value for display reflecting a gradation is created within a pixel circuit using a plurality of input signal values, and therefore many gradations can be represented with a small number of signal gradations. It is thereby possible to display images at a larger number of gradations without enhancing the performance of a device configuration (signal line driving section) or extending a range of signal value voltages, for example, and thus achieve high color reproducibility at low cost.

DETAILED DESCRIPTION OF PREFERRED EMBODIMENTS

Preferred embodiments of the present invention will hereinafter be described in the following order.

[1. Configuration of Organic EL Display Device]
[2. Pixel Circuit and Operation]
<2-1 First Embodiment>
<2-2 Second Embodiment>
<2-3 Third Embodiment>
<2-4 Fourth Embodiment>
<2-5 Fifth Embodiment>
<2-6 Sixth Embodiment>
<2-7 Seventh Embodiment>
<2-8 Eighth Embodiment>
<2-9 Ninth Embodiment>
<2-10 Tenth Embodiment>
<2-11 Eleventh Embodiment>
<2-12 Twelfth Embodiment>
[3. Example of Application to Liquid Crystal Display Device]
<3-1 Thirteenth Embodiment>
<3-2 Fourteenth Embodiment>
<3-3 Fifteenth Embodiment>
4. Examples of Modification

1. Configuration of Organic EL Display Device

Figure 1:
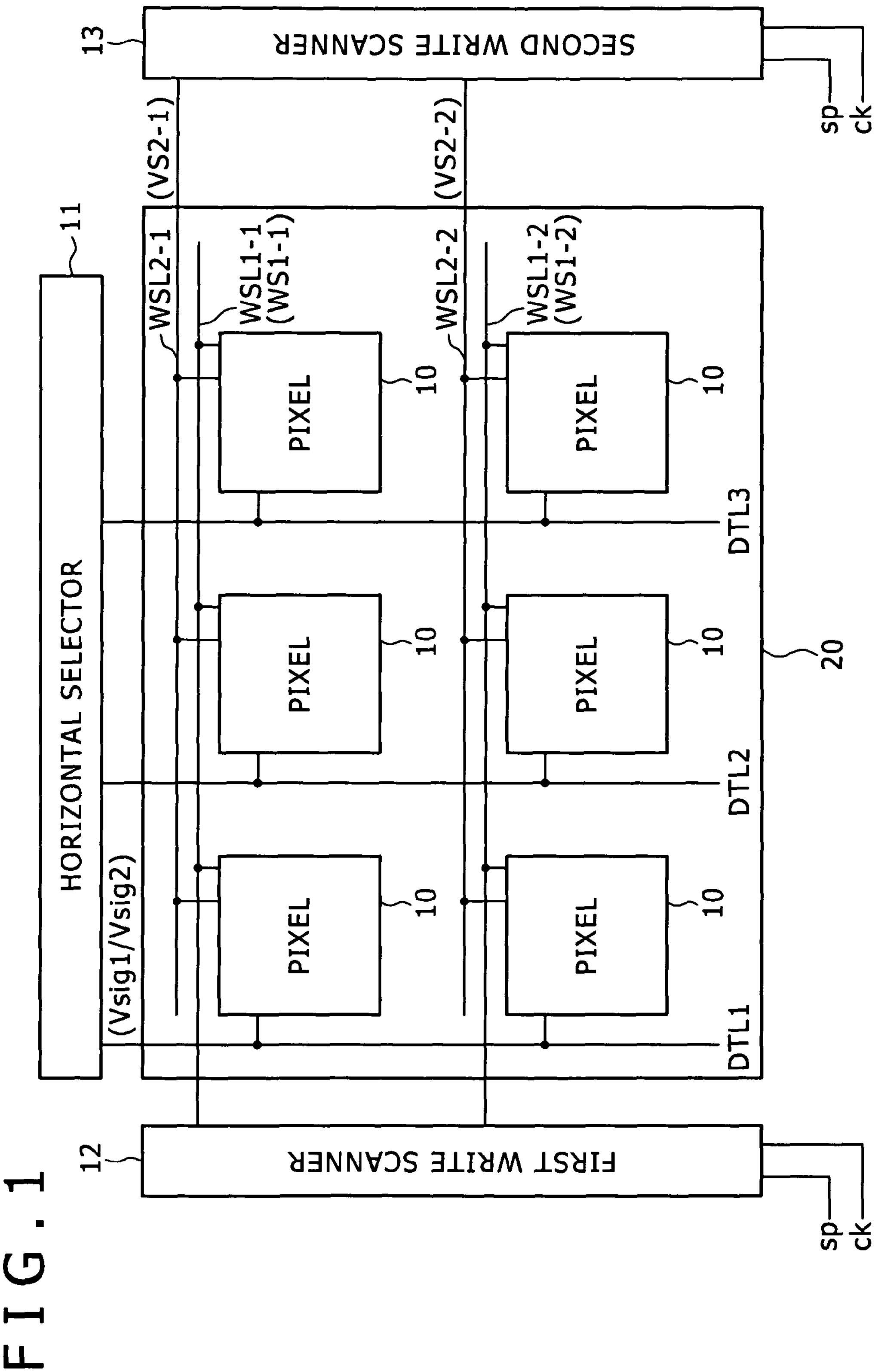
FIG. 1 is a block diagram of a display device according to an embodiment of the present invention.

Examples of an organic EL display device will be described as a first to a twelfth embodiment. A basic configuration of organic EL display devices according to these embodiments is shown in FIG. 1. Incidentally, some embodiments have a different general configuration from that of FIG. 1. The differences will be described as occasion demands.

This organic EL display device has an organic EL element as a light emitting element, and includes a pixel circuit 10 that performs light emission driving by an active matrix system.

As shown in FIG. 1, the organic EL display device has a pixel array 20 having a large number of pixel circuits 10 arranged therein in the form of a matrix in a column direction and a row direction (m rows×n columns). Incidentally, each of the pixel circuits 10 forms a light emitting pixel of one of R (red), G (green), and B (blue). The pixel circuits 10 of the respective colors are arranged by a predetermined rule to form a color display device.

The organic EL display device has a horizontal selector 11, a first write scanner 12, and a second write scanner 13 as a configuration for the light emission driving of each of the pixel circuits 10.

Signal lines DTL1, DTL2, . . . selected by the horizontal selector 11 and supplying a voltage corresponding to the signal value (gradation value) of a luminance signal as display data to the pixel circuits are arranged in the column direction on the pixel array. The signal lines DTL1, DTL2, . . . are arranged in an equal number to that of columns of the pixel circuits 10 arranged in the form of a matrix in the pixel array 20.

In addition, first writing control lines WSL1 (WSL1-1, WSL1-2, . . . ) and second writing control lines WSL2 (WSL2-1, WSL2-2, . . . ) are arranged in the row direction on the pixel array 20. The first writing control lines WSL1 and the second writing control lines WSL2 are each arranged in an equal number to that of rows of the pixel circuits 10 arranged in the form of a matrix in the pixel array 20.

The writing control lines WSL1 (WSL1-1, WSL1-2, . . . ) are driven by the first write scanner 12. The first write scanner 12 sequentially supplies scanning pulses WS1 (WS1-1, WS1-2, . . . ) to the respective writing control lines WSL1-1, WSL1-2, . . . arranged in the form of rows in set predetermined timing to perform line-sequential driving of the pixel circuits 10 in row units.

The writing control lines WSL2 (WSL2-1, WSL2-2, . . . ) are driven by the second write scanner 13. The second write scanner 13 sequentially supplies scanning pulses WS2 (WS2-1, WS2-2, . . . ) to the respective writing control lines WSL2-1, WSL2-2, . . . arranged in the form of rows in set predetermined timing to perform line-sequential driving of the pixel circuits 10 in row units.

Incidentally, the first write scanner 12 and the second write scanner 13 set the timing of the scanning pulses WS1 and WS2 on the basis of a clock ck and a start pulse sp.

The horizontal selector 11 supplies a signal value potential as an input signal for the pixel circuits 10 to the signal lines DTL1, DTL2, . . . arranged in the column direction in such a manner as to be synchronized with the line-sequential scanning of the first write scanner 12 and the second write scanner 13.

In this case, the horizontal selector 11 outputs signal values Vsig1 and Vsig2 in one horizontal period.

The horizontal selector 11 includes a signal driver for driving each of the signal lines DTL1, DTL2, . . . . The signal driver outputs voltage values obtained by dividing a range from a maximum voltage value to a minimum voltage value as signal values Vsig by the number of gradations. The maximum voltage value is a voltage value when a pixel circuit 10 is made to make a white display (display at a highest luminance). The minimum voltage value is a voltage value when a pixel circuit 10 is made to make a black display (display at a lowest luminance).

The number of gradations that can be output by the signal driver is set to be 64, 128, 256, or the like. The voltage range from the maximum voltage value to the minimum voltage value is designed to be a predetermined range.

Differences between the signal value voltages of the respective gradations are obtained by dividing the voltage range from the maximum voltage value to the minimum voltage value by the number of gradations.

In the past, the output gradations of the signal driver are used as display gradations as they are.

In order to increase the number of gradations and achieve high color reproducibility, it has been necessary to increase the number of output gradations by employing a high-performance signal driver. In addition, when the voltage difference of one gradation is decreased, an adverse effect of variations in the signal driver tends to be produced, and therefore it has been necessary to widen the voltage range from the maximum voltage value to the minimum voltage value.

The present embodiment achieves display of more gradations without increasing the number of output gradations of the signal driver or widening the voltage range.

For this, signal values Vsig1 and Vsig2 are output in one horizontal period without a change being made to x gradations (for example 256 gradations) of the signal driver for each signal line DTL of the horizontal selector. The signal values Vsig1 and Vsig2 are both the voltage value of one of the x gradations.

Then, the signal values Vsig1 and Vsig2 are synthesized on the pixel circuit 10 side. For example, a pixel circuit 10 synthesizes the signal values Vsig1 and Vsig2 by a difference between the signal values Vsig1 and Vsig2 input within one horizontal period and a ratio between capacitances present within the pixel circuit 10, and thereby generates a signal value for display. Then, a light emitting operation is performed according to the signal value for display.

That is, gradations equal in number to that of (x gradations×(x−1) gradations) can be displayed by combination of the two signal values Vsig1 and Vsig2. For example, when the number of output gradations of the signal driver is 64, 64×63=4032 gradations can be displayed.

Incidentally, the horizontal selector 11 in the present embodiment corresponds to a signal line driving section described in claims of the present invention.

The first write scanner 12, the second write scanner 13, and a drive scanner 14 and controlling scanners 20 to 25 and 30 to 35 in embodiments to be described later are each an element of a scanning line driving section described in claims.

The signal line DTL corresponds to a signal line described in claims.

The writing control lines WSL1 and WSL2, power supply control lines DSL and control lines L20 to L25 and L30 to L35 described in embodiments to be described later each correspond to a scanning line described in claims.

2. Pixel Circuit and Operation

2-1 First Embodiment

Each embodiment will be described in the following. Pixel circuits 10 in the first to sixth embodiments basically have the following constituent elements.

First, the pixel circuits 10 include an organic EL element 1 as a self-luminous element and a driving transistor Td for applying a current to the organic EL element 1 according to a signal value for display.

In addition, the pixel circuits 10 include at least one capacitance (for example a capacitance C2) having one end as a point of input of the signal value for display to a gate node of the driving transistor Td.

In addition, the pixel circuits 10 include a sampling transistor Ts1 as a first switch element connected between the one end of the capacitance C2 and a signal line DTL and conduction-controlled by a potential (scanning pulse WS1) of a first scanning line (writing control line WSL1).

In addition, the pixel circuits 10 have a sampling transistor Ts2 as a second switch element connected between another end of the capacitance C2 and the signal line DTL and conduction-controlled by a potential (scanning pulse WS2) of a second scanning line (writing control line WSL2).

When a signal value Vsig1 is output to the signal line DTL, the first write scanner 12 and the second write scanner 13 as a scanning line driving section make the sampling transistors Ts1 and Ts2 as the first switch element and the second switch element conduct. The signal value Vsig1 is thereby input to both ends of the capacitance C2. Further, when a signal value Vsig2 is output to the signal line DTL, the first write scanner 12 and the second write scanner 13 make only the sampling transistor Ts2 as the second switch element conduct, and thereby input the signal value Vsig2 to the other end of the capacitance C2. Thus, the signal value for display resulting from synthesis of the signal values Vsig1 and Vsig2 is obtained at the point of input to the gate node of the driving transistor Td.

The first embodiment will be described concretely with reference to FIG. 2 and FIG. 3.

Figure 2:
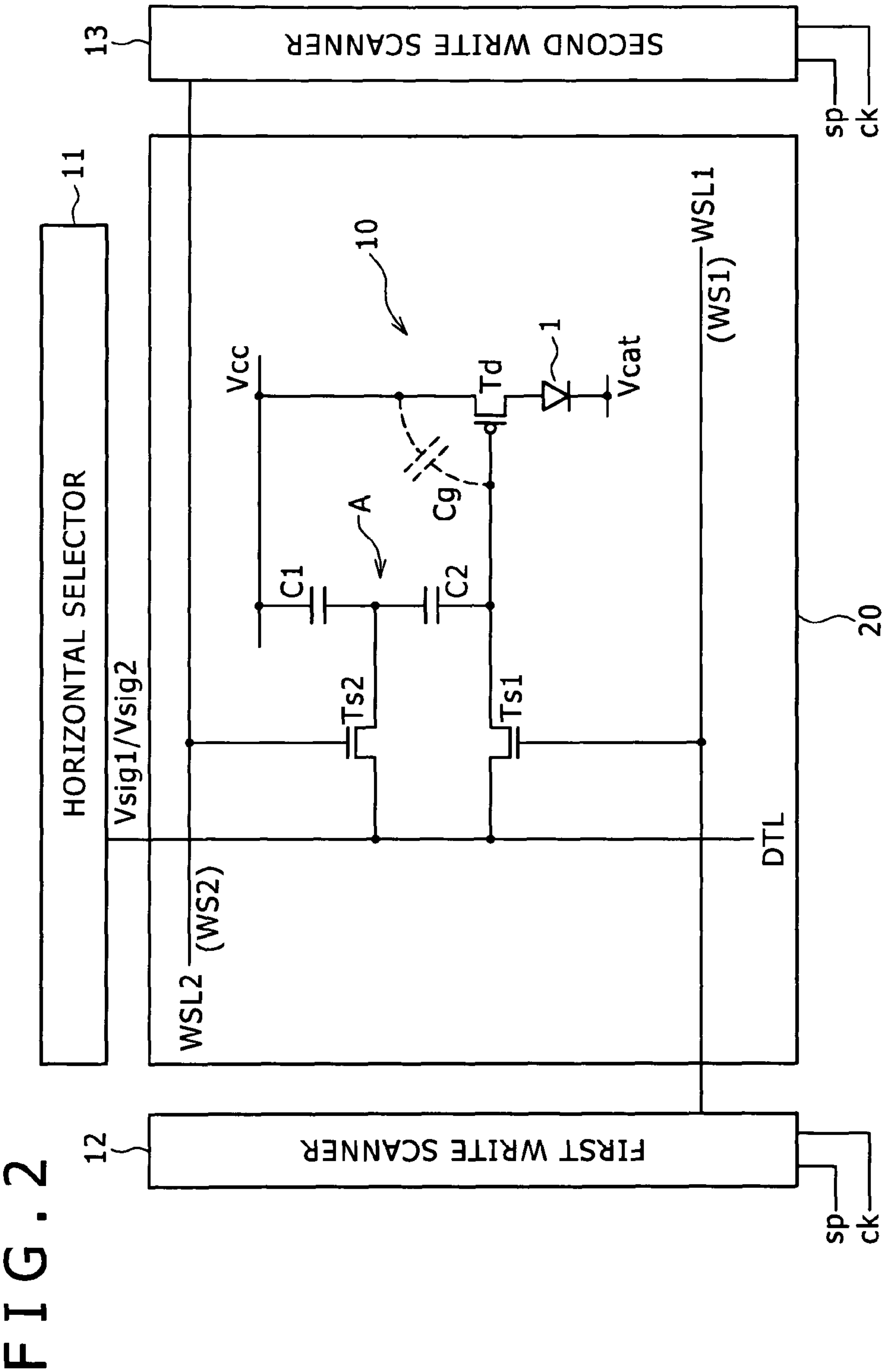
FIG. 2 is a circuit diagram of a pixel circuit according to a first embodiment.

FIG. 2 shows an example of configuration of a pixel circuit 10. This pixel circuit 10 is arranged in the form of a matrix as with the pixel circuits 10 in the configuration of FIG. 1. Incidentally, for simplicity, FIG. 2 shows only one pixel circuit 10 disposed at a part where a signal line DTL intersects writing control lines WSL1 and WSL2.

The pixel circuit 10 includes an organic EL element 1, two capacitances C1 and C2, sampling transistors Ts1 and Ts2, and a driving transistor Td. The sampling transistors Ts1 and Ts2 are an n-channel thin film transistor (TFT). The driving transistor Td is a p-channel TFT.

The light emitting element of the pixel circuit 10 is the organic EL element 1 of a diode structure, for example, and has an anode and a cathode. The cathode of the organic EL element 1 is connected to predetermined wiring (cathode potential Vcat).

The drain and source of the driving transistor Td are connected between the anode of the organic EL element 1 and a power Vcc line.

The capacitances C1 and C2 are connected in series with each other between the gate node of the driving transistor Td and the power Vcc line. A point of connection between the capacitances C1 and C2 is point A.

The series connection of the capacitances C1 and C2 forms a storage capacitor for a gate-to-source voltage Vgs.

The drain and source of the sampling transistor Ts1 are connected between the gate node of the driving transistor Td and the signal line DTL. The gate of the sampling transistor Ts1 is connected to the writing control line WSL1.

The drain and source of the sampling transistor Ts2 are connected between point A and the signal line DTL. The gate of the sampling transistor Ts2 is connected to the writing control line WSL2.

The light emission driving of the organic EL element 1 is as follows.

The source of the driving transistor Td formed by a p-channel TFT is connected to a power supply Vcc, and the driving transistor Td is designed to operate in a saturation region at all times. The driving transistor Td is therefore a constant-current source having a value shown in (Equation 1) described above.

A current flowing through the organic EL element 1 has a value corresponding to the gate-to-source voltage of the driving transistor Td. The organic EL element 1 emits light at a luminance corresponding to the current value. The voltage applied to the gate of the driving transistor Td is changed by writing a signal value for display to the gate node of the driving transistor Td, as will be described later. The value of the current flowing through the organic EL element 1 is thereby controlled to obtain a coloring gradation. That is, light is emitted at a gradation corresponding to the signal value for display.

The signal value for display is obtained by synthesizing the signal values Vsig1 and Vsig2 input from the signal line DTL within one horizontal period.

The operation will be described with reference to FIG. 3.

Figure 3:
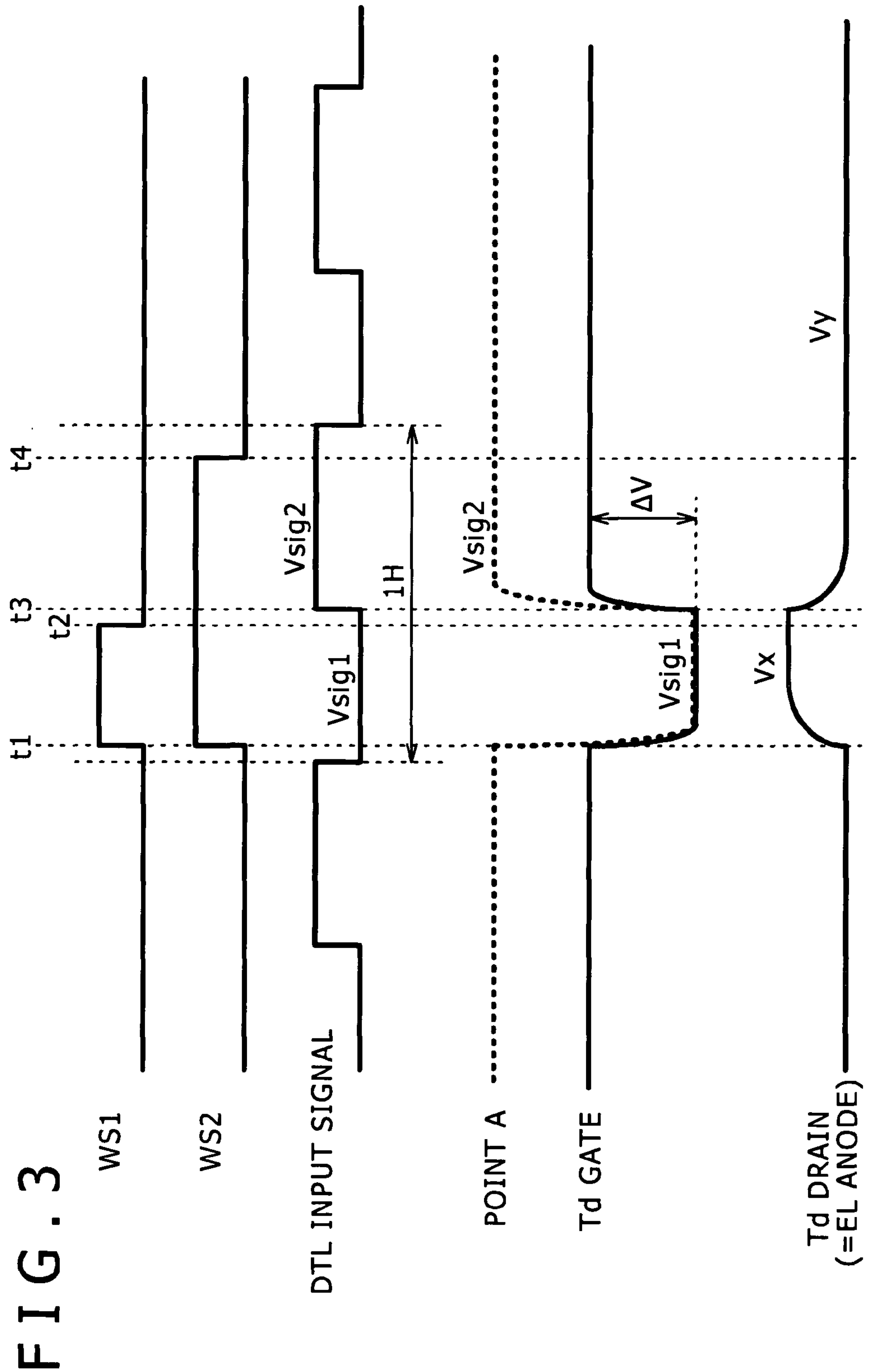
FIG. 3 is a diagram of assistance in explaining operating waveforms according to the first embodiment, a second embodiment, and a sixth embodiment.

FIG. 3 shows the scanning pulses WS1 and WS2 supplied to the writing control lines WSL1 and WSL2 by the first write scanner 12 and the second write scanner 13.

FIG. 3 also shows signal value voltage supplied to the signal line DTL by the horizontal selector 11 as a DTL input signal. As shown in FIG. 3, the horizontal selector 11 sequentially outputs the signal values Vsig1 and Vsig2 as signal values for one pixel to the signal line DTL within one horizontal period.

FIG. 3 also shows changes in gate voltage of the driving transistor Td and changes in drain voltage of the driving transistor Td (anode voltage of the organic EL element 1) by solid lines, and shows voltage changes at point A by a dotted line.

Light emission of a previous frame is performed until time t1. During the light emission, the scanning pulses WS1 and WS2 are both at an L-level, and thus the sampling transistors Ts1 and Ts2 are off. The driving transistor Td passes a current shown in the above-described (Equation 1) through the EL element according to a gate-to-source voltage Vgs.

An operation for light emission of a present frame is performed from time t1.

In a period in which the horizontal selector 11 supplies the potential of the signal value Vsig1 to the signal line DTL, the scanning pulses WS1 and WS2 are both set to an H-level to turn on the sampling transistors Ts1 and Ts2 at time t1.

The potential of the signal value Vsig1 is thereby written to the gate of the driving transistor Td. With the gate potential of the driving transistor Td becoming the signal value Vsig1, a change occurs in the value of the gate-to-source voltage Vgs, and the anode potential of the organic EL element 1 becomes a potential Vx, as shown in FIG. 3.

Incidentally, because the sampling transistor Ts2 is also on, the signal value Vsig1 is also written to point A. That is, both ends of the capacitance C2 have the signal value Vsig1.

Next, at time t2, the scanning pulse WS1 is set to an L-level to turn off only the sampling transistor Ts1, and the sampling transistor Ts2 is continued in the on state.

Incidentally, the sampling transistor Ts2 does not necessarily need to be continued in the on state. That is, the sampling transistors Ts1 and Ts2 may be simultaneously turned off at time t2, and only the sampling transistor Ts2 may be turned on after the potential of the signal line becomes the signal value Vsig2 at time t3.

In either case, only the sampling transistor Ts2 is turned on after the potential of the signal line becomes the signal value Vsig2 at time t3.

When the horizontal selector 11 outputs the signal value Vsig2 to the signal line DTL at time t3, because only the sampling transistor Ts2 is on, the signal value Vsig2 is written to point A, and the potential of point A changes from the signal value Vsig1 to the signal value Vsig2. Then, an amount of the variation is input to the gate of the driving transistor Td via the capacitance C2.

The amount of voltage change (ΔV) of the gate of the driving transistor Td at this time is a value expressed by the following (Equation 2).

$$\Delta V = \frac{C2}{C2 + Cg}(Vsig2 - Vsig1) \qquad \text{[Equation 2]}$$

where "Cg" is a total capacitance between the gate and a fixed potential excluding the capacitance C2, as a capacitance as seen from the gate of the driving transistor Td (indicated by a broken line in FIG. 2).

As is understood from (Equation 2), the amount of voltage change (ΔV) is composed of the capacitances C2 and Cg and a difference between the signal values Vsig1 and Vsig2. The gate-to-source potential of the driving transistor Td at this time is Vsig1+ΔV.

This operation changes the gate-to-source voltage Vgs again, so that the anode potential of the organic EL element 1 changes again to become a potential Vy after the passage of a certain time. Then, at time t4, the scanning pulse WS2 is set to an L-level to turn off the sampling transistor Ts2. Thereby signal writing is completed.

Thereafter, the driving transistor Td passes a current shown in the above-described (Equation 1) through the EL element according to the gate-to-source voltage Vgs=Vsig1+ΔV in this case, and the organic EL element 1 emits light at a gradation corresponding to Vsig1+ΔV.

Consideration will now be given to the gate potential of the driving transistor Td at the time of light emission of the organic EL element 1. As described above, the gate potential of the driving transistor Td at the time of light emission is Vsig1+ΔV, and Vsig1<Vsig1+ΔV<Vsig2.

That is, it can be said that the signal voltages Vsig1 and Vsig2 are synthesized to create a new signal value for display (Vsig1+ΔV) by driving within the pixel.

In other words, gradations can be increased without an increase in the number of outputs of the signal driver within the horizontal selector 11.

Figure 4:
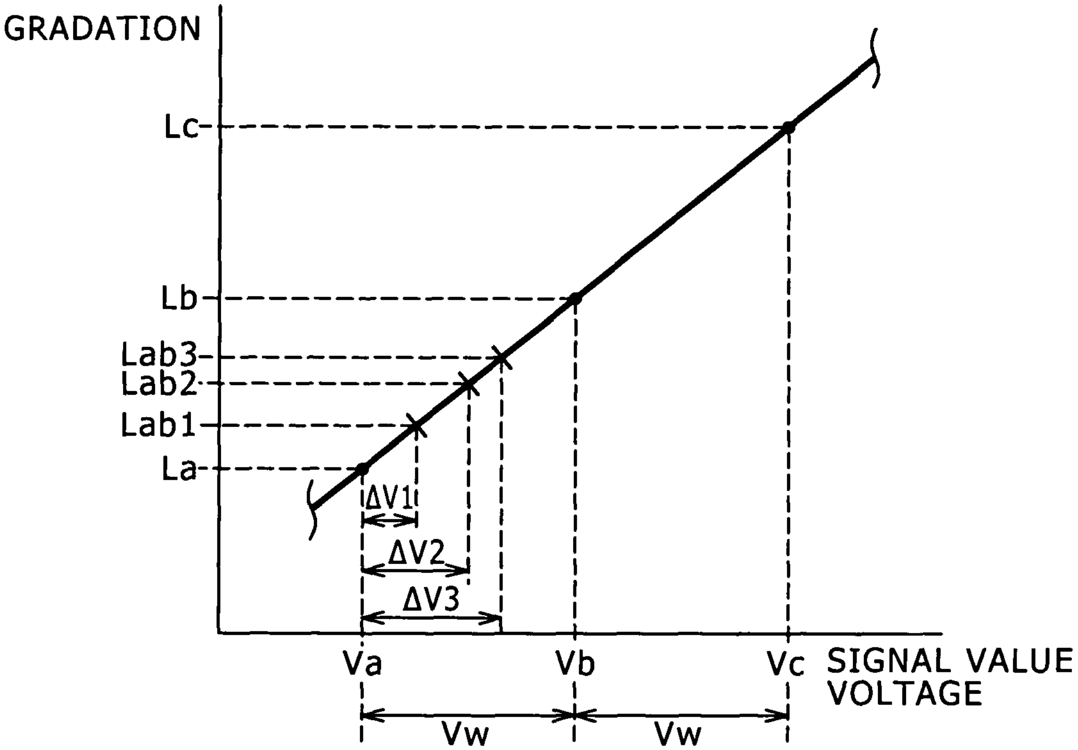
FIG. 4 is a diagram of assistance in explaining an increase in the number of gradations according to embodiments.

For example FIG. 4 shows relation between signal values and gradations (light emission luminance).

Suppose that the voltage width of one gradation output as a signal value is Vw. The horizontal selector 11 outputs voltage values Va, Vb, Vc, . . . set by the voltage width Vw as the signal values Vsig1 and Vsig2.

Supposing that a gradation is determined simply by a signal value itself, a gradation La is set when the signal value Vsig=Va, and a gradation Lb is set when the signal value Vsig=Vb, for example.

However, in the present example, the value of ΔV is determined by a combination of the values of the signal values Vsig2 and Vsig1. Thereby one gradation expressed as one step of a signal value can be subdivided into finer gradations. Controlling the value of ΔV to ΔV1, ΔV2, ΔV3 and the like by combinations of the values of the signal values Vsig2 and Vsig1 as illustrated in FIG. 4 enables gradation representations such as gradations Lab1, Lab2, Lab3 and the like obtained by subdividing an interval between the gradations La and Lb.

Thus, the display gradation representation of more gradations exceeding the number of output gradations of the signal driver of the horizontal selector 11 is made possible.

In addition, because the value of ΔV is determined by multiplying the difference between the signal values Vsig2 and Vsig1 by the ratio between the capacitances C2 and Cg, even when the voltage of one subdivided gradation is decreased, the voltage of one gradation can be expressed by the values of relatively large signal values Vsig2 and Vsig1.

Incidentally, there are cases where ΔV=0. There are for example cases where the gradations La, Lb and the like are desired to be displayed in the example of FIG. 4. In this case, it suffices to set the signal value Vsig1=Vsig2.

When light emission at the gradation La is performed, for example, it suffices for the horizontal selector 11 to set the signal value Vsig1=Vsig2=Va. The same is true for each embodiment to be described later.

As described above, the present example generates a signal voltage reflecting a gradation within a pixel using capacitive coupling. It is therefore possible to express many gradations with a small number of gradations of signal values, reduce the cost of the signal driver, and achieve high color reproducibility.

In addition, because the voltage of one gradation can be expressed by the values of relatively large signal values Vsig2 and Vsig1, a maximum signal voltage does not need to be heightened even when the number of gradations is increased, so that the cost of the signal driver can be reduced.

2-2 Second Embodiment

Figure 5:
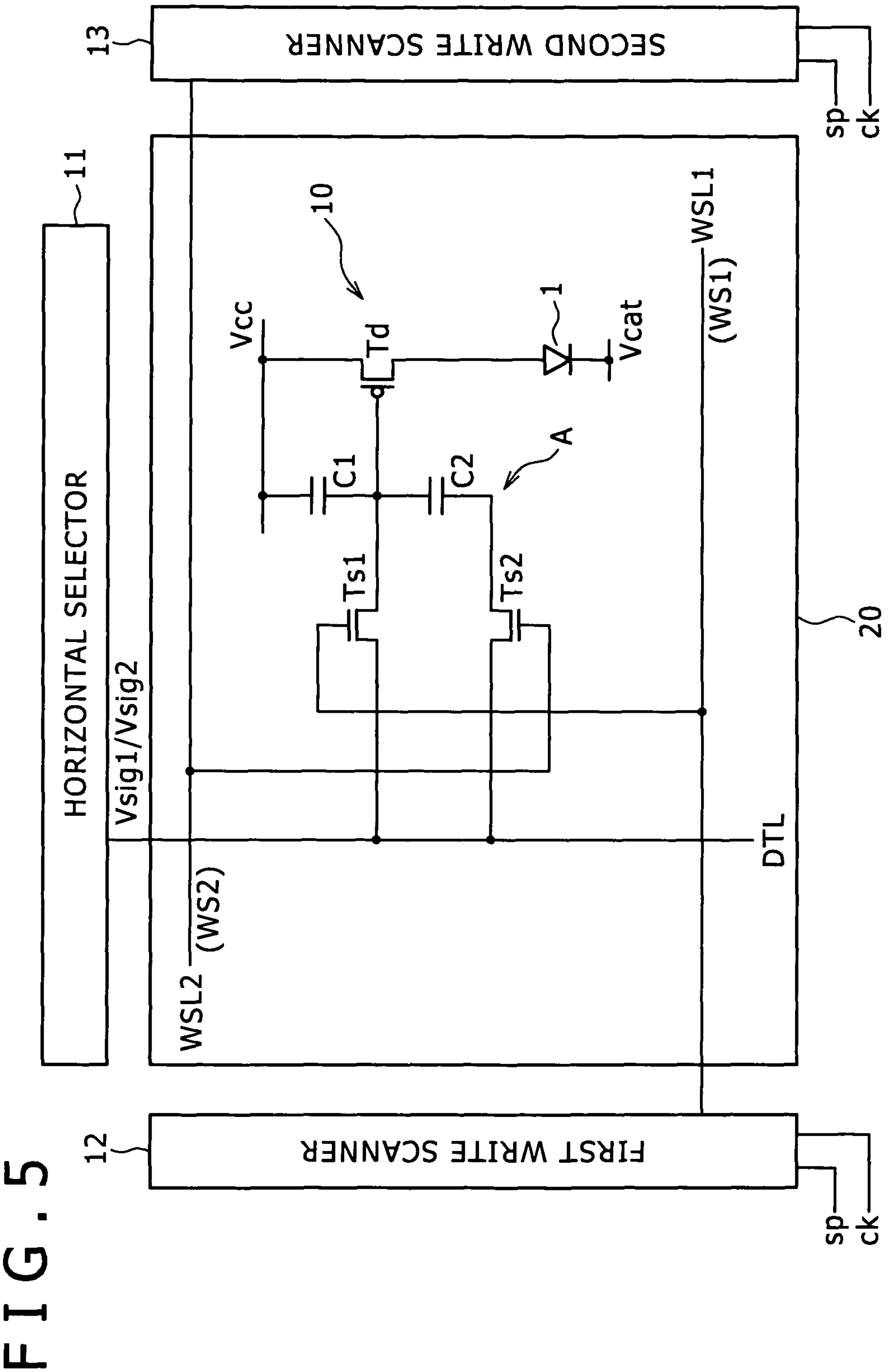
FIG. 5 is a circuit diagram of a pixel circuit according to the second embodiment.

A pixel circuit 10 according to a second embodiment is shown in FIG. 5.

In this case, one end of a capacitance C2 is connected to the gate node of a driving transistor Td, and another end of the capacitance C2 is connected to a sampling transistor Ts2.

A capacitance C1 has one end connected to the gate node of the driving transistor Td, and has another end connected to a power Vcc line.

That is, whereas a storage capacitor is formed by a series connection of the capacitances C1 and C2 in the foregoing first embodiment, the second embodiment is different in that a storage capacitor for a gate-to-source voltage Vgs is formed by the capacitance C1 alone.

The basic driving system of the pixel circuit 10 is the same as described above with reference to FIG. 3. Specifically, sampling transistors Ts1 and Ts2 are on for a period from time t1 to time t2. A signal value Vsig1 is thereby input to the gate of the driving transistor Td and point A in FIG. 5. That is, both ends of the capacitance C2 have the signal value Vsig1.

Thereafter, a first write scanner 12 turns off the sampling transistor Ts1 at time t2. A horizontal selector 11 changes the potential of a signal line from the signal value Vsig1 to a signal value Vsig2 at time t3.

Then, in a period from time t3 to time t4, only the sampling transistor Ts2 is on, and therefore the signal value Vsig2 is input to point A.

A voltage change at the point A is input to the gate of the driving transistor Td via the capacitance C2.

A gate voltage becomes Vsig1+ΔV.

An amount of change ΔV of the gate voltage in this case is expressed by the following (Equation 3).

$$\Delta V = \frac{C2}{C2 + Cg + C1}(Vsig2 - Vsig1) \quad \text{[Equation 3]}$$

"Cg" in this case is obtained by excluding the capacitances C1 and C2 from a capacitance between the gate of the driving transistor Td and a fixed potential.

Thereafter, the driving transistor Td passes a current shown in the above-described (Equation 1) through the EL element according to the gate-to-source voltage Vgs=Vsig1+ΔV in this case, and the organic EL element 1 emits light at a gradation corresponding to Vsig1+ΔV.

Effects similar to those of the first embodiment are obtained also in the present example.

In addition, the example of the second embodiment has an advantage of expressing a small voltage easily because the value of ΔV is determined by the capacitances C1, C2, and Cg as compared with the first embodiment. In addition, the example of the second embodiment has an advantage in that the gate potential of the driving transistor Td is not easily varied by leakage current of the sampling transistors Ts1 and Ts2.

2-3 Third Embodiment

A third embodiment will be described with reference to FIG. 6 and FIG. 7.

The third embodiment is an example of application of the present invention to a pixel circuit having a threshold value correcting function.

This pixel circuit 10 has switching transistors T20, T21, and T22 formed by an n-channel TFT and a capacitance C3 in addition to the configuration of FIG. 2 which configuration is formed by the organic EL element 1, the driving transistor Td, the sampling transistors Ts1 and Ts2, and the capacitances C1 and C2.

In addition, as a scanning line driving section, controlling scanners 20, 21, and 22 as well as a first write scanner 12 and a second write scanner 13 are provided.

The drain and source of the driving transistor Td formed by a p-channel TFT are connected between the anode of the organic EL element 1 and a power Vcc line via the switching transistor T22.

The capacitances C1 and C2 are connected in series with each other between the gate node of the driving transistor Td and the power Vcc line via the capacitance C3.

The drain and source of the sampling transistor Ts1 are connected between the capacitance C3 and a signal line DTL.

The drain and source of the sampling transistor Ts2 are connected between point A as a point of connection between the capacitances C1 and C2 and the signal line DTL.

The controlling scanner 20 supplies a controlling pulse P20 to a controlling line L20. The controlling scanner 21 supplies a controlling pulse P21 to a controlling line L21. The controlling scanner 22 supplies a controlling pulse P22 to a controlling line L22. Incidentally, as with the first writing control lines WSL1 and the second writing control lines WSL2 in FIG. 1, controlling lines L20, L21, and L22 are arranged in equal numbers to that of rows of pixel circuits 10 arranged in the form of a matrix in a pixel array 20.

The first write scanner 12 and the second write scanner 13 and the controlling scanners 20, 21, and 22 set the timing of scanning pulses WS1 and WS2 and the controlling pulses P20, P21, and P22 on the basis of a clock ck and a start pulse sp.

The drain and source of the switching transistor T20 are connected between a point of signal value input to the gate node of the driving transistor Td (point B), which point is one end of the capacitance C2, and a fixed reference potential Vofs. The gate of the switching transistor T20 is connected to the controlling line L20. Thus, the switching transistor T20 is conduction-controlled by the controlling pulse P20 from the controlling scanner 20.

The drain and source of the switching transistor T21 are connected between the gate and drain of the driving transistor Td. The gate of the switching transistor T21 is connected to the controlling line L21. Thus, the switching transistor T21 is conduction-controlled by the controlling pulse P21 from the controlling scanner 21.

The drain and source of the switching transistor T22 are connected between the driving transistor Td and the anode of the organic EL element 1. The gate of the switching transistor T22 is connected to the controlling line L22. Thus, the switching transistor T22 is conduction-controlled by the controlling pulse P22 from the controlling scanner 22.

Figure 7:
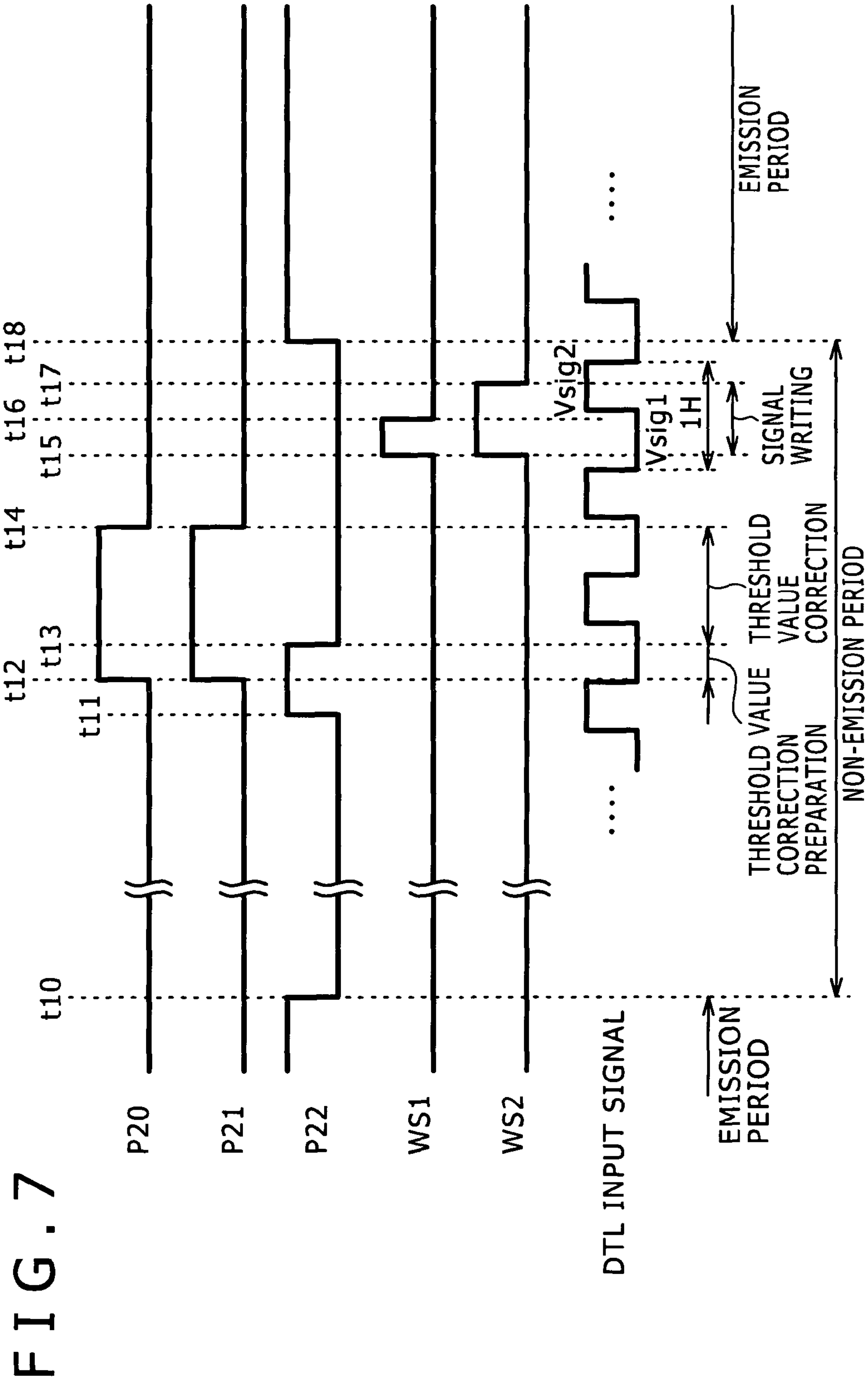
FIG. 7 is a diagram of assistance in explaining operating waveforms according to the third embodiment.

FIG. 7 shows driving waveforms for the pixel circuit 10. FIG. 7 shows the controlling pulses P20, P21, and P22, the scanning pulses WS1 and WS2, and a DTL input signal.

Light emission of a previous frame is performed until time t10. An operation for light emission of a present frame after time t18 is performed in a non-emission period from time t10 to time t18.

In an emission period through time t10, the switching transistor T22 is on, and a current corresponding to the gate-to-source voltage of the driving transistor Td is passed through the organic EL element 1.

At time t10, the controlling scanner 22 sets the controlling pulse P22 to an L-level to turn off the switching transistor T22. Thus, the current supplied to the organic EL element 1 is stopped to quench the organic EL element 1.

At time t11, the controlling pulse P22 is set to an H-level to turn on the switching transistor T22. At time t12, the controlling scanners 20 and 21 set the controlling pulses P20 and P21 to an H-level to turn on the switching transistors T20 and T21. Then, threshold value correction preparation is made in a period from time t12 to time t13.

In this period, the switching transistors T20, T21, and T22 are each in an on state, and the potential of a middle point between the capacitances C2 and C3 (point B) rises sharply so as to converge to a reference voltage Vofs.

Meanwhile, the charge of the capacitance C3 is extracted through the switching transistors T21 and T22, and decreases sharply to the anode potential of the organic EL element 1. That is, a voltage across the capacitance C3 is increased. This operation resets the voltage retained by the capacitance C3.

Next, at time t13, the controlling pulse P22 is set to an L-level to turn off the switching transistor T22. Then, a threshold value correction is made in a period from time t13 to time t14.

Specifically, the drain current of the driving transistor Td in an on state flows into the capacitance C3 via the switching transistor T21. With this, the voltage retained by the capacitance C3 is decreased.

However, the potential of the middle point between the capacitances C2 and C3 (point B) remains the reference voltage Vofs. On the other hand, the gate voltage of the driving transistor Td rises with the decrease in the voltage retained by the capacitance C3.

When a potential difference between the gate voltage and a power supply potential Vcc thereafter rises to the threshold voltage Vth of the driving transistor Td, the current flowing through the driving transistor Td becomes very small. With this, the gate voltage almost stops rising.

The capacitance C3 consequently stores a voltage necessary to correct the threshold voltage Vth inherent in the driving transistor Td functioning as a current driving element.

At time t14, the controlling pulses P20 and P21 are set to an L-level to turn off the switching transistors T20 and T21. Thereby the threshold value correction is completed.

Signal value writing is performed from time t15.

At time t15 at which a horizontal selector 11 is supplying a signal value Vsig1 to the signal line DTL, the scanning pulses WS1 and WS2 are set to an H-level to turn on the sampling transistors Ts1 and Ts2.

Figure 6:
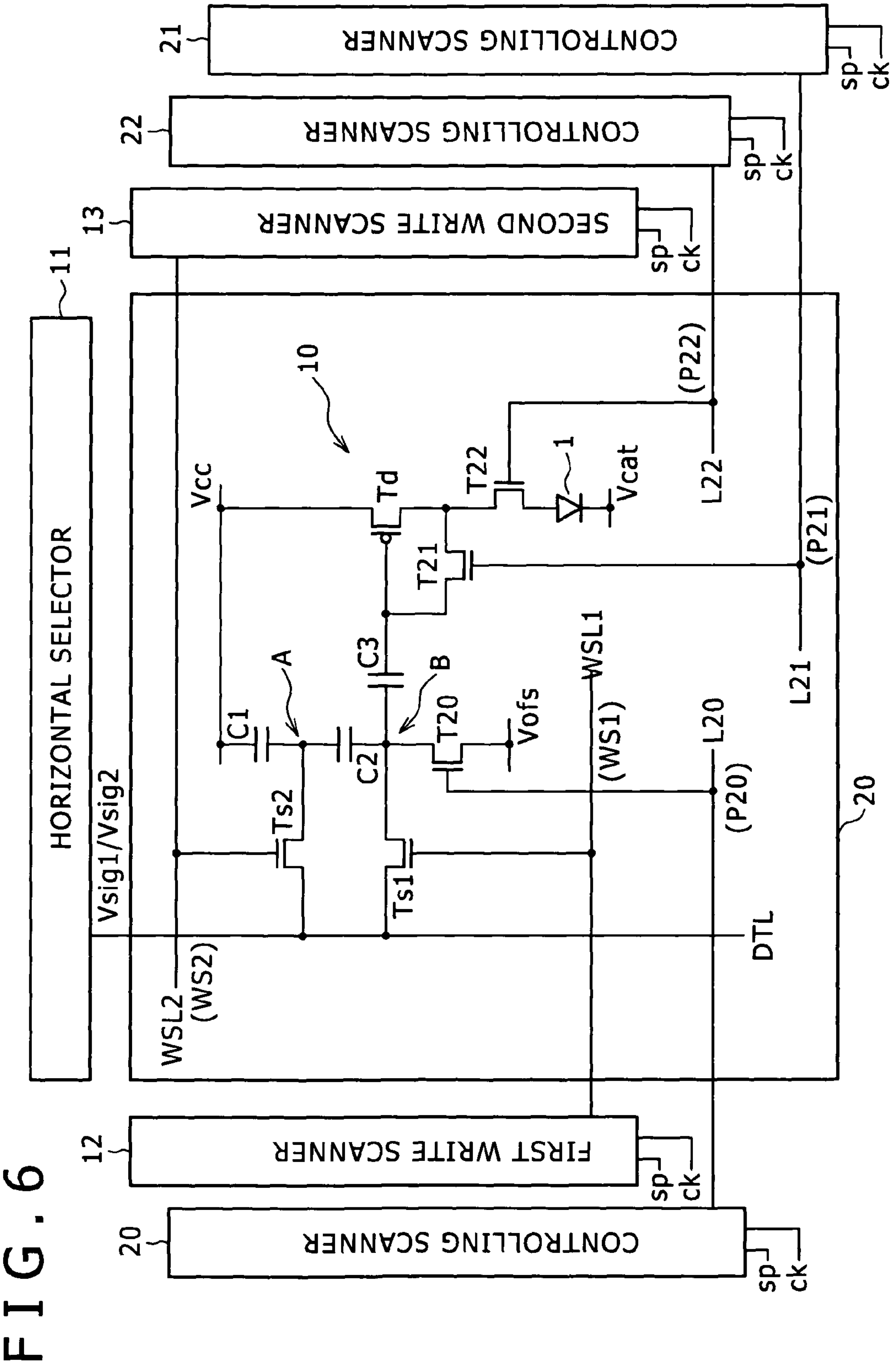
FIG. 6 is a circuit diagram of a pixel circuit according to a third embodiment.

The signal value Vsig1 is thereby written to point A and point B in FIG. 6.

Then, at time t16, the scanning pulse WS1 is set to an L-level to turn off the sampling transistor Ts1, and only the sampling transistor Ts2 continues being on. The horizontal selector 11 then supplies a signal value Vsig2 to the signal line DTL. The signal value Vsig2 is thereby input to point A in FIG. 6. The potential of point A changes from the signal value Vsig1 to the signal value Vsig2. An amount of the variation is thereby input to point B via the capacitance C2. Incidentally, the capacitance C3 retains the voltage resulting from the threshold value correcting operation.

Consequently, in this case, £V of a signal value for display (Vsig1+ΔV) is as follows.

$$\Delta V = \frac{C3}{C3+Cg}\cdot\frac{C2}{C2+\left(\frac{C3Cg}{C3+Cg}\right)}(Vsig2 - Vsig1) = \frac{C2C3}{C2C3+C2Cg+C3Cg}(Vsig\ 2 - Vsig\ 1) \quad \text{[Equation 4]}$$

Incidentally, "Cg" in this case is obtained by excluding the capacitance C3 from a capacitance between the gate of the driving transistor Td and a fixed potential.

Thereafter, at time t17, the scanning pulse WS2 is set to an L-level to turn off the sampling transistor Ts2. At time t18, the switching transistor T22 is turned on by the controlling pulse P22. The light emission of the organic EL element 1 is thereby started.

In this case, the driving transistor Td passes a current shown in the above-described (Equation 1) through the EL element according to the gate-to-source voltage Vgs=Vsig1+ΔV in this case, and the organic EL element 1 emits light at a gradation corresponding to the signal value for display Vsig1+ΔV. In addition, because the signal value for display Vsig1+ΔV is given with the threshold voltage Vth retained by the capacitance C3 as a reference, a light emitting operation is performed in which effects of variation in the threshold voltage Vth of the driving transistor Td in each pixel are cancelled.

Also in the third embodiment, as in the first and second embodiments, it is possible to increase the number of gradations, and achieve high color reproducibility at low cost.

In addition, in this case, a display operation unaffected by variations in threshold voltage Vth can be realized by the threshold value correcting operation.

Incidentally, as an example of modification of the third embodiment, the capacitance C3 for retaining the threshold voltage Vth may be connected to the point of connection between the capacitances C1 and C2. That is, a circuit configuration based on the second embodiment shown in FIG. 5 is also possible.

Further, the capacitance C3 may be formed by a series connection of two capacitances, and one of the capacitances (capacitance on a side more distant from the gate) may be provided with the function of the capacitance C2 in the above-described example.

In addition, while the controlling scanners 20 and 21 are separate scanners in FIG. 6, it is possible to share one scanner. For example, the switching transistors T20 and T21 may be conduction-controlled by one controlling scanner 20 and one controlling line L20.

2-4 Fourth Embodiment

A fourth embodiment will be described with reference to FIGS. 8 to 11.

The fourth embodiment is an example in which an re-channel TFT is used as a driving transistor Td and a threshold value correction is made.

A pixel circuit 10 according to the fourth embodiment includes an organic EL element 1, a driving transistor Td, sampling transistors Ts1 and Ts2, capacitances C1 and C2, and switching transistors T23, T24, and T25. The driving transistor Td, the sampling transistors Ts1 and Ts2, and the switching transistors T23 and T24 are n-channel TFTs. The switching transistor T25 is a p-channel TFT. Incidentally, a capacitance Cel refers to the parasitic capacitance of the organic EL element 1.

As a scanning line driving section, controlling scanners 23, 24, and 25 are also provided in addition to a first write scanner 12 and a second write scanner 13.

The source of the driving transistor Td formed by an n-channel TFT is connected to the anode of the organic EL element 1. The drain of the driving transistor Td is connected to a power Vcc line via the switching transistor T25.

The capacitances C1 and C2 are connected in series with each other between the gate and source of the driving transistor Td.

The drain and source of the sampling transistor Ts1 are connected between the gate of the driving transistor Td and a signal line DTL.

The drain and source of the sampling transistor Ts2 are connected between point A, which is a point of connection between the capacitances C1 and C2, and the signal line DTL.

The controlling scanner 23 supplies a controlling pulse P23 to a controlling line L23. The controlling scanner 24 supplies a controlling pulse P24 to a controlling line L24. The controlling scanner 25 supplies a controlling pulse P25 to a controlling line L25. Incidentally, as with the first writing control lines WSL1 and the second writing control lines WSL2 in FIG. 1, controlling lines L23, L24, and L25 are arranged in equal numbers to that of rows of pixel circuits 10 arranged in the form of a matrix in a pixel array 20.

The first write scanner 12 and the second write scanner 13 and the controlling scanners 23, 24, and 25 set the timing of scanning pulses WS1 and WS2 and the controlling pulses P23, P24, and P25 on the basis of a clock ck and a start pulse sp.

The drain and source of the switching transistor T23 are connected between the gate of the driving transistor Td and a fixed reference potential Vofs. The gate of the switching transistor T23 is connected to the controlling line L23. Thus, the switching transistor T23 is conduction-controlled by the controlling pulse P23 from the controlling scanner 23.

The drain and source of the switching transistor T24 are connected between the source of the driving transistor Td and a fixed potential Vss. The gate of the switching transistor T24 is connected to the controlling line L24. Thus, the switching transistor T24 is conduction-controlled by the controlling pulse P24 from the controlling scanner 24.

The drain and source of the switching transistor T25 are connected between the driving transistor Td and a power supply potential Vcc. The gate of the switching transistor T25 is connected to the controlling line L25. Thus, the switching transistor T25 is conduction-controlled by the controlling pulse P25 from the controlling scanner 25.

Figure 9:
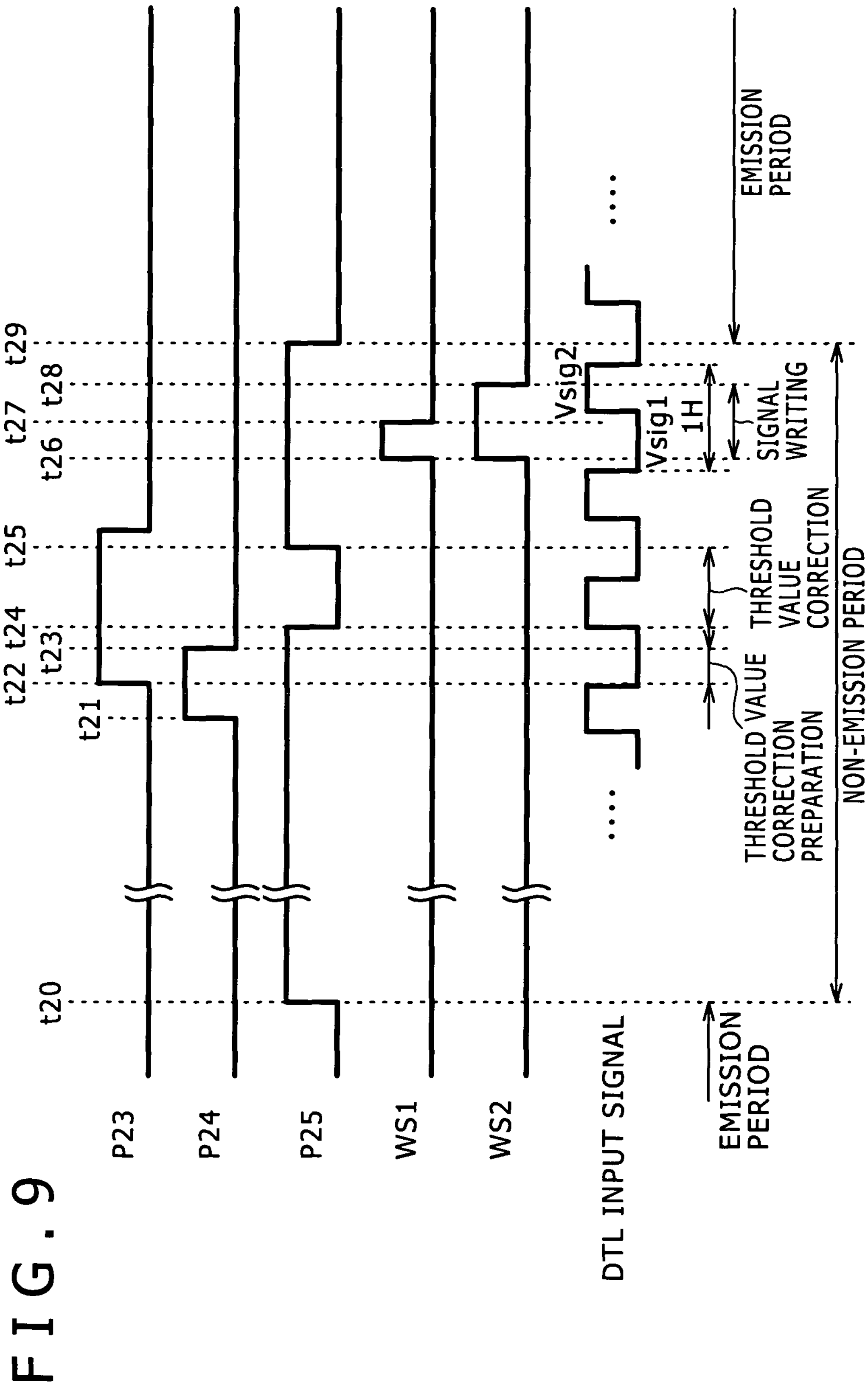
FIG. 9 is a diagram of assistance in explaining operating waveforms according to the fourth embodiment.

FIG. 9 shows driving waveforms for the pixel circuit 10. FIG. 9 shows the controlling pulses P23, P24, and P25, the scanning pulses WS1 and WS2, and a DTL input signal.

Light emission of a previous frame is performed until time t20. An operation for light emission of a present frame after time t29 is performed in a non-emission period from time t20 to time t29.

In an emission period through time t20, the controlling pulse P25 is at an L-level, and the p-channel switching transistor T25 is on, so that a voltage Vcc is applied to the driving transistor Td. The switching transistors T23 and T24 and the sampling transistors Ts1 and Ts2 are off.

A current corresponding to the gate-to-source voltage of the driving transistor Td is therefore passed through the organic EL element 1 to emit light.

At time t20, the controlling scanner 25 sets the controlling pulse P25 to an H-level to turn off the switching transistor T25. Thus, the current supplied to the organic EL element 1 is stopped to quench the organic EL element 1.

At time t21, the controlling pulse P24 is set to an H-level to turn on the switching transistor T24. At time t22, the controlling scanner 23 sets the controlling pulse P23 to an H-level to turn on the switching transistor T23. Then, threshold value correction preparation is made in a period from time t22 to time t23.

Specifically, by turning on the switching transistor T24, the source potential of the driving transistor Td (anode potential of the organic EL element 1) is lowered to the fixed potential Vss. In addition, by turning on the switching transistor T23, the gate potential of the driving transistor Td is lowered to the reference potential Vofs. Thereafter, the switching transistor T24 is turned off at time t23. Incidentally, a setting is made such that Vss<Vofs−Vth.

At time t24, the controlling pulse P25 is set to an L-level to turn on the switching transistor T25. A threshold value correction is thereby started.

Because of the setting made such that Vss<Vofs−Vth, the driving transistor Td is in an on state. At this time, the gate-to-source voltage Vgs of the driving transistor Td assumes a value Vofs−Vss, and a current corresponding to the value flows.

Figure 8:
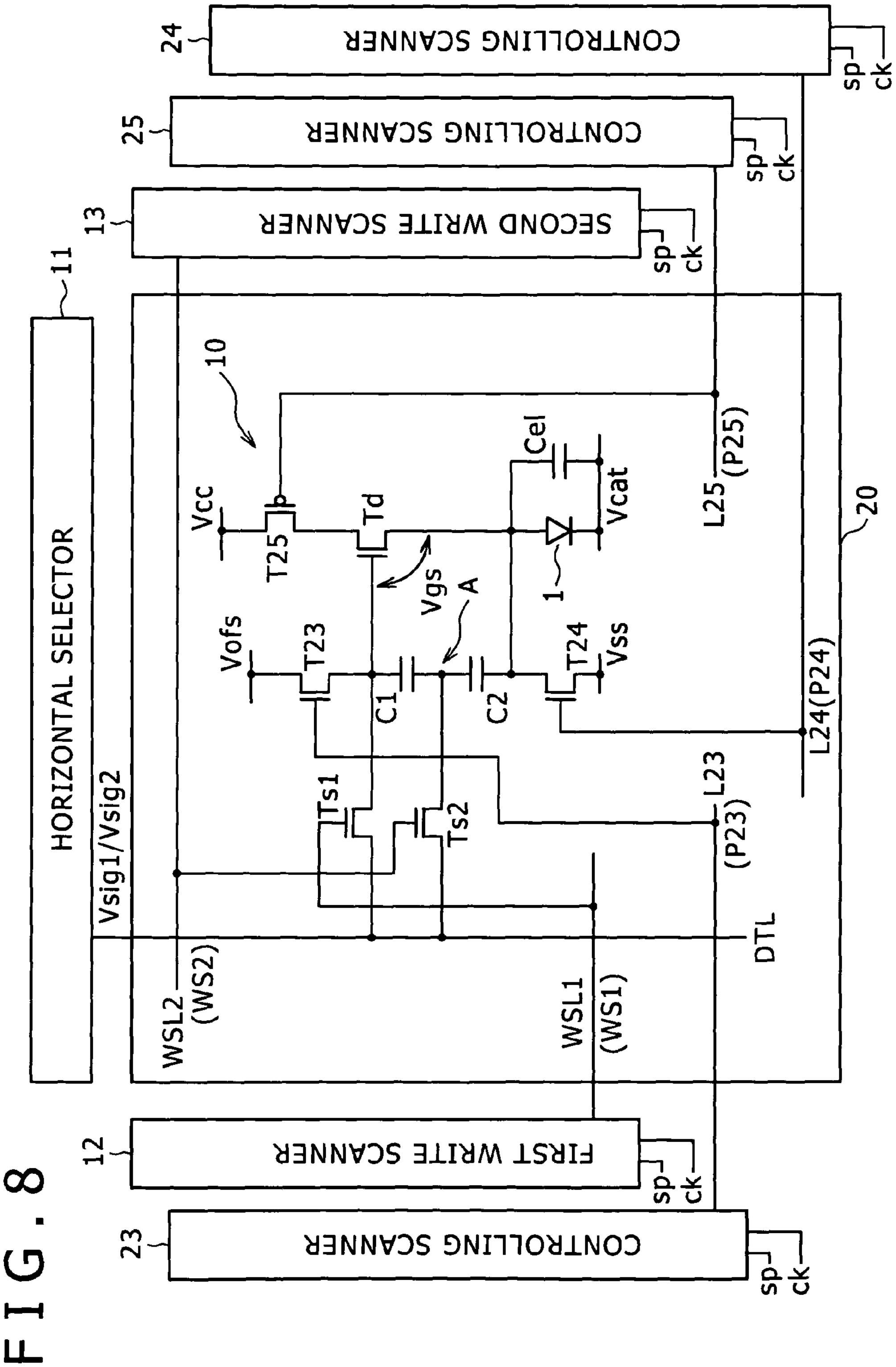
FIG. 8 is a circuit diagram of a pixel circuit according to a fourth embodiment.

An equivalent circuit of the organic EL element 1 is represented by a diode and a capacitance as shown in FIG. 8. As long as the anode potential Vel≤Vcat+Vthel (threshold voltage of the organic EL element 1), that is, as long as the leakage current of the organic EL element 1 is considerably smaller than the current flowing through the driving transistor Td, the current of the driving transistor Td is used to charge the capacitances C2 and Cel.

At this time, the switching transistor T24 is off, and the current path of drain current of the driving transistor Td is blocked, so that the voltage Vel applied to the organic EL element 1 rises with time.

After the passage of a certain time, the gate-to-source voltage Vgs of the driving transistor Td assumes the threshold voltage Vth. The voltage Vel applied to the organic EL element 1 at this time is Vel=Vofs−Vth≤Vcat+Vthel.

Then the threshold voltage Vth of the driving transistor Td as a potential difference appearing between the gate and source of the driving transistor Td is retained by the capacitances C1 and C2.

At time t25, the switching transistor T25 is turned off. Thereby the drain current stops flowing to end the threshold value correcting operation. Thereafter, the switching transistor T23 is also turned off.

Signal value writing is performed from time t26.

Figure 10A:
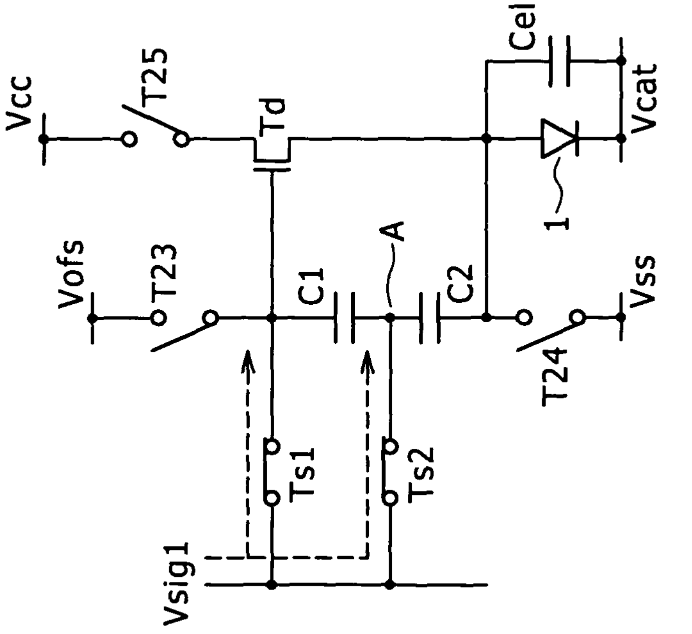
FIGS. 10A and 10B are equivalent circuit diagrams of operation according to the fourth embodiment.

At time t26 at which a horizontal selector 11 is supplying a signal value Vsig1 to the signal line DTL, the scanning pulses WS1 and WS2 are set to an H-level to turn on the sampling transistors Ts1 and Ts2. An equivalent circuit at this time is shown in FIG. 10A. As shown in FIG. 10A, the signal value Vsig1 is written to the gate of the driving transistor Td and point A.

Figure 10B:
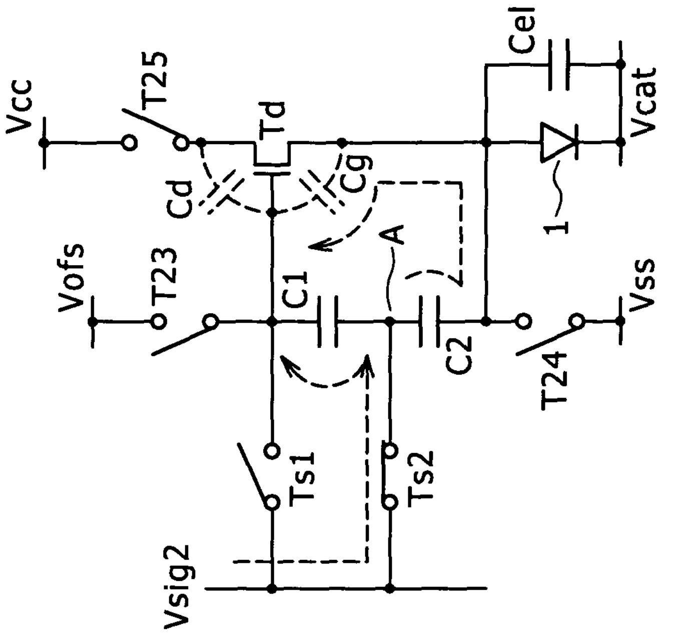

Then, at time t27, the scanning pulse WS1 is set to an L-level to turn off the sampling transistor Ts1, and only the sampling transistor Ts2 continues being on. An equivalent circuit is shown in FIG. 10B.

The horizontal selector 11 at this time supplies a signal value Vsig2 to the signal line DTL. The signal value Vsig2 is thereby input to point A in FIG. 10B. The potential of point A changes from the signal value Vsig1 to the signal value Vsig2. A voltage of ΔV is thereby input to the gate of the driving transistor Td via the capacitances C1 and C2.

In this case, ΔV of a signal value for display (Vsig1+ΔV) is as follows.

[Equation 5]

$$\Delta V = \frac{C1C2 + C1Cel + C1Cg + C1Cg + C2Cg}{C1C2 + C1Cel + C1Cg + C2Cg + CelCg + C2Cd + CelCd + CgCd}(Vsig2 - Vsig1)$$

Incidentally, "Cg" in this case is obtained by excluding the system of the capacitances C1 and C2 from a capacitance between the gate and source potentials of the driving transistor Td. "Cd" denotes a capacitance between the driving transistor Td and the fixed power supply Vcc.

Thereafter, at time t28, the scanning pulse WS2 is set to an L-level to also turn off the sampling transistor Ts2.

Then, at time t29, the switching transistor T25 is turned on by the controlling pulse P25. The light emission of the organic EL element 1 is thereby started.

In this case, the driving transistor Td passes a current shown in the above-described (Equation 1) through the EL element according to the gate-to-source voltage Vgs=Vsig1+ΔV in this case, and the organic EL element 1 emits light at a gradation corresponding to the signal value for display Vsig1+ΔV. In addition, because the signal value for display Vsig1+ΔV is given with the threshold voltage Vth retained between the gate and source of the driving transistor Td as a reference, a light emitting operation is performed in which effects of variation in the threshold voltage Vth of the driving transistor Td in each pixel are cancelled.

Also in the fourth embodiment, as in the first to third embodiments, it is possible to increase the number of gradations, and achieve high color reproducibility at low cost.

In addition, in this case, a display operation unaffected by variations in threshold voltage Vth can be realized by the threshold value correcting operation.

Incidentally, as an example of modification of the fourth embodiment, the gate of the driving transistor Td may be connected to the point of connection between the capacitances C1 and C2. That is, a circuit configuration based on the second embodiment shown in FIG. 5 is also possible.

Figure 11:
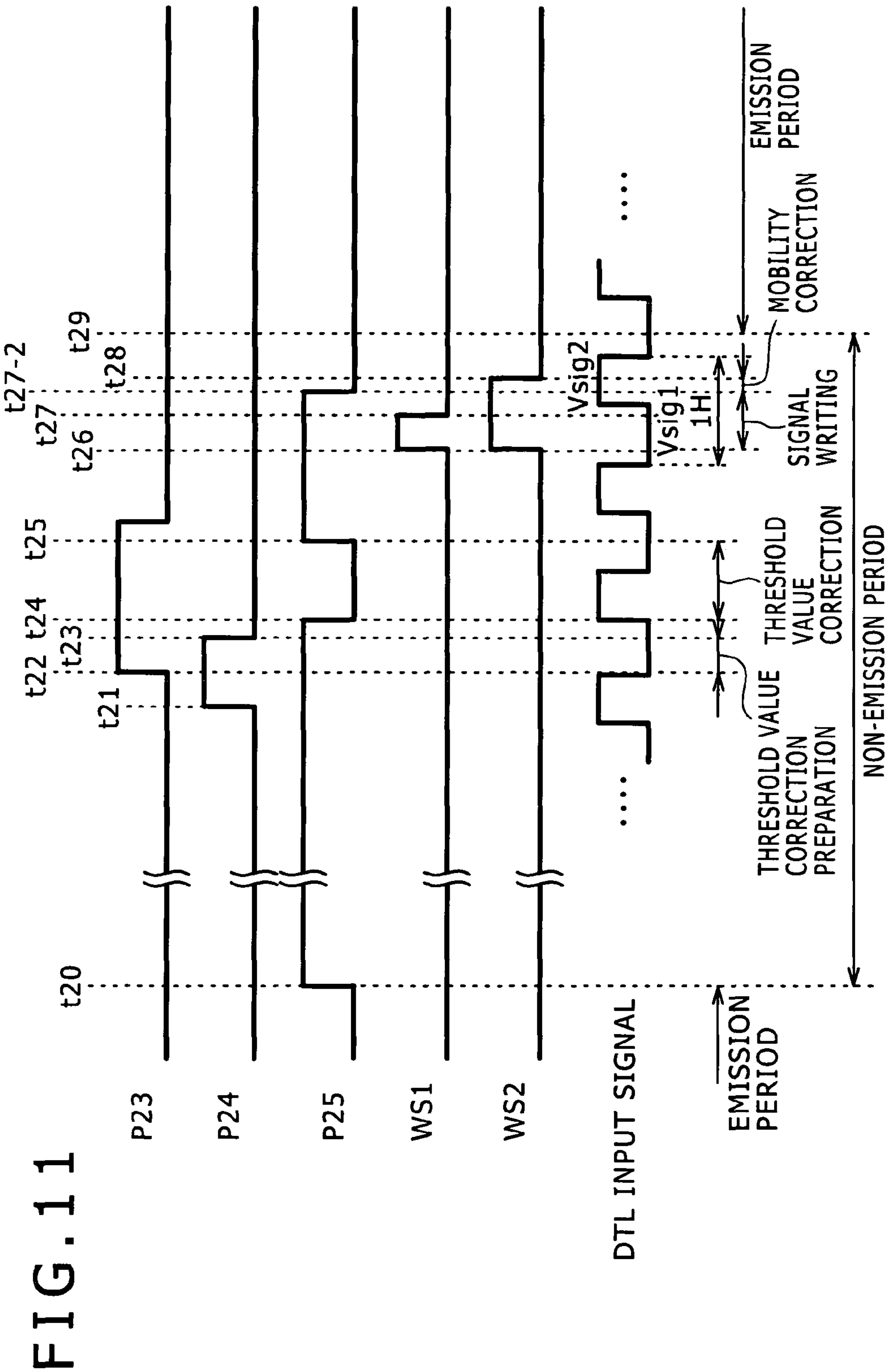
FIG. 11 is a diagram of assistance in explaining operating waveforms according to an example of modification of the fourth embodiment.

Further, an operation to which a mobility correction as shown in FIG. 11 is added is also considered as an example of modification of a driving system. Operation up to time t27 in FIG. 11 is similar to that of FIG. 9.

In this case, while only the sampling transistor Ts2 is on and the signal value Vsig2 is written from time t27, at time t27-2, the controlling pulse P25 is set to an L-level to turn on the switching transistor T25. Thus, a current is passed from the power supply Vcc, the source voltage of the driving transistor Td is raised, and a mobility correction is made.

By applying such a mobility correction, display can be made without being affected by variations in mobility of the driving transistor Td in each pixel.

Because many gradations can be expressed with a small number of signal gradations also in a pixel circuit having a threshold value correcting function and a mobility correcting function, it is possible to reduce the cost of a signal driver, and achieve high color reproducibility.

Incidentally, in FIG. 11, a mobility correcting operation is performed by turning on the switching transistor T25 while the sampling transistor Ts2 is on and the signal value Vsig2 is input. However, there is another method.

For example, a mobility correction may be made by turning on the switching transistor T25 only while the sampling transistors Ts1 and Ts2 are on and the signal value Vsig1 is input.

In addition, a mobility correction may be made by turning on the switching transistor T25 in each of periods when the signal value Vsig1 is input and when the signal value Vsig2 is input.

2-5 Fifth Embodiment

A fifth embodiment will be described with reference to FIG. 12 and FIG. 13.

A pixel circuit 10 according to the fifth embodiment includes a driving transistor Td formed by an n-channel TFT, sampling transistors Ts1 and Ts2, capacitances C1 and C2, and an organic EL element 1.

In this case, a horizontal selector 11 outputs signal values Vsig1 and Vsig2 and a reference potential Vofs to a signal line DTL in one horizontal period.

As a scanning line driving section, a drive scanner 14 is also provided in addition to a first write scanner 12 and a second write scanner 13.

The drive scanner 14 drives a power supply control line DSL. Incidentally, as with the first writing control lines WSL1 and the second writing control lines WSL2 in FIG. 1, power supply control lines DSL are arranged in an equal number to that of rows of pixel circuits 10 arranged in the form of a matrix in a pixel array 20.

The drive scanner 14 supplies a power supply pulse DS as a power supply voltage changing to two values of a driving potential (Vcc) and an initial potential (Vss) to each power supply control line DSL disposed in the form of a row in synchronism with the line-sequential scanning of the first write scanner 12 and the second write scanner 13.

Incidentally, the first write scanner 12 and the second write scanner 13 and the drive scanner 14 set the timing of scanning pulses WS1 and WS2 and the power supply pulse DS on the basis of a clock ck and a start pulse sp.

The source of the driving transistor Td formed by an n-channel TFT is connected to the anode of the organic EL element 1. The drain of the driving transistor Td is connected to the power supply control line DSL.

The capacitances C1 and C2 are connected in series with each other between the gate and source of the driving transistor Td.

The drain and source of the sampling transistor Ts1 are connected between the gate of the driving transistor Td and a signal line DTL.

The drain and source of the sampling transistor Ts2 are connected between point A, which is a point of connection between the capacitances C1 and C2, and the signal line DTL.

Figure 13:
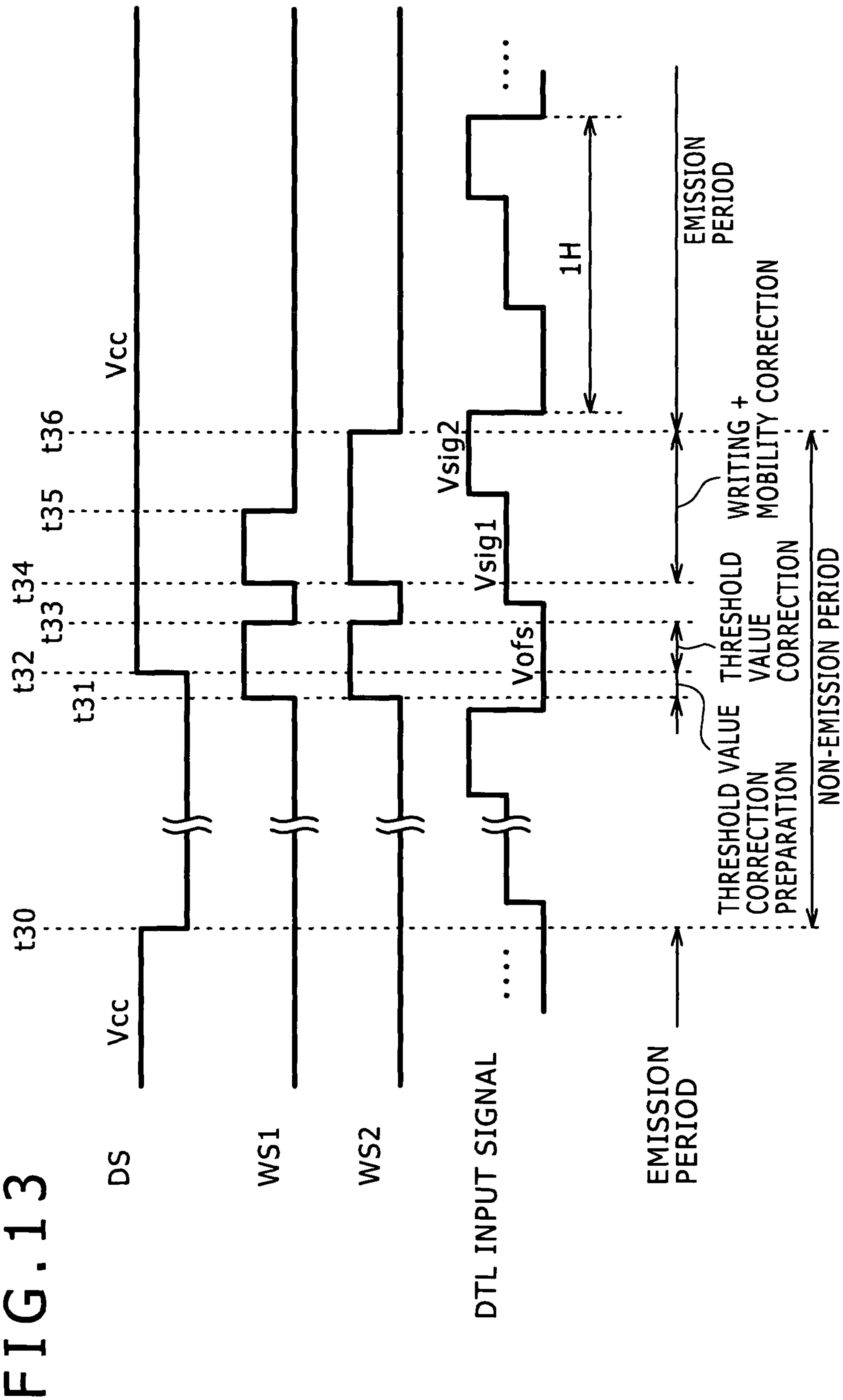
FIG. 13 is a diagram of assistance in explaining operating waveforms according to the fifth embodiment.

FIG. 13 shows driving waveforms for the pixel circuit 10. FIG. 13 shows the power supply pulse DS, the scanning pulses WS1 and WS2, and a DTL input signal.

First, suppose that the horizontal selector 11 sequentially outputs the reference potential Vofs and the signal values Vsig1 and Vsig2 to the signal line DTL in one horizontal period, as is shown as the DTL input signal in FIG. 13.

Light emission of a previous frame is performed until time t30. An operation for light emission of a present frame after time t36 is performed in a non-emission period from time t30 to time t36.

In an emission period through time t30, Power Supply Pulse DS=Driving Voltage Vcc, and the sampling transistors Ts1 and Ts2 are off.

A current corresponding to the gate-to-source voltage of the driving transistor Td is therefore passed through the organic EL element 1 to emit light.

At time t30 at which the emission period of the previous frame is ended, the drive scanner 14 stops supplying the driving voltage Vcc to the power supply control line DSL, and sets the power supply control line DSL to the initial voltage Vss. Thereby the light emission of the organic EL element 1 is stopped. At this time, the source potential of the driving transistor Td is initialized.

Next, at time t31 at which the horizontal selector 11 supplies the reference potential Vofs to the signal line DTL, as a threshold value correction preparation, the scanning pulses WS1 and WS2 are set to an H-level to make the sampling transistors Ts1 and Ts2 conduct. At this time, the gate potential of the driving transistor Td is fixed at the reference value Vofs. Because the source voltage of the driving transistor Td is fixed at Vss, the gate-to-source voltage Vgs of the driving transistor Td is Vgs=Vofs−Vss.

At time t32, the power supply pulse DS is set to the driving voltage Vcc, and a threshold value correction is started.

At this time, the source voltage rises, and the gate-to-source voltage Vgs becomes a threshold voltage Vth. Thereafter, the scanning pulses WS are set to an L-level at time t33, thus, the threshold value correction is completed.

Then, signal value writing and mobility correction are performed from time t34.

At time t34 at which the horizontal selector 11 is supplying a signal value Vsig1 to the signal line DTL, the scanning pulses WS1 and WS2 are set to an H-level to turn on the sampling transistors Ts1 and Ts2. Thus the signal value Vsig1 is written to the gate of the driving transistor Td and point A in FIG. 12.

Then, at time t35, the scanning pulse WS1 is set to an L-level to turn off the sampling transistor Ts1, and only the sampling transistor Ts2 continues being on.

The horizontal selector 11 supplies a signal value Vsig2 to the signal line DTL in this state. The signal value Vsig2 is thereby input to point A. The potential of point A changes from the signal value Vsig1 to the signal value Vsig2. Thus, a voltage ΔV is input to the gate of the driving transistor Td via the capacitances C1 and C2.

That is, a signal value for display (Vsig1+ΔV) is formed also in this case.

Incidentally, at the time of the signal value writing, a mobility correction is made with the driving voltage Vcc supplied and with the driving transistor Td raising the source voltage by passing a current.

Thereafter, the scanning pulse WS2 is set to an L-level to also turn off the sampling transistor Ts2 at time t36. The light emission of the organic EL element 1 is thereafter performed. That is, a current corresponding to the gate-to-source voltage Vgs of the driving transistor Td is passed through the organic EL element 1, and the organic EL element 1 emits light at a gradation corresponding to the signal value for display (Vsig1+ΔV).

Also in the fifth embodiment, as in the first to fourth embodiments, it is possible to increase the number of gradations, and achieve high color reproducibility at low cost.

In addition, in this case, a display operation unaffected by variations in threshold voltage Vth or mobility can be realized by the threshold value correcting operation and the mobility correcting operation.

Figure 12:
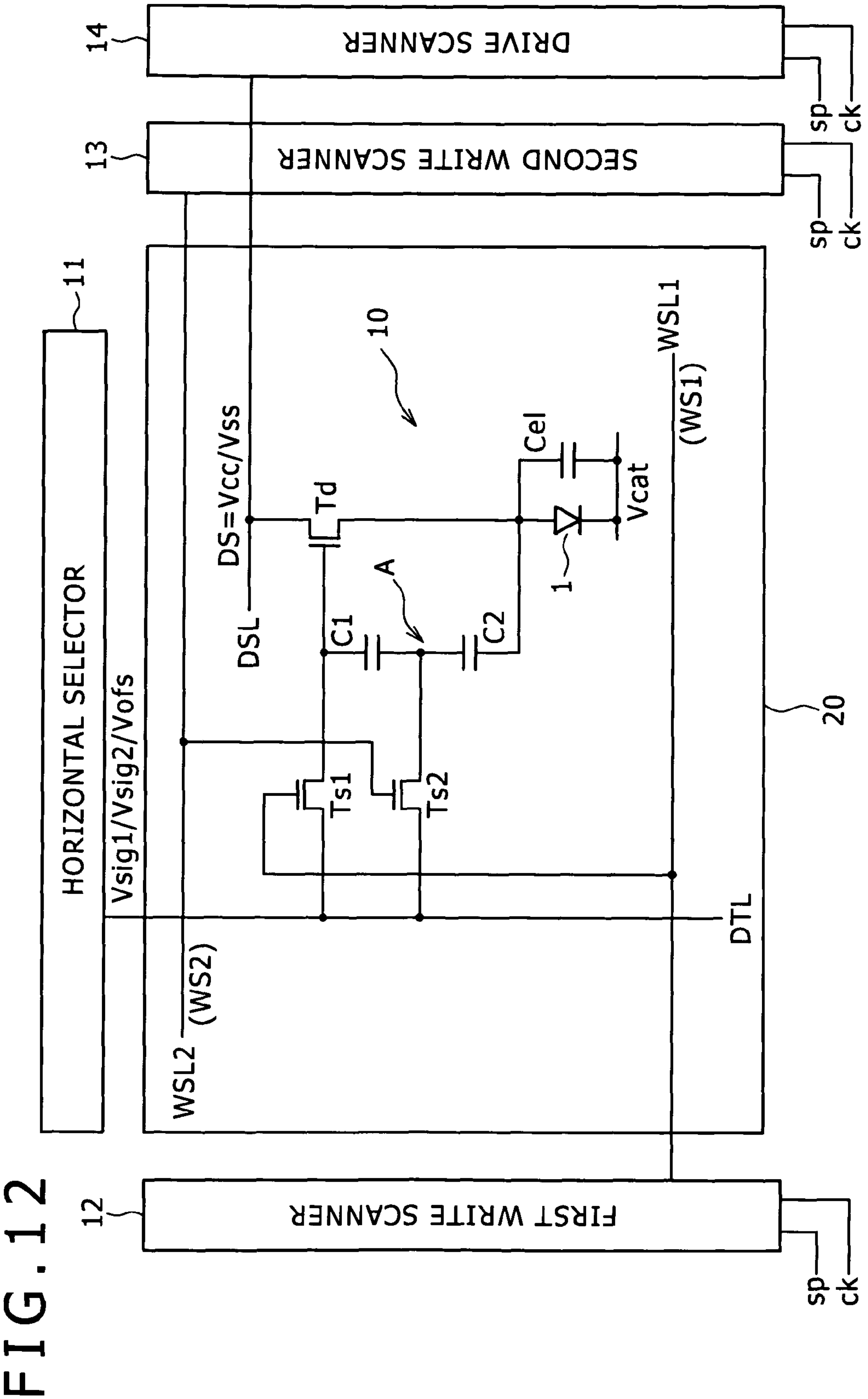
FIG. 12 is a circuit diagram of a pixel circuit according to a fifth embodiment.

Further, in the pixel circuit configuration of FIG. 12, the driving transistor Td and the sampling transistors Ts1 and Ts2 are all formed by an n-channel type TFT. Therefore an existing amorphous silicon (a-Si) process can be used in TFT creation, which is advantageous in reducing the cost of a TFT substrate and increasing screen size.

2-6 Sixth Embodiment

Figure 14:
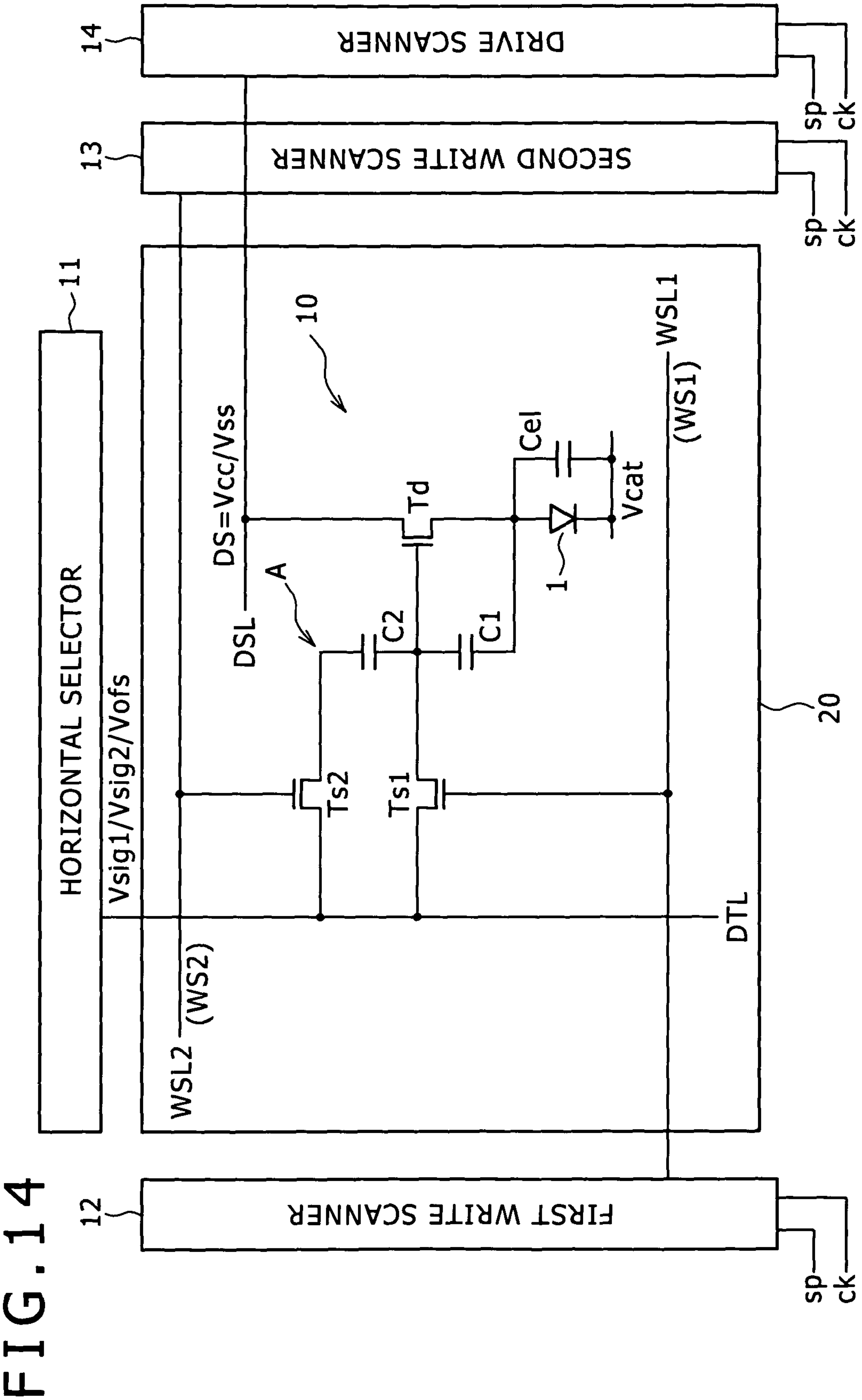
FIG. 14 is a circuit diagram of a pixel circuit according to a sixth embodiment.

A pixel circuit 10 according to a sixth embodiment is shown in FIG. 14.

This pixel circuit 10 is a modification of the circuit configuration of the foregoing fifth embodiment on the basis of a similar concept to that of the second embodiment shown in FIG. 5.

Specifically, the gate of a driving transistor Td is connected to a point of connection between capacitances C1 and C2. The capacitance C1 is connected between the gate and source of the driving transistor Td.

The drain and source of a sampling transistor Ts1 are connected between the gate of the driving transistor Td and a signal line DTL.

The drain and source of a sampling transistor Ts2 are connected between the capacitance C2 and the signal line DTL.

It suffices for the driving waveforms of the pixel circuit 10 in this case to be similar to those of FIG. 13. In signal writing, at time t34 at which a horizontal selector 11 is supplying a signal value Vsig1 to a signal line DTL, scanning pulses WS1 and WS2 are set to an H-level to turn on the sampling transistors Ts1 and Ts2. Thus the signal value Vsig1 is written to the gate of the driving transistor Td and point A in FIG. 14.

Then, at time t35, the scanning pulse WS1 is set to an L-level to turn off the sampling transistor Ts1, and only the sampling transistor Ts2 continues being on.

The horizontal selector 11 supplies a signal value Vsig2 to the signal line DTL in this state. The signal value Vsig2 is thereby input to point A. The potential of point A changes from the signal value Vsig1 to the signal value Vsig2. Thereby a voltage ΔV is input to the gate of the driving transistor Td via the capacitance C2. That is, a signal value for display (Vsig1+ΔV) is formed at a gate node also in this case.

The sixth embodiment provides similar effects to those of the fifth embodiment.

2-7 Seventh Embodiment

A seventh embodiment will next be described.

Pixel circuits 10 in a seventh to a twelfth embodiment to be described below basically have the following constituent elements.

The pixel circuits 10 have an organic EL element 1 as a light emitting element. The pixel circuits 10 include a driving transistor Td for applying a current to the light emitting element according to a signal value for display which signal value is input to the driving transistor Td.

In addition, the pixel circuits 10 include a sampling transistor Ts1 as a first switch element having one end connected to a signal line DTL, and conduction-controlled by a potential (scanning pulse WS1) of a first scanning line (writing control line WSL1).

In addition, the pixel circuits 10 include a capacitance C1 as a first capacitance.

In addition, the pixel circuits 10 include a capacitance C2 as a second capacitance one end of which is a point of input of the signal value for display to the gate node of the driving transistor Td.

In addition, the pixel circuits 10 include a sampling transistor Ts2 as a second switch element having one end and another end connected between one end of the first capacitance (C1) and one end of the second capacitance (C2), respectively. One of the one end and the other end of the sampling transistor Ts2 is connected to another end of the first switch element (sampling transistor Ts1), and the sampling transistor Ts2 is conduction-controlled by a potential (scanning pulse WS2) of a second scanning line (writing control line WSL2).

When a signal value Vsig1 is output to the signal line DTL, a first write scanner 12 and a second write scanner 13 as a scanning line driving section make the sampling transistors Ts1 and Ts2 conduct to input the signal value Vsig1 to one end of the first capacitance (C1) and one end of the second capacitance (C2).

Next, when a signal value Vsig2 is output to the signal line DTL, the first write scanner 12 and the second write scanner 13 make only the sampling transistor Ts1 conduct to input the signal value Vsig2 to one of one end of the first capacitance (C1) and one end of the second capacitance (C2).

Thereafter, only the sampling transistor Ts2 is made to conduct, and one end of the first capacitance (C1) and one end of the second capacitance (C2) are connected to each other. A signal value for display resulting from synthesis of the signal values Vsig1 and Vsig2 is thereby obtained at the above-described input point.

The seventh embodiment will be described concretely with reference to FIG. 15 and FIG. 16.

Figure 15:
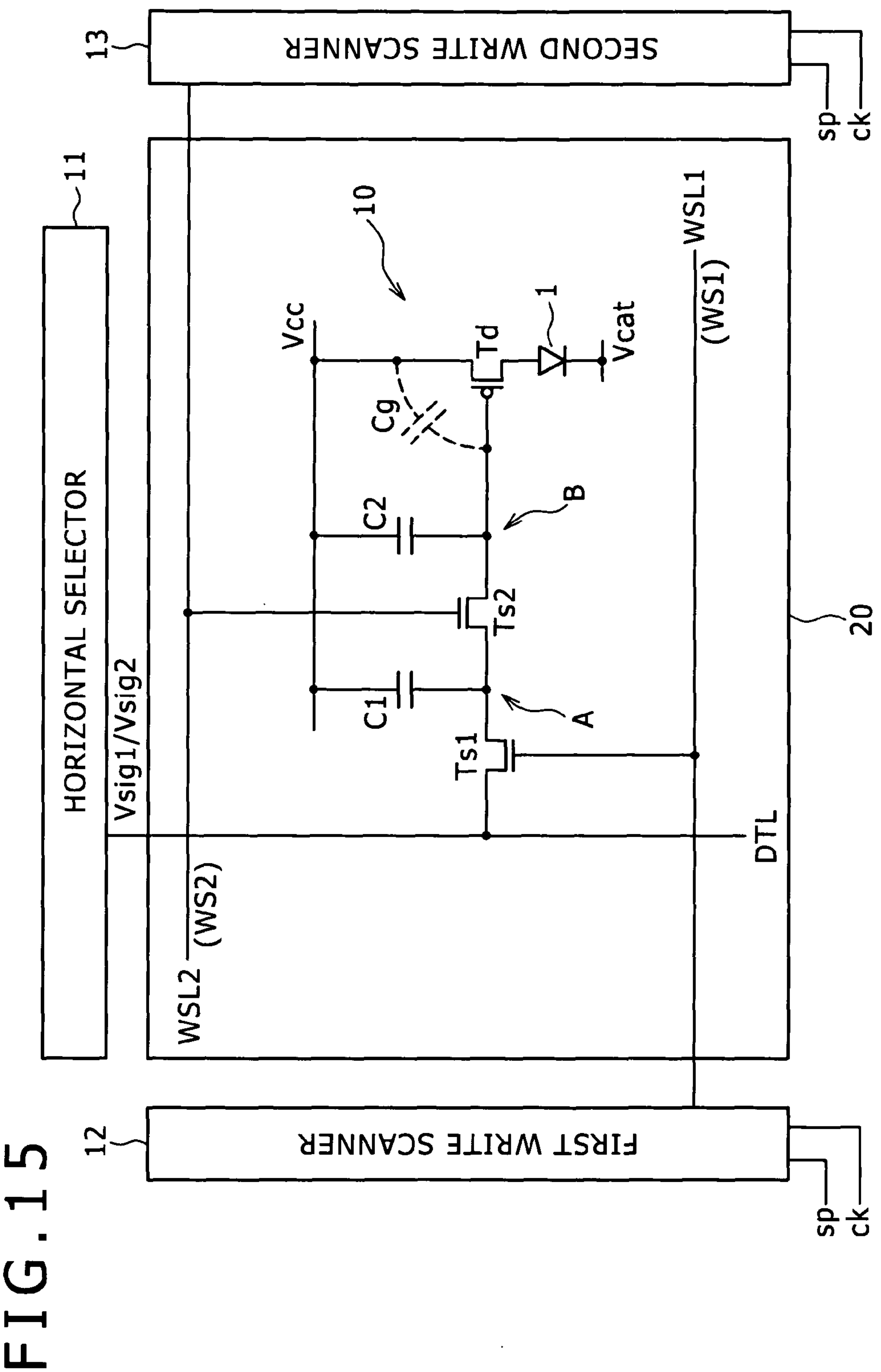
FIG. 15 is a circuit diagram of a pixel circuit according to a seventh embodiment.

FIG. 15 shows an example of configuration of a pixel circuit 10.

The pixel circuit 10 has an organic EL element 1, two capacitances C1 and C2, sampling transistors Ts1 and Ts2, and a driving transistor Td. The sampling transistors Ts1 and Ts2 are an n-channel thin film transistor (TFT). The driving transistor Td is a p-channel TFT.

The cathode of the organic EL element 1 is connected to predetermined wiring (cathode potential Vcat).

The drain and source of the driving transistor Td are connected between the anode of the organic EL element 1 and a power Vcc line.

The capacitance C2 is connected between the gate node of the driving transistor Td and the power Vcc line. One end of the capacitance C2 is point B.

The capacitance C1 is connected between a point of connection between the sampling transistors Ts1 and Ts2 and the power Vcc line. One end of the capacitance C1 is point A.

The capacitance C2 forms a storage capacitor for retaining the gate-to-source voltage Vgs of the driving transistor Td.

The drain and source of the sampling transistor Ts1 are connected between point A and a signal line DTL. The gate of the sampling transistor Ts1 is connected to a writing control line WSL1.

The drain and source of the sampling transistor Ts2 are connected to point A and point B. The gate of the sampling transistor Ts2 is connected to a writing control line WSL2.

Operation will be described with reference to FIG. 16.

Figure 16:
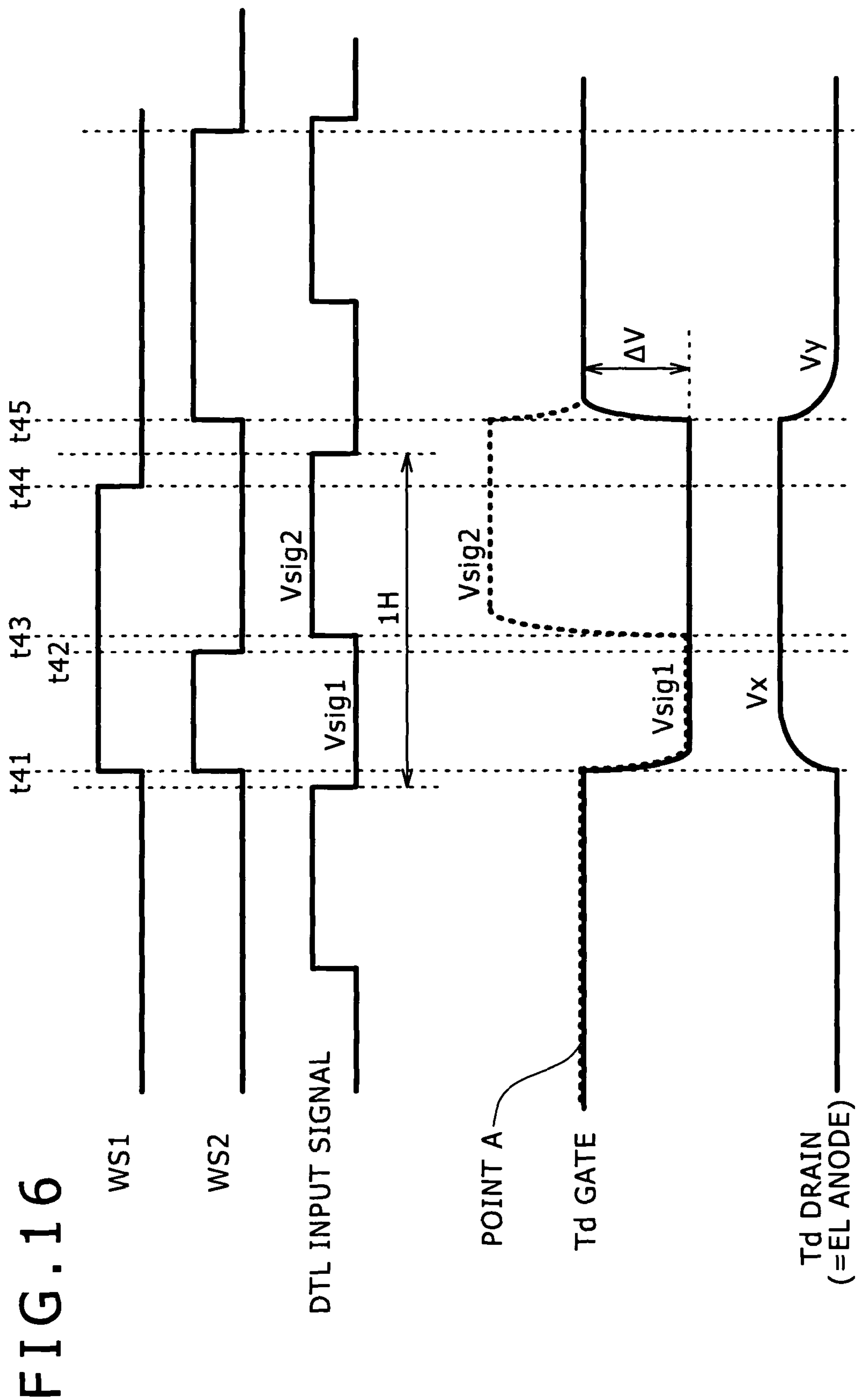
FIG. 16 is a diagram of assistance in explaining operating waveforms according to the seventh embodiment and a ninth embodiment.

FIG. 16 shows scanning pulses WS1 and WS2 supplied to the writing control lines WSL1 and WSL2 by a first write scanner 12 and a second write scanner 13.

FIG. 16 also shows a signal value voltage supplied to the signal line DTL by a horizontal selector 11 as a DTL input signal. As shown in FIG. 16, the horizontal selector 11 sequentially outputs signal values Vsig1 and Vsig2 as signal values for one pixel to the signal line DTL within one horizontal period.

In addition, FIG. 16 shows changes in gate voltage of the driving transistor Td and changes in drain voltage of the driving transistor Td (anode voltage of the organic EL element 1) by a solid line, and shows voltage changes at point A by a dotted line.

Light emission of a previous frame is performed until time t41. During the light emission, the scanning pulses WS1 and WS2 are both at an L-level, and thus the sampling transistors Ts1 and Ts2 are off. The driving transistor Td passes a current shown in the above-described (Equation 1) through the EL element according to a gate-to-source voltage Vgs.

An operation for light emission of a present frame is performed from time t41.

In a period in which the horizontal selector 11 supplies the signal value Vsig1 to the signal line DTL, the scanning pulses WS1 and WS2 are both set to an H-level to turn on the sampling transistors Ts1 and Ts2 at time t41.

The potential of the signal value Vsig1 is thereby written to the gate of the driving transistor Td (point B) and point A. With the gate potential of the driving transistor Td becoming the signal value Vsig1, a change occurs in the value of the gate-to-source voltage Vgs, and the anode potential of the organic EL element 1 becomes a potential Vx, as shown in FIG. 16.

Next, at time t42, the scanning pulse WS2 is set to an L-level to turn off the sampling transistor Ts2, whereas the sampling transistor Ts1 is continued in the on state.

Incidentally, the sampling transistor Ts1 does not necessarily need to be continued in the on state. That is, the sampling transistors Ts1 and Ts2 may be simultaneously turned off at time t42, and only the sampling transistor Ts1 may be turned on after the potential of the signal line becomes the signal value Vsig2 at time t43.

In either case, only the sampling transistor Ts1 is turned on after the potential of the signal line becomes the signal value Vsig2 at time t43.

When the horizontal selector 11 outputs the signal value Vsig2 to the signal line DTL at time t43, because only the sampling transistor Ts1 is on, the signal value Vsig2 is written to point A, and the potential of point A changes from the signal value Vsig1 to the signal value Vsig2.

At time t44 after a certain period, the scanning pulse WS1 is set to an L-level to turn off the sampling transistor Ts1.

Thereafter, at time t45, the scanning pulse WS2 is set to an H-level to turn on the sampling transistor Ts2. Because the sampling transistor Ts2 connecting point A to point B is turned on, the capacitance C1 and the capacitance C2 are connected to each other to be capacitively coupled to each other.

An amount of voltage change (ΔV) of the gate of the driving transistor Td at this time is a value expressed by the following (Equation 6).

$$\Delta V = \frac{C1}{C1 + C2 + Cg}(Vsig2 - Vsig1) \quad \text{[Equation 6]}$$

where "Cg" is a total capacitance excluding the capacitance C2 seen from the gate of the driving transistor Td (indicated by a dotted line in FIG. 7).

As is understood from (Equation 6), the amount of voltage change ΔV is composed of the capacitances C1, C2, and Cg and a difference between the signal values Vsig1 and Vsig2. The gate-to-source potential of the driving transistor Td at this time is Vsig1+ΔV.

This operation changes the gate-to-source voltage Vgs again, so that the anode potential of the organic EL element 1 changes again to become a potential Vy after the passage of a certain time. Then, the scanning pulse WS2 is set to an L-level to turn off the sampling transistor Ts2. Thus, signal writing is completed.

Thereafter, the driving transistor Td passes a current shown in the above-described (Equation 1) through the organic EL element 1 according to the gate-to-source voltage Vgs=Vsig1+ΔV in this case, and the organic EL element 1 emits light at a gradation corresponding to Vsig1+ΔV.

The gate potential of the driving transistor Td at the time of light emission of the organic EL element 1 is Vsig1+ΔV, and Vsig1<Vsig1+ΔV<Vsig2. That is, it can be said that the signal voltages Vsig1 and Vsig2 are used to create a new signal voltage Vsig1+ΔV by driving within the pixel. In other words, also in this configuration, gradations can be increased without an increase in the number of outputs of the signal driver.

As described above, the present example generates a signal voltage reflecting a gradation within a pixel using capacitive coupling. It is therefore possible to express many gradations with a small number of gradations of signal values, reduce the cost of the signal driver, and achieve high color reproducibility.

In addition, because the value of ΔV is determined by the capacitances C1, C2, and Cg, even when the voltage of one gradation is decreased, the voltage of one gradation can be expressed by the values of relatively large signal values Vsig2 and Vsig1. Thus, even when the number of gradations is increased, a maximum signal voltage does not need to be raised, and the cost of the signal driver can be reduced.

An example of another driving system of the pixel circuit 10 according to the seventh embodiment will be described with reference to FIG. 17.

Figure 17:
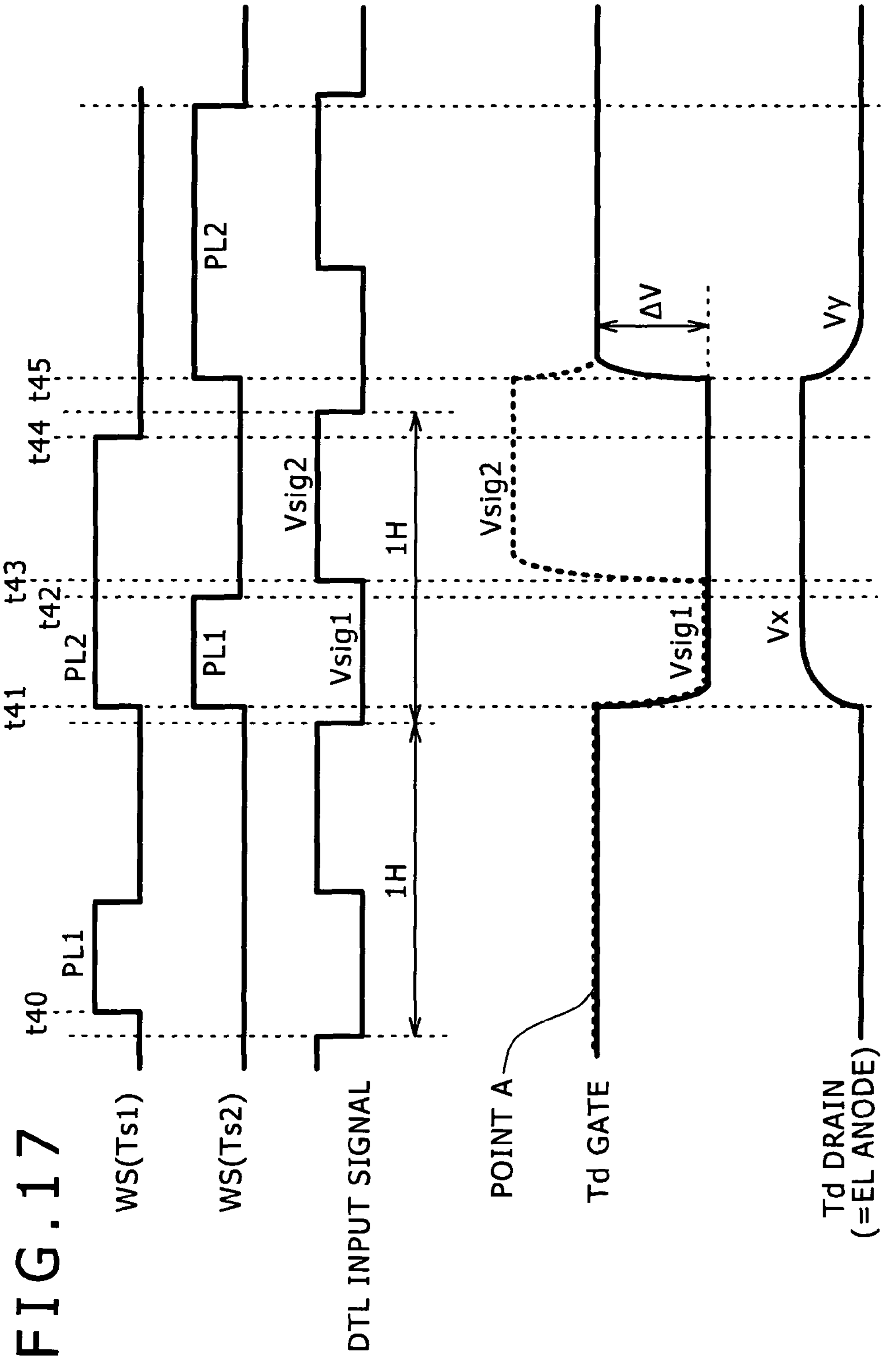
FIG. 17 is a diagram of assistance in explaining operating waveforms according to an example of modification of the seventh embodiment.

The basic operation of FIG. 17 is similar to that of FIG. 16 described above. However, scanning pulses WS for controlling the sampling transistors Ts1 and Ts2 are shared.

As shown in FIG. 17, a scanning pulse (PL2) is supplied to a certain pixel circuit 10 so as to turn on the sampling transistor Ts1 from time t41 to time t44. In addition, a scanning pulse (PL1) is supplied so as to turn on the sampling transistor Ts2 from time t41 to time t42. Further, a scanning pulse (PL2) is supplied so as to turn on the sampling transistor Ts2 from time t45 on down.

As is understood from the waveform chart, the scanning pulses supplied to the sampling transistors Ts1 and Ts2 are shifted from each other by the period of 1 H.

Figure 18:
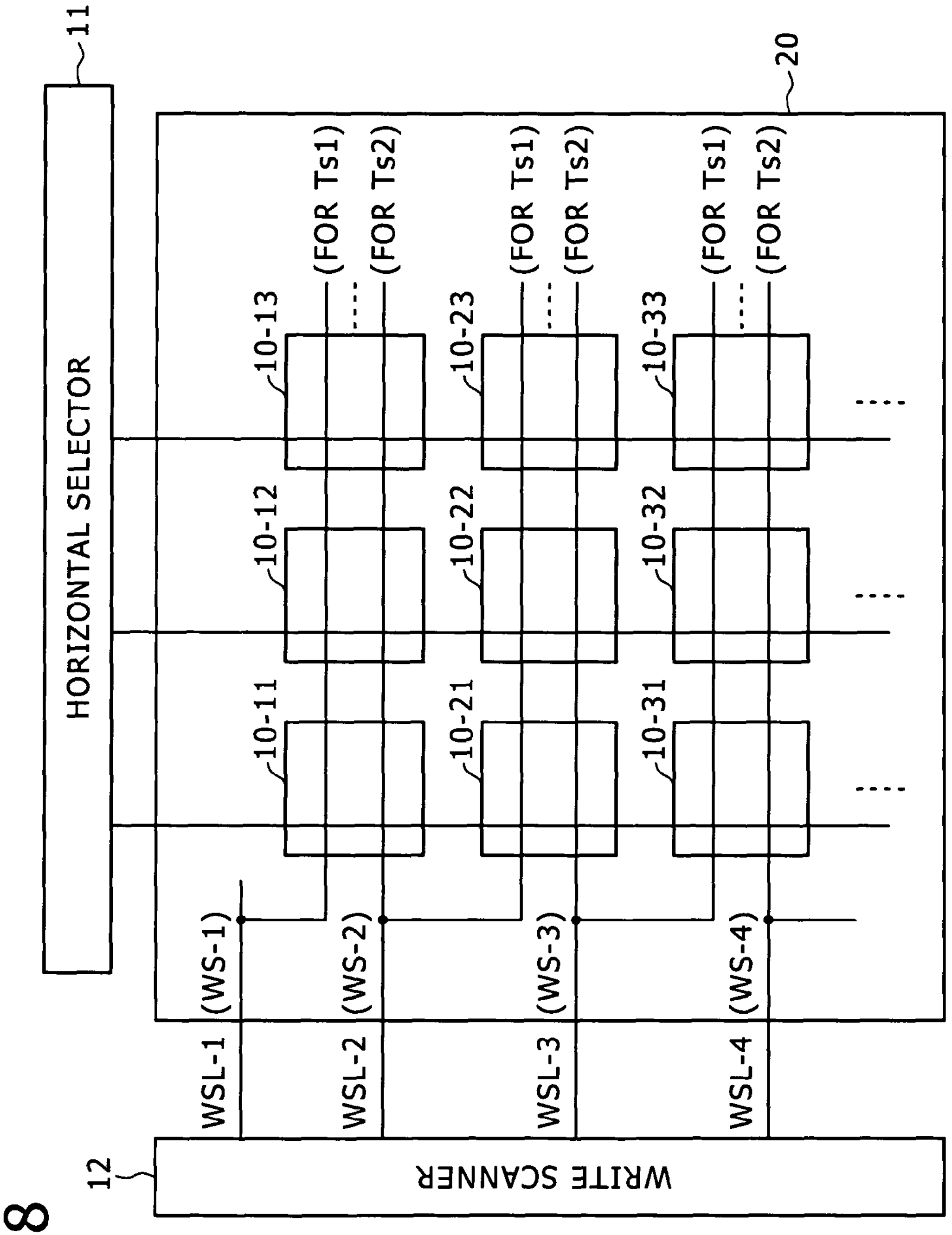
FIG. 18 is a diagram of assistance in explaining scanning lines according to the example of modification of the seventh embodiment.

In this case, it suffices to provide one write scanner 12, as shown in FIG. 18. Each of writing control lines WSL-1, WSL-2, . . . led out from the write scanner 12 is arranged for two rows of pixel circuits 10.

Directing attention to pixel circuits 10-21, 10-22, 10-23, . . . of a second row, for example, the writing control lines WSL-2 and WSL-3 are led in. The writing control line WSL-2 is connected to the gates of sampling transistors Ts1 in the pixel circuits 10-21, 10-22, 10-23, . . . . The writing control line WSL-3 is connected to the gates of sampling transistors Ts2 in the pixel circuits 10-21, 10-22, 10-23, . . . .

Supposing that the operating waveforms of FIG. 17 are for the pixel circuit 10-21 in the second row, for example, the scanning pulse PL2 supplied to the sampling transistor Ts1 from time t41 is the same pulse as the scanning pulse PL2 supplied to a sampling transistor Ts2 in a pixel circuit 10-11 in a row immediately preceding the row of the pixel circuit 10-21 from time t46.

In addition, the scanning pulse PL1 supplied to the sampling transistor Ts2 in the pixel circuit 10-21 from time t41 is the same pulse as the scanning pulse PL1 supplied to a sampling transistor Ts1 in a pixel circuit 10-31 in a row following the row of the pixel circuit 10-21 at time t40. Incidentally, although the sampling transistor Ts1 in each pixel circuit 10 is turned on by the scanning pulse PL1 at time t40 in an emission period, this does not affect pixel operation. This is because although the potential of point A is changed, the sampling transistor Ts2 is off, and thus gate potential is not affected. Then, a signal value Vsig1 for the pixel circuit 10 is input at subsequent time t41.

Thus, one write scanner 12 is provided as a scanning line driving section. Scanning pulses of a common waveform which scanning pulses differ from each other by the timing of one horizontal period are supplied to a scanning line for controlling sampling transistors Ts1 and a scanning line for controlling sampling transistors Ts2 in each horizontal line of the pixel array.

Thus, an operation similar to that of FIG. 16 can be realized. In addition, because it suffices to provide one write scanner 12, it is possible to simplify the configuration of the display device, simplify gate lines, simplify scanning pulse generation control, and achieve a high yield, for example.

2-8 Eighth Embodiment

An eighth embodiment will be described with reference to FIG. 19 and FIG. 20.

Figure 19:
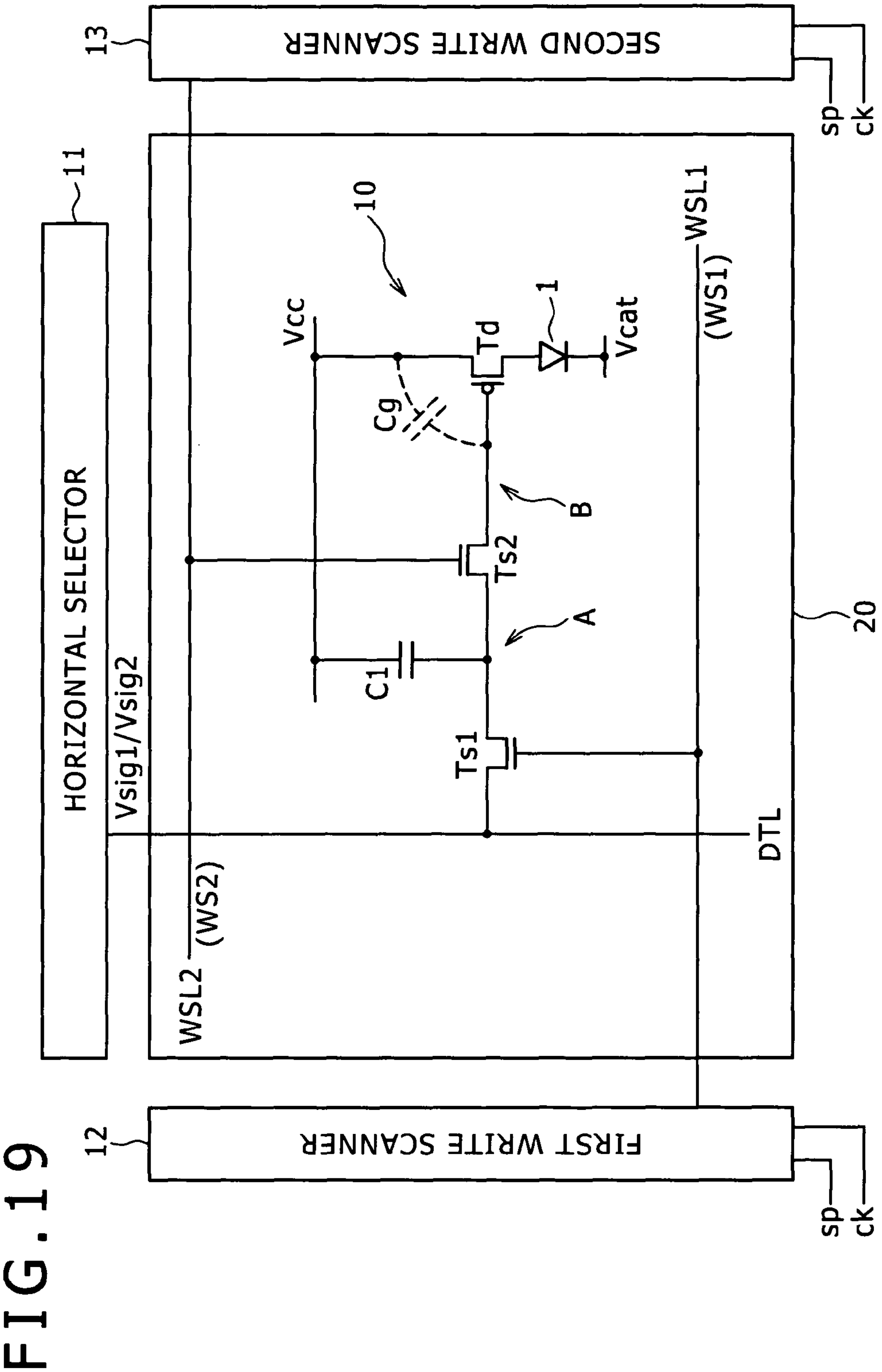
FIG. 19 is a circuit diagram of a pixel circuit according to an eighth embodiment.

A pixel circuit 10 of FIG. 19 is formed by omitting the capacitance C2 from the pixel circuit of FIG. 15 described above. In the case of FIG. 19, a parasitic capacitance Cg between the gate of a driving transistor Td and a fixed power supply Vcc is used in place of the capacitance C2.

Figure 20:
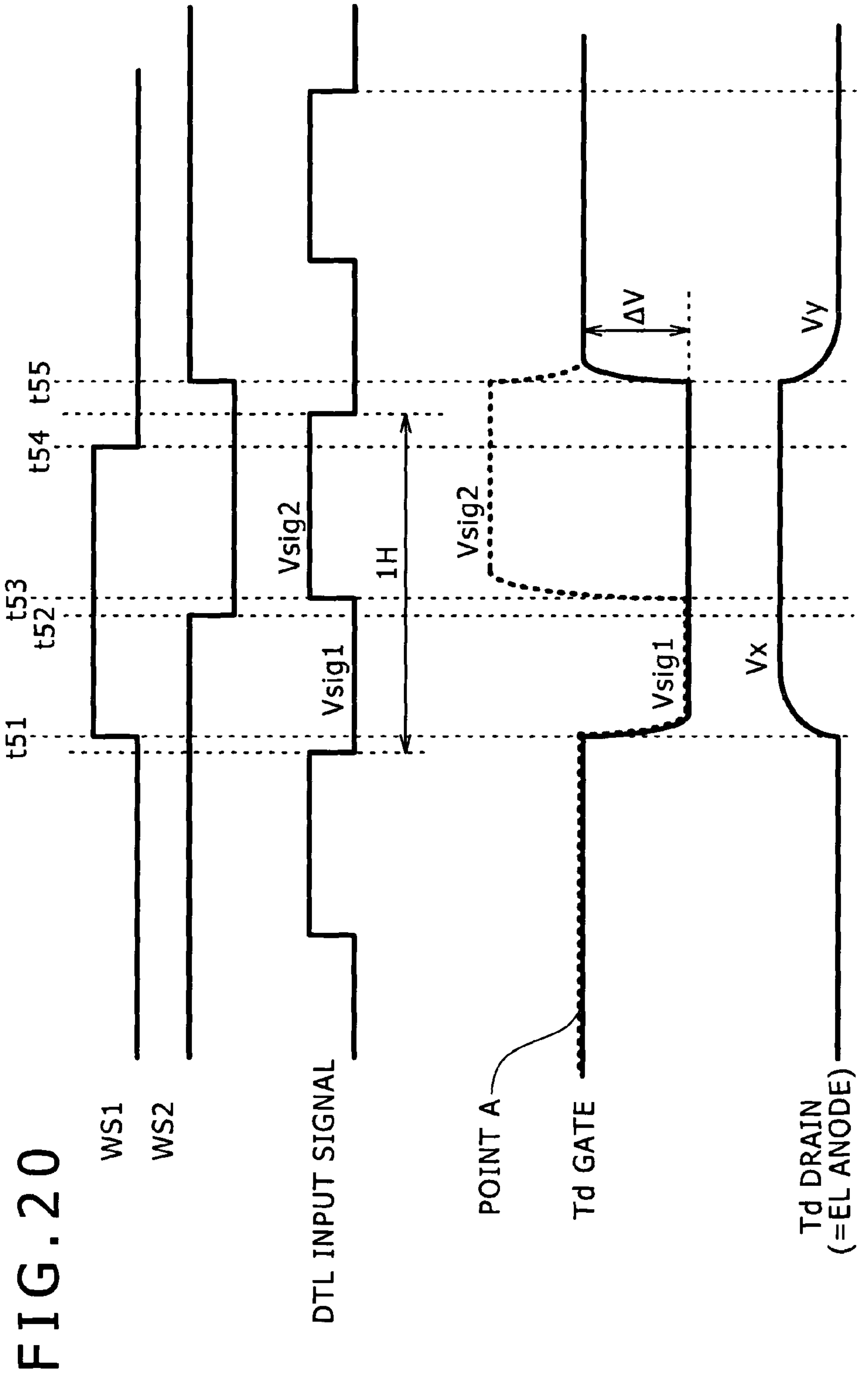
FIG. 20 is a diagram of assistance in explaining operating waveforms according to the eighth embodiment.

Driving waveforms of the pixel circuit are shown in FIG. 20.

Basic operation is similar to that described with reference to FIG. 16. Specifically, in a period in which a horizontal selector 11 supplies a signal value Vsig1 to a signal line DTL, scanning pulses WS1 and WS2 are both set to an H-level to turn on sampling transistors Ts1 and Ts2 at time t51.

The signal value Vsig1 is thereby written to the gate of the driving transistor Td (point B) and point A. With the gate potential of the driving transistor Td becoming the signal value Vsig1, a change occurs in the value of a gate-to-source voltage Vgs, and the anode potential of an organic EL element 1 becomes a potential Vx, as shown in FIG. 20.

Next, at time t52, the scanning pulse WS2 is set to an L-level to turn off the sampling transistor Ts2, and the sampling transistor Ts1 is continued in the on state.

When the horizontal selector 11 outputs a signal value Vsig2 to the signal line DTL at time t53, because only the sampling transistor Ts1 is on, the signal value Vsig2 is written to point A, and the potential of point A changes from the signal value Vsig1 to the signal value Vsig2.

At time t54 after a certain period, the scanning pulse WS1 is set to an L-level to turn off the sampling transistor Ts1.

Thereafter, at time t55, the scanning pulse WS2 is set to an H-level to turn on the sampling transistor Ts2. Then, point A to point B are connected to each other, and the gate of the driving transistor Td is set to Vsig1+ΔV due to capacitive coupling of capacitances C1 and C2.

An amount of voltage change (ΔV) of the gate of the driving transistor Td at this time is a value expressed by the following (Equation 7).

$$\Delta V = \frac{C1}{C1 + Cg}(Vsig2 - Vsig1) \quad \text{[Equation 7]}$$

where "Cg" is a capacitance between the gate of the driving transistor Td and a fixed potential.

As is understood from (Equation 7), the amount of voltage change ΔV is composed of the capacitances C1 and Cg and a difference between the signal values Vsig1 and Vsig2. The gate-to-source potential of the driving transistor Td at this time is Vsig1+ΔV.

This operation changes the gate-to-source voltage Vgs again, so that the anode potential of the organic EL element 1 changes again to become a potential Vy after the passage of a certain time.

Thereafter, the driving transistor Td passes a current shown in the above-described (Equation 1) through the organic EL element 1 according to the gate-to-source voltage Vgs=Vsig1+ΔV in this case, and the organic EL element 1 emits light at a gradation corresponding to Vsig1+ΔV.

In the circuit configuration of FIG. 19, the capacitance C1 is used as a storage capacitor for the gate-to-source voltage. This is because when the parasitic capacitance Cg is lower than the capacitance C1, a leakage current from the sampling transistor Ts1 easily displaces the gate voltage of the driving transistor Td, and thus a defect in image quality may occur.

Thus, as shown in FIG. 20, the sampling transistor Ts2 needs to continue the on state after being capacitively coupled at time t55.

Also in the eighth embodiment, as in the seventh embodiment, it is possible to increase the number of gradations, and achieve high color reproducibility at low cost.

In addition, the capacitance C2 within the pixel can be omitted, so that simplification of the pixel circuit and an increase in yield can be achieved.

2-9 Ninth Embodiment

A ninth embodiment will be described with reference to FIG. 21.

Figure 21:
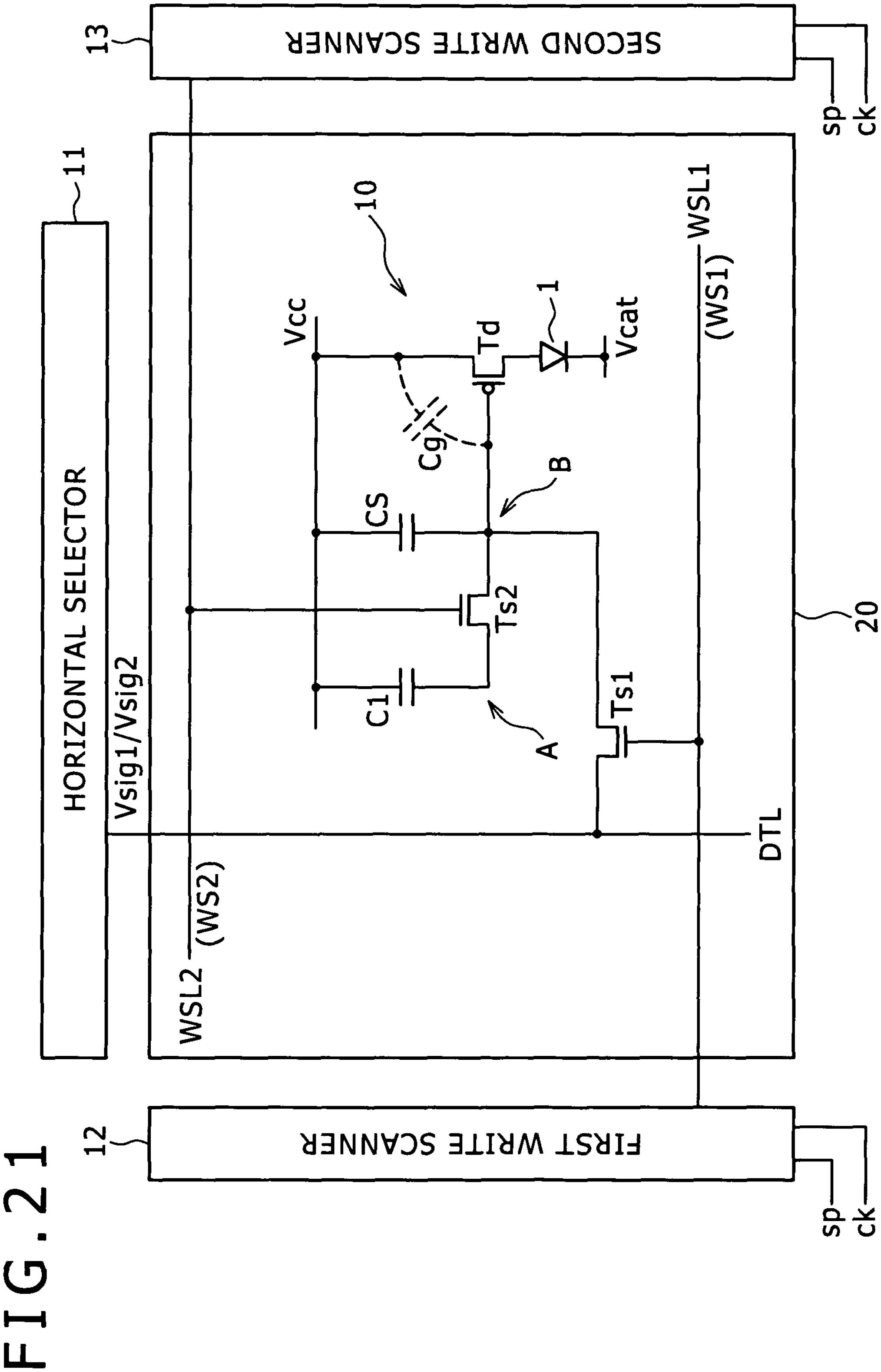
FIG. 21 is a circuit diagram of a pixel circuit according to the ninth embodiment.

A pixel circuit 10 of FIG. 21 is different from the seventh embodiment of FIG. 15 in that a sampling transistor Ts1 is connected to the gate of a driving transistor Td (point B).

Driving waveforms for the pixel circuit 10 are similar to those of FIG. 16.

Specifically, also in this case, sampling transistors Ts1 and Ts2 are turned on in a period in which a horizontal selector 11 supplies a signal value Vsig1 to a signal line DTL. The signal value Vsig1 is thereby written to the gate of the driving transistor Td (point B) and point A.

Next, the sampling transistor Ts2 is turned off, and the sampling transistor Ts1 is continued in the on state. Then the horizontal selector 11 outputs a signal value Vsig2 to the signal line DTL. Thus, the signal value Vsig2 is written to point A, and the potential of point A changes from the signal value Vsig1 to the signal value Vsig2.

Then, the sampling transistor Ts1 is turned off. Thereafter the sampling transistor Ts2 is turned on. Then, point A to point B are connected to each other, and the gate of the driving transistor Td is set to Vsig2+ΔV due to capacitive coupling of capacitances C1 and C2.

An amount of voltage change (ΔV) of the gate of the driving transistor Td at this time is a value expressed by the following (Equation 8).

$$\Delta V = \frac{C1}{C1 + C2 + Cg}(Vsig1 - Vsig2) \qquad \text{[Equation 8]}$$

where "Cg" is obtained by excluding the capacitance C2 from a capacitance between the gate of the driving transistor Td and a fixed potential.

As a result of this operation, Gate-to-Source Voltage Vgs=Signal Value for Display Vsig2+ΔV. The driving transistor Td passes a current shown in the above-described (Equation 1) through an organic EL element 1, and the organic EL element 1 emits light at a gradation corresponding to Vsig2+ΔV.

The ninth embodiment can provide similar effects to those of the seventh embodiment.

2-10 Tenth Embodiment

A tenth embodiment will be described with reference to FIG. 22 and FIG. 23.

The tenth embodiment is an example of application of the present invention to a pixel circuit having a threshold value correcting function.

This pixel circuit 10 has switching transistors T30, T31, and T32 formed by an n-channel TFT and a capacitance C3 in addition to the configuration of FIG. 15 which configuration is formed by the organic EL element 1, the driving transistor Td, the sampling transistors Ts1 and Ts2, and the capacitances C1 and C2.

As a scanning line driving section, controlling scanners 30, 31, and 32 are provided in addition to a first write scanner 12 and a second write scanner 13.

The drain and source of the driving transistor Td formed by a p-channel TFT are connected between the anode of the organic EL element 1 and a power Vcc line via the switching transistor T32.

One end of the capacitance C3 is connected to the gate of the driving transistor Td.

The capacitance C2 is connected between another end of the capacitance C3 (point B) and the power Vcc line.

The capacitance C1 is connected between a point of connection between the sampling transistors Ts1 and Ts2 (point A) and the power Vcc line.

The capacitance C2 forms a storage capacitor for retaining the gate-to-source voltage Vgs of the driving transistor Td. The capacitance C3 is used to retain a threshold voltage Vth.

The drain and source of the sampling transistor Ts1 are connected between point A and a signal line DTL. The drain and source of the sampling transistor Ts2 are connected to point A and point B.

The controlling scanner 30 supplies a controlling pulse P30 to a controlling line L30. The controlling scanner 31 supplies a controlling pulse P31 to a controlling line L31. The controlling scanner 32 supplies a controlling pulse P32 to a controlling line L32. Incidentally, as with the first writing control lines WSL1 and the second writing control lines WSL2 in FIG. 1, controlling lines L30, L31, and L32 are arranged in equal numbers to that of rows of pixel circuits 10 arranged in the form of a matrix in a pixel array 20.

The first write scanner 12 and the second write scanner 13 and the controlling scanners 30, 31, and 32 set the timing of scanning pulses WS1 and WS2 and the controlling pulses P30, P31, and P32 on the basis of a clock ck and a start pulse sp.

The drain and source of the switching transistor T30 are connected between a point of signal value input to the gate node of the driving transistor Td (point B), which point is one end of the capacitance C2, and a fixed reference potential Vofs. The gate of the switching transistor T30 is connected to the controlling line L30. Thus, the switching transistor T30 is conduction-controlled by the controlling pulse P30 from the controlling scanner 30.

The drain and source of the switching transistor T31 are connected between the gate and drain of the driving transistor Td. The gate of the switching transistor T31 is connected to the controlling line L31. Thus, the switching transistor T31 is conduction-controlled by the controlling pulse P31 from the controlling scanner 31.

The drain and source of the switching transistor T32 are connected between the driving transistor Td and the anode of the organic EL element 1. The gate of the switching transistor T32 is connected to the controlling line L32. Thus, the switching transistor T32 is conduction-controlled by the controlling pulse P32 from the controlling scanner 32.

Figure 23:
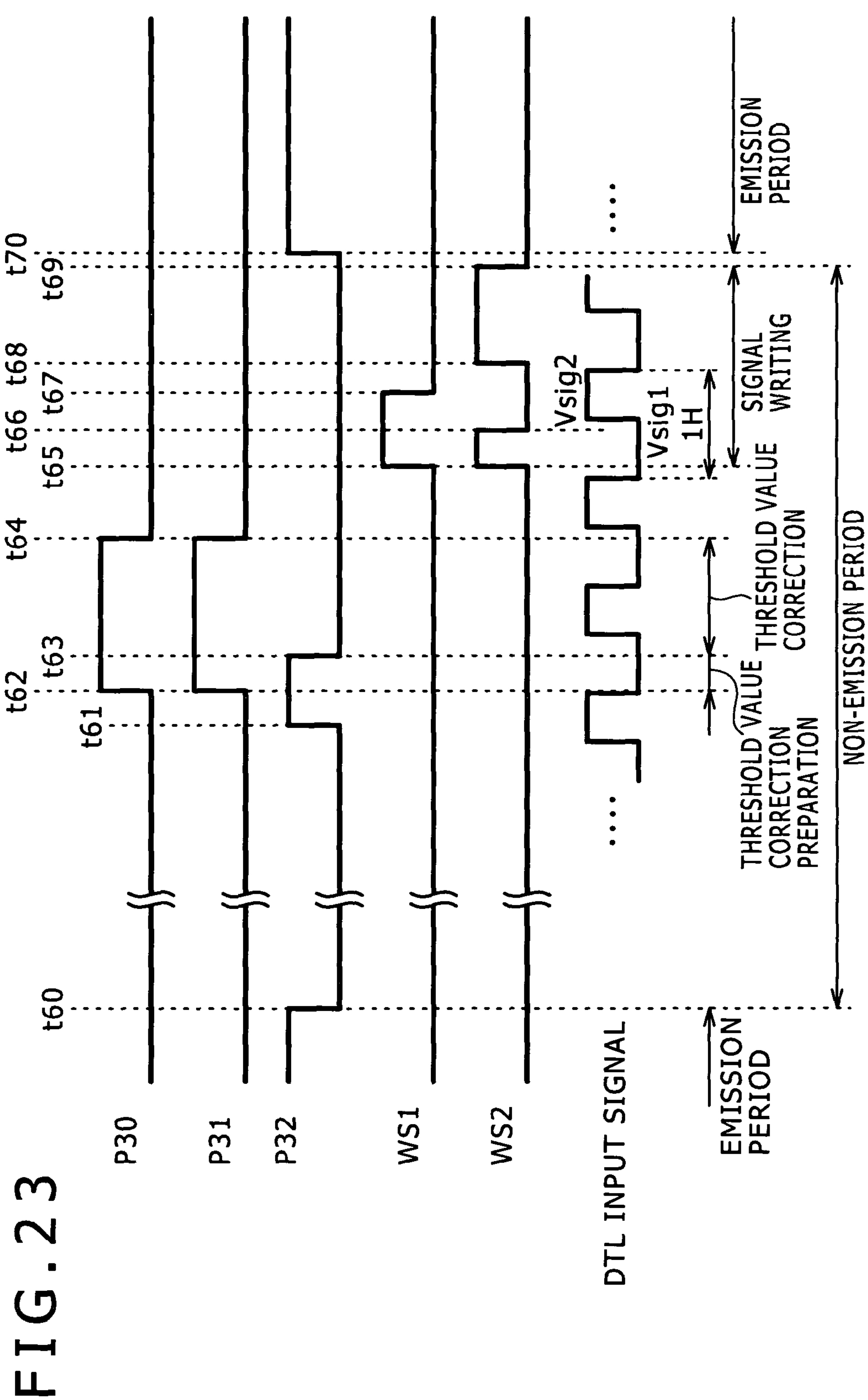
FIG. 23 is a diagram of assistance in explaining operating waveforms according to the tenth embodiment.

FIG. 23 shows driving waveforms for the pixel circuit 10. FIG. 23 shows the controlling pulses P30, P31, and P32, the scanning pulses WS1 and WS2, and a DTL input signal.

Light emission of a previous frame is performed until time t60. An operation for light emission of a present frame after time t70 is performed in a non-emission period from time t60 to time t70.

In an emission period through time t60, the switching transistor T32 is on, and a current corresponding to the gate-to-source voltage of the driving transistor Td is passed through the organic EL element 1.

At time t60, the controlling scanner 32 sets the controlling pulse P32 to an L-level to turn off the switching transistor T32. Thus, the current supplied to the organic EL element 1 is stopped to quench the organic EL element 1.

At time t61, the controlling pulse P32 is set to an H-level to turn on the switching transistor T32. At time t62, the controlling scanners 30 and 31 set the controlling pulses P30 and P31 to an H-level to turn on the switching transistors T30 and T31. Then, threshold value correction preparation is made in a period from time t62 to time t63.

In this period, the switching transistors T30, T31, and T32 are each in an on state, and the potential of a middle point between the capacitances C2 and C3 (point B) rises sharply so as to converge to the reference voltage Vofs.

Meanwhile, the charge of the capacitance C3 is extracted through the switching transistors T31 and T32, and decreases sharply to the anode potential of the organic EL element 1.

That is, a voltage across the capacitance C3 is increased. This operation resets the voltage retained by the capacitance C3.

Next, at time t63, the controlling pulse P32 is set to an L-level to turn off the switching transistor T32. Then, a threshold value correction is made in a period from time t63 to time t64.

Specifically, the drain current of the driving transistor Td in an on state flows into the capacitance C3 via the switching transistor T31. With this, the voltage retained by the capacitance C3 is decreased.

However, the potential of the middle point between the capacitances C2 and C3 (point B) remains the reference voltage Vofs. On the other hand, the gate voltage of the driving transistor Td rises with the decrease in the voltage retained by the capacitance C3.

When a potential difference between the gate voltage and a power supply potential Vcc thereafter rises to the threshold voltage Vth of the driving transistor Td, the current flowing through the driving transistor Td becomes very small. With this, the gate voltage almost stops rising.

The capacitance C3 consequently stores a voltage necessary to correct the threshold voltage Vth inherent in the driving transistor Td functioning as a current driving element.

At time t64, the controlling pulses P30 and P31 are set to an L-level to turn off the switching transistors T30 and T31. Thus, the threshold value correction is completed.

Signal value writing is performed from time t65.

At time t65 at which a horizontal selector 11 is supplying a signal value Vsig1 to the signal line DTL, the scanning pulses WS1 and WS2 are set to an H-level to turn on the sampling transistors Ts1 and Ts2.

Figure 22:
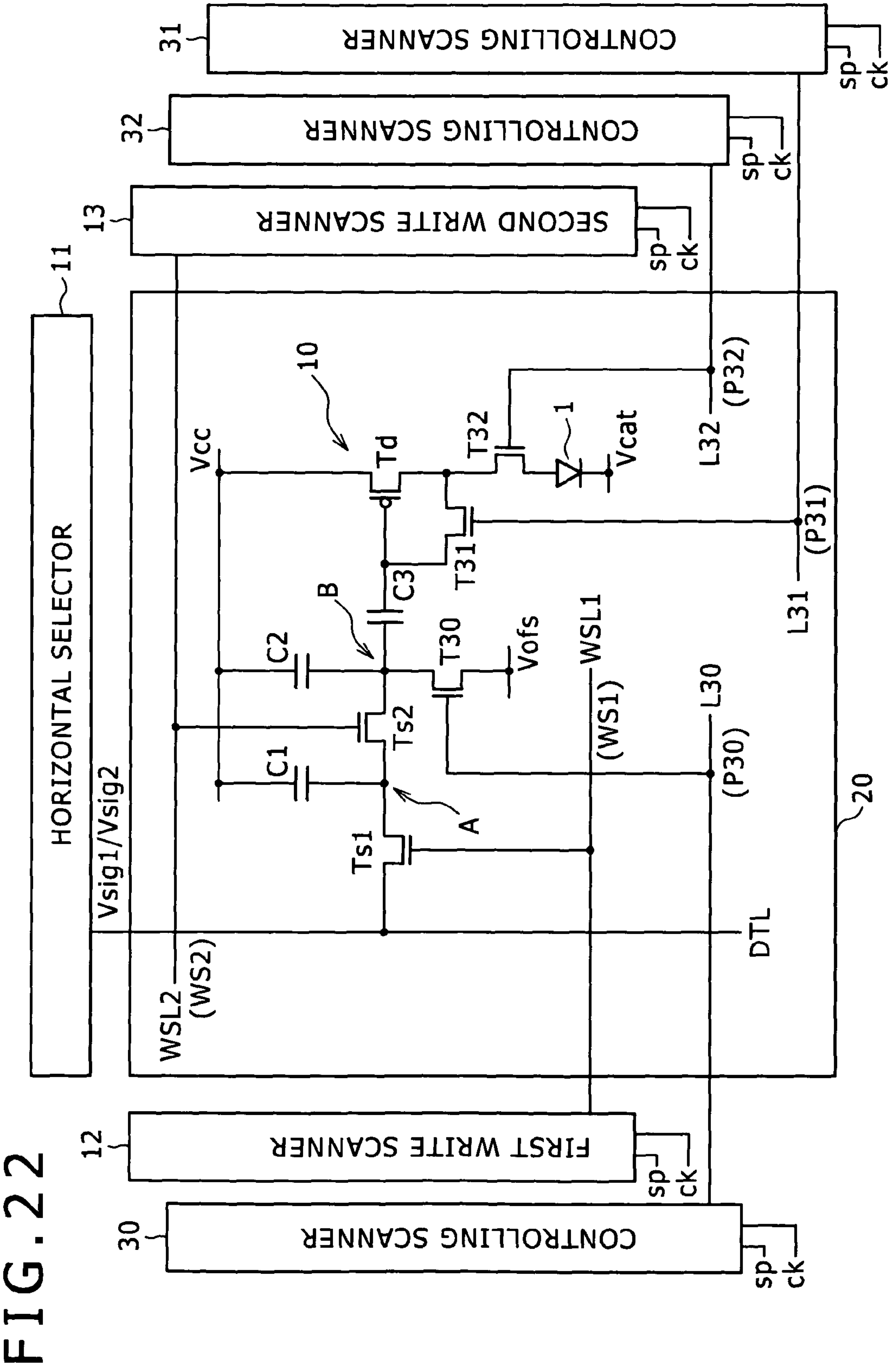
FIG. 22 is a circuit diagram of a pixel circuit according to a tenth embodiment.

The signal value Vsig1 is thereby written to point A and point B in FIG. 22.

Then, at time t66, the scanning pulse WS2 is set to an L-level to turn off the sampling transistor Ts2, and only the sampling transistor Ts1 continues being on. The horizontal selector 11 then supplies a signal value Vsig2 to the signal line DTL. The signal value Vsig2 is thereby input to point A.

At time t67, the scanning pulse WS1 is set to an L-level to turn off the sampling transistor Ts1.

Thereafter, at time t68, the scanning pulse WS2 is set to an H-level to turn on the sampling transistor Ts2. Then, point A to point B are connected to each other, and point B is set to Vsig1+ΔV due to capacitive coupling of the capacitances C1 and C2.

An amount of voltage change (ΔV) input to the gate of the driving transistor Td at this time is a value expressed by the following (Equation 9).

$$\Delta V = \frac{C3}{C3+Cg}\cdot\frac{C1}{C1+C2+\left(\frac{C3Cg}{C3+Cg}\right)}(Vsig2-Vsig1) \quad \text{[Equation 9]}$$

where "Cg" in this case is obtained by excluding the capacitance C3 from a capacitance between the gate of the driving transistor Td and a fixed potential.

Thereafter, the scanning pulse WS2 is set to an L-level to also turn off the sampling transistor Ts2 at time t69. At time t70, the switching transistor T32 is turned on by the controlling pulse P32. The light emission of the organic EL element 1 is thereby started.

In this case, the driving transistor Td passes a current shown in the above-described (Equation 1) through the EL element according to the gate-to-source voltage Vgs=Vsig1+ΔV in this case, and the organic EL element 1 emits light at a gradation corresponding to the signal value for display Vsig1+ΔV. In addition, because the signal value for display Vsig1+ΔV is given with the threshold voltage Vth retained by the capacitance C3 as a reference, a light emitting operation is performed in which effects of variation in the threshold voltage Vth of the driving transistor Td in each pixel are cancelled.

Also in the tenth embodiment, as in the seventh embodiment, it is possible to increase the number of gradations, and achieve high color reproducibility at low cost.

In addition, in this case, a display operation unaffected by variations in threshold voltage Vth can be realized by the threshold value correcting operation.

Incidentally, as an example of modification of the tenth embodiment, a circuit configuration based on the ninth embodiment shown in FIG. 21, that is, a configuration in which one terminal of the sampling transistor Ts1 is connected to point B is also possible.

In addition, while the controlling scanners 30 and 31 are separate scanners in FIG. 22, one scanner may be shared. For example, one controlling scanner 30 and one controlling line L30 may perform conduction control of the switching transistors T30 and T31.

2-11 Eleventh Embodiment

Figure 24:
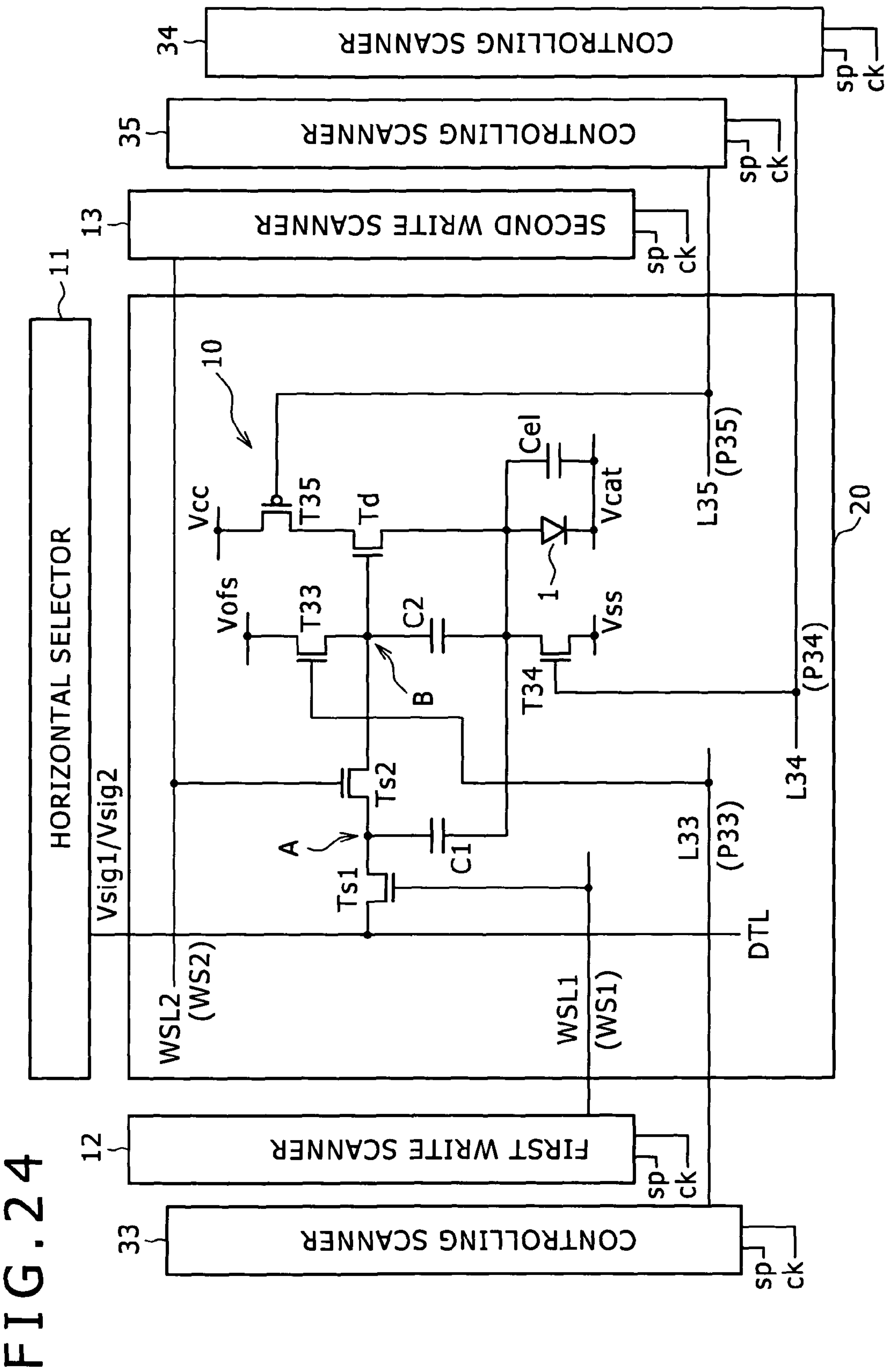
FIG. 24 is a circuit diagram of a pixel circuit according to an eleventh embodiment.

An eleventh embodiment will be described with reference to FIG. 24 and FIG. 25.

The eleventh embodiment is an example in which an n-channel TFT is used as a driving transistor Td and a threshold value correction is made.

A pixel circuit 10 according to the eleventh embodiment includes an organic EL element 1, a driving transistor Td, sampling transistors Ts1 and Ts2, capacitances C1 and C2, and switching transistors T33, T34, and T35. The driving transistor Td, the sampling transistors Ts1 and Ts2, and the switching transistors T33 and T34 are n-channel TFTs. The switching transistor T35 is a p-channel TFT. Incidentally, a capacitance Cel refers to the parasitic capacitance of the organic EL element 1.

As a scanning line driving section, controlling scanners 33, 34, and 35 are also provided in addition to a first write scanner 12 and a second write scanner 13.

The source of the driving transistor Td formed by an n-channel TFT is connected to the anode of the organic EL element 1. The drain of the driving transistor Td is connected to a power Vcc line via the switching transistor T35.

The capacitance C2 is connected between the gate and source of the driving transistor Td.

The capacitance C1 is connected between the source of the driving transistor Td and a point of connection between the sampling transistors Ts1 and Ts2 (point A).

The drain and source of the sampling transistor Ts1 are connected between point A and a signal line DTL.

The drain and source of the sampling transistor Ts2 are connected between point A and the gate of the driving transistor Td (point B).

The controlling scanner 33 supplies a controlling pulse P33 to a controlling line L33. The controlling scanner 34 supplies a controlling pulse P34 to a controlling line L34. The controlling scanner 35 supplies a controlling pulse P35 to a controlling line L35. Incidentally, as with the first writing control lines WSL1 and the second writing control lines WSL2 in FIG. 1, controlling lines L33, L34, and L35 are arranged in equal numbers to that of rows of pixel circuits 10 arranged in the form of a matrix in a pixel array 20.

The first write scanner 12 and the second write scanner 13 and the controlling scanners 33, 34, and 35 set the timing of scanning pulses WS1 and WS2 and the controlling pulses P33, P34, and P35 on the basis of a clock ck and a start pulse sp.

The drain and source of the switching transistor T33 are connected between the gate of the driving transistor Td and a fixed reference potential Vofs. The gate of the switching transistor T33 is connected to the controlling line L33. Thus, the switching transistor T33 is conduction-controlled by the controlling pulse P33 from the controlling scanner 33.

The drain and source of the switching transistor T34 are connected between the source of the driving transistor Td and a fixed potential Vss. The gate of the switching transistor T34 is connected to the controlling line L34. Thus, the switching transistor T34 is conduction-controlled by the controlling pulse P34 from the controlling scanner 34.

The drain and source of the switching transistor T35 are connected between the driving transistor Td and a power supply potential Vcc. The gate of the switching transistor T35 is connected to the controlling line L35. Thus, the switching transistor T35 is conduction-controlled by the controlling pulse P35 from the controlling scanner 35.

Figure 25:
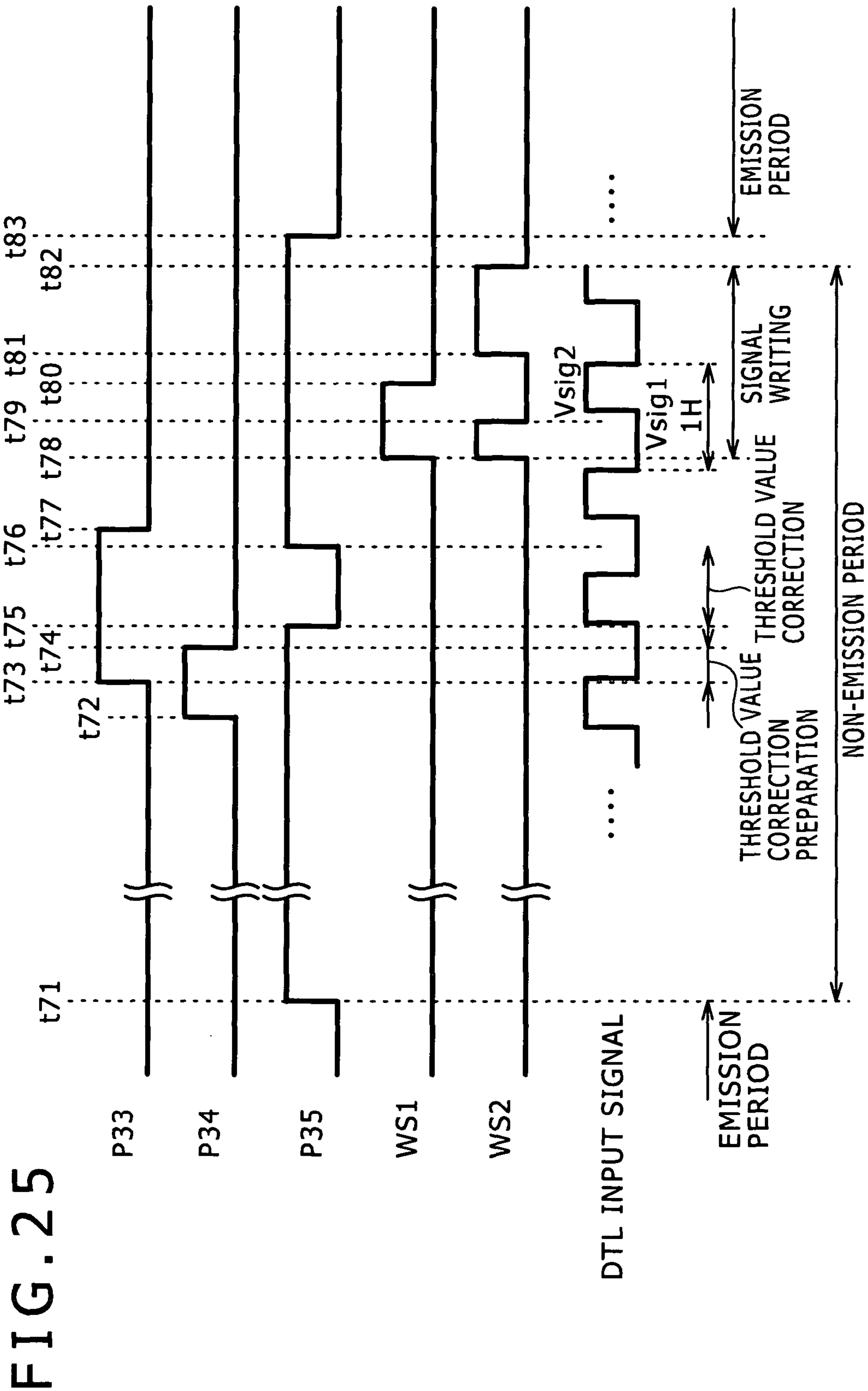
FIG. 25 is a diagram of assistance in explaining operating waveforms according to the eleventh embodiment.

FIG. 25 shows driving waveforms for the pixel circuit 10. FIG. 25 shows the controlling pulses P33, P34, and P35, the scanning pulses WS1 and WS2, and a DTL input signal.

Light emission of a previous frame is performed until time t71. An operation for light emission of a present frame after time t83 is performed in a non-emission period from time t71 to time t83.

In an emission period through time t71, the controlling pulse P35 is at an L-level, and the p-channel switching transistor T35 is on, so that a voltage Vcc is applied to the driving transistor Td. The switching transistors T33 and T34 and the sampling transistors Ts1 and Ts2 are off.

A current corresponding to the gate-to-source voltage of the driving transistor Td is therefore passed through the organic EL element 1 to emit light.

At time t71, the controlling scanner 35 sets the controlling pulse P35 to an H-level to turn off the switching transistor T35. Thus, the current supplied to the organic EL element 1 is stopped to quench the organic EL element 1.

At time t72, the controlling pulse P34 is set to an H-level to turn on the switching transistor T34. At time t73, the controlling scanner 33 sets the controlling pulse P33 to an H-level to turn on the switching transistor T33. Then, threshold value correction preparation is made in a period from time t73 to time t74.

Specifically, by turning on the switching transistor T34, the source potential of the driving transistor Td (anode potential of the organic EL element 1) is lowered to the fixed potential Vss. In addition, by turning on the switching transistor T33, the gate potential of the driving transistor Td (point B) is lowered to the reference potential Vofs. Thereafter, the switching transistor T34 is turned off at time t74. Incidentally, a setting is made such that Vss<Vofs−Vth.

At time t75, the controlling pulse P35 is set to an L-level to turn on the switching transistor T35. A threshold value correction is thereby started.

Because of the setting made such that Vss<Vofs−Vth, the driving transistor Td is in an on state. At this time, the gate-to-source voltage Vgs of the driving transistor Td assumes a value Vofs−Vss, and a current corresponding to the value flows.

As long as the anode potential of the organic EL element 1 is Vel≤Vcat+Vthel (threshold voltage of the organic EL element 1) (the leakage current of the organic EL element 1 is considerably smaller than the current flowing through the driving transistor Td), the capacitances C2 and Cel are charged with the current of the driving transistor Td.

At this time, the switching transistor T34 is off, and the current path of drain current of the driving transistor Td is blocked, so that the voltage Vel applied to the organic EL element 1 rises with time.

After the passage of a certain time, the gate-to-source voltage Vgs of the driving transistor Td assumes the threshold voltage Vth. The voltage Vel applied to the organic EL element 1 at this time is Vel=Vofs−Vth Vcat+Vthel.

Then the threshold voltage Vth of the driving transistor Td as a potential difference appearing between the gate and source of the driving transistor Td is retained by the capacitance C2.

At time t76, the switching transistor T35 is turned off. Thus, the drain current stops flowing to end the threshold value correcting operation. Thereafter, the switching transistor T33 is also turned off at time t77.

Signal value writing is performed from time t78.

At time t78 at which a horizontal selector 11 is supplying a signal value Vsig1 to the signal line DTL, the scanning pulses WS1 and WS2 are set to an H-level to turn on the sampling transistors Ts1 and Ts2. Thus, the signal value Vsig1 is written to point A (capacitance C1) and point B (capacitance C2).

Then, at time t79, the scanning pulse WS2 is set to an L-level to turn off the sampling transistor Ts2, and only the sampling transistor Ts1 continues being on. The horizontal selector 11 then supplies a signal value Vsig2 to the signal line DTL. The signal value Vsig2 is thereby input to point A.

At time t80, the scanning pulse WS1 is set to an L-level to turn off the sampling transistor Ts1.

Thereafter, at time t81, the scanning pulse WS2 is set to an H-level to turn on the sampling transistor Ts2. Then, point A to point B are connected to each other, and point B is set to Vsig1+ΔV due to capacitive coupling of capacitances C1 and C2.

At time t82, the scanning pulse WS2 is set to an L-level to also turn off the sampling transistor Ts2.

Then, at time t83, the switching transistor T35 is turned on by the controlling pulse P35. The light emission of the organic EL element 1 is thereby started.

In this case, the driving transistor Td passes a current shown in the above-described (Equation 1) through the EL element according to the gate-to-source voltage Vgs=Vsig1+ΔV in this case, and the organic EL element 1 emits light at a gradation corresponding to the signal value for display Vsig1+ΔV. In addition, because the signal value for display Vsig1+ΔV is given with the threshold voltage Vth retained between the gate and source of the driving transistor Td as a reference, a light emitting operation is performed in which effects of variation in the threshold voltage Vth of the driving transistor Td in each pixel are cancelled.

Also in the eleventh embodiment, it is possible to increase the number of gradations, and achieve high color reproducibility at low cost.

In addition, in this case, a display operation unaffected by variations in threshold voltage Vth can be realized by the threshold value correcting operation.

Incidentally, as an example of modification of the eleventh embodiment, the sampling transistor Ts1 may be connected between point B, rather than point A, and the signal line DTL.

Figure 26:
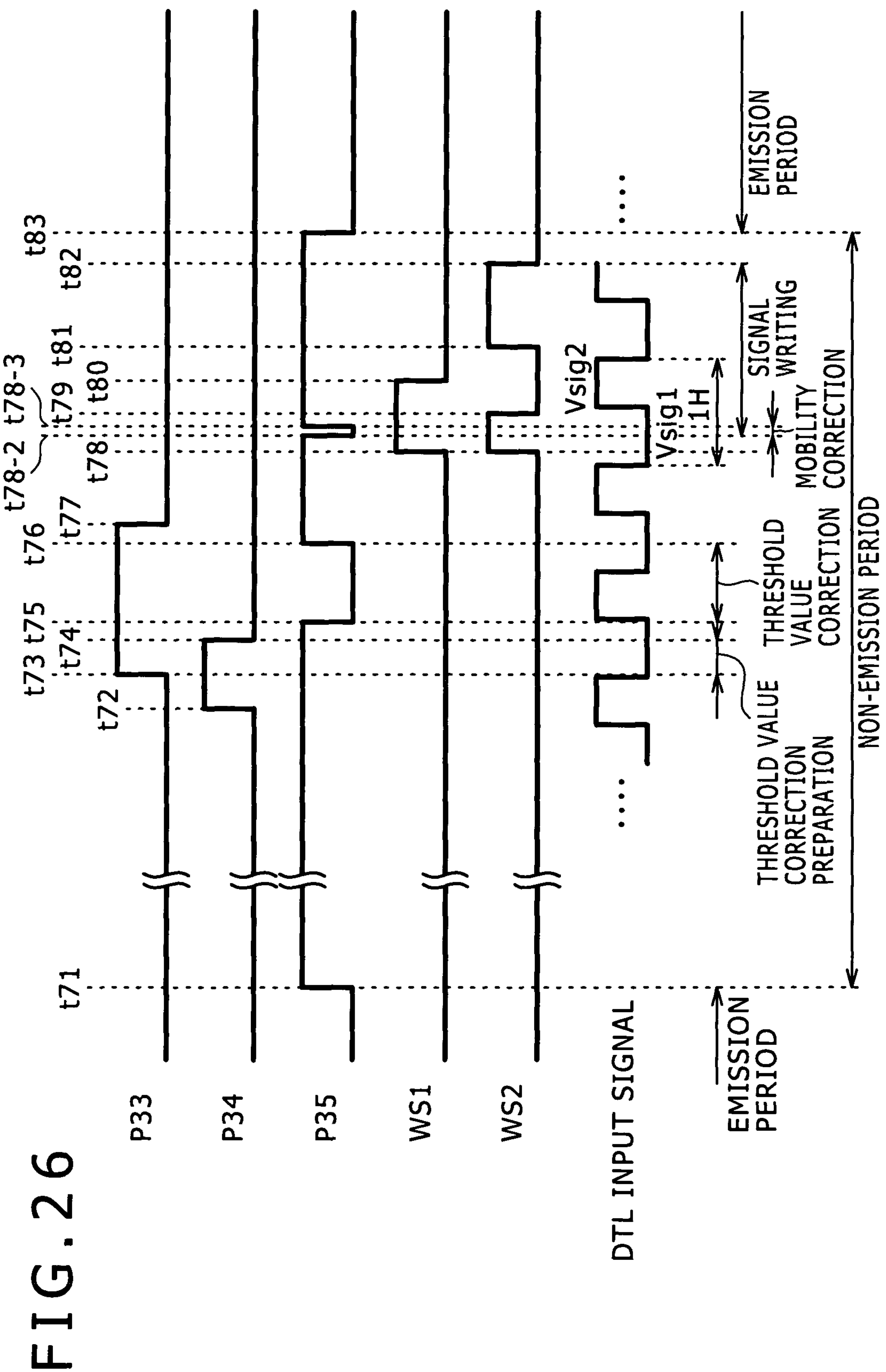
FIG. 26 is a diagram of assistance in explaining operating waveforms according to an example of modification of the eleventh embodiment.

Further, an operation to which a mobility correction as shown in FIG. 26 is added is also considered as an example of modification of a driving system. Operation up to time t78 in FIG. 26 is similar to that of FIG. 25.

In this case, while the sampling transistors Ts1 and Ts2 are on and the signal value Vsig1 is written from time t78, the controlling pulse P35 is set to an L-level to turn on the switching transistor T35 for a period from time t78-2 to time t78-3. Thus, a current is passed from the power supply Vcc, the source voltage of the driving transistor Td is raised, and a mobility correction is made.

Incidentally, the mobility correction may be ended by turning off the sampling transistor Ts2 with the switching transistor T35 in an on state.

By applying such a mobility correction, display can be made without being affected by variations in mobility of the driving transistor Td in each pixel.

Because many gradations can be expressed with a small number of signal gradations also in a pixel circuit having a threshold value correcting function and a mobility correcting function, it is possible to reduce the cost of a signal driver, and achieve high color reproducibility.

2-12 Twelfth Embodiment

A twelfth embodiment will be described with reference to FIGS. 27 to 30.

A pixel circuit 10 according to the twelfth embodiment includes a driving transistor Td formed by an n-channel TFT, sampling transistors Ts1 and Ts2, capacitances C1 and C2, and an organic EL element 1.

In this case, a horizontal selector 11 outputs signal values Vsig1 and Vsig2 and a reference potential Vofs to a signal line DTL in one horizontal period.

As a scanning line driving section, a drive scanner 14 is also provided in addition to a first write scanner 12 and a second write scanner 13.

The drive scanner 14 drives a power supply control line DSL. Incidentally, as with the first writing control lines WSL1 and the second writing control lines WSL2 in FIG. 1, power supply control lines DSL are arranged in an equal number to that of rows of pixel circuits 10 arranged in the form of a matrix in a pixel array 20.

The drive scanner 14 supplies a power supply pulse DS as a power supply voltage changing to two values of a driving potential (Vcc) and an initial potential (Vss) to each power supply control line DSL disposed in the form of a row in synchronism with the line-sequential scanning of the first write scanner 12 and the second write scanner 13.

The source of the driving transistor Td formed by an n-channel TFT is connected to the anode of the organic EL element 1. The drain of the driving transistor Td is connected to the power supply control line DSL.

The capacitance C2 is connected between the gate and source of the driving transistor Td.

The capacitance C1 is connected between the source of the driving transistor Td and a point of connection between the sampling transistors Ts1 and Ts2 (point A).

The drain and source of the sampling transistor Ts1 are connected between point A and a signal line DTL.

The drain and source of the sampling transistor Ts2 are connected between point A and the gate of the driving transistor Td (point B).

Figure 28:
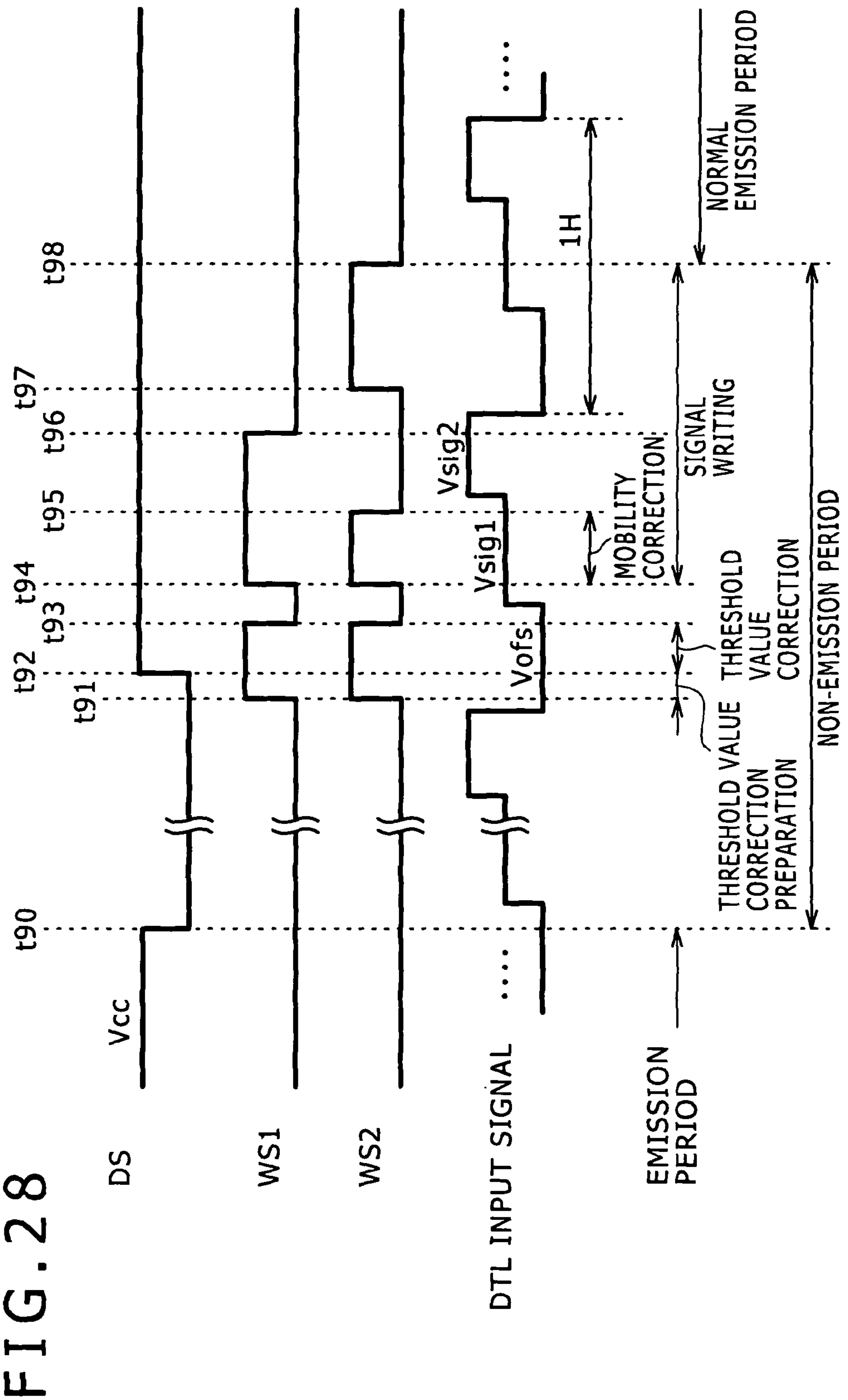
FIG. 28 is a diagram of assistance in explaining operating waveforms according to the twelfth embodiment.

FIG. 28 shows driving waveforms for the pixel circuit 10. FIG. 28 shows the power supply pulse DS, the scanning pulses WS1 and WS2, and a DTL input signal.

First, suppose that the horizontal selector 11 sequentially outputs the reference potential Vofs and the signal values Vsig1 and Vsig2 to the signal line DTL in one horizontal period, as is shown as the DTL input signal in FIG. 28.

Light emission of a previous frame is performed until time t90. An operation for light emission of a present frame after time t98 is performed in a non-emission period from time t90 to time t98.

In an emission period through time t90, Power Supply Pulse DS=Driving Voltage Vcc, and the sampling transistors Ts1 and Ts2 are off.

A current corresponding to the gate-to-source voltage of the driving transistor Td is therefore passed through the organic EL element 1 to emit light.

At time t90 at which the emission period of the previous frame is ended, the drive scanner 14 stops supplying the driving voltage Vcc to the power supply control line DSL, and sets the power supply control line DSL to the initial voltage Vss. Thus, the light emission of the organic EL element 1 is stopped. At this time, the source potential of the driving transistor Td is initialized.

Next, at time t91 at which the horizontal selector 11 supplies the reference potential Vofs to the signal line DTL, as a threshold value correction preparation, the scanning pulses WS1 and WS2 are set to an H-level to make the sampling transistors Ts1 and Ts2 conduct. At this time, the gate potential of the driving transistor Td is fixed at the reference value Vofs. Because the source voltage of the driving transistor Td is fixed at Vss, the gate-to-source voltage Vgs of the driving transistor Td is Vgs=Vofs−Vss.

At time t92, the power supply pulse DS is set to the driving voltage Vcc, and a threshold value correction is started.

At this time, the source voltage rises, and the gate-to-source voltage Vgs becomes a threshold voltage Vth. Thereafter, the scanning pulses WS are set to an L-level at time t93. Thereby the threshold value correction is completed.

Then, signal value writing and mobility correction are performed from time t94.

At time t94 at which the horizontal selector 11 is supplying a signal value Vsig1 to the signal line DTL, the scanning pulses WS1 and WS2 are set to an H-level to turn on the sampling transistors Ts1 and Ts2. An equivalent circuit at this time is shown in FIG. 29A.

At this time, the signal value Vsig1 is written to the gate of the driving transistor Td (point B) and point A.

Incidentally, a current Ids flows from the power supply control line DSL with Power Supply Pulse DS=Vcc at this time. When the current flowing through the organic EL element 1 is sufficiently smaller than the current Ids based on the driving voltage Vcc, that is, when the organic EL element 1 is in an off region, the organic EL element 1 can be regarded as a capacitance Cel. The source voltage of the driving transistor Td therefore rises according to the mobility of the driving transistor Td.

Figure 29B:
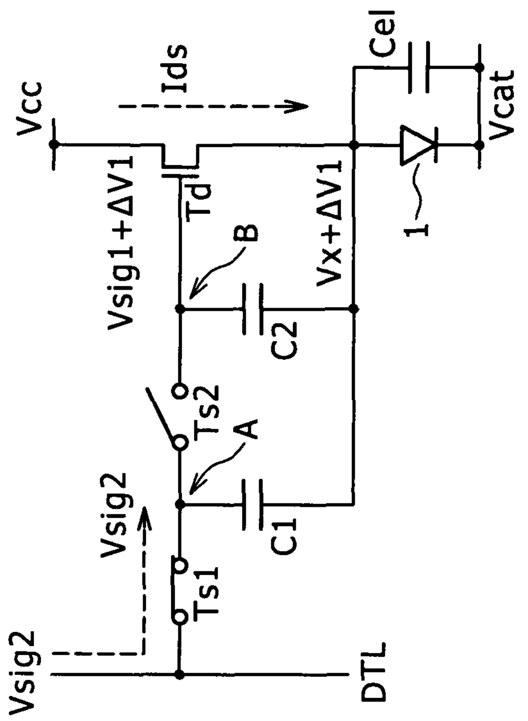
FIGS. 29A and 29B are equivalent circuit diagrams of operation according to the twelfth embodiment.
Figure 29A:
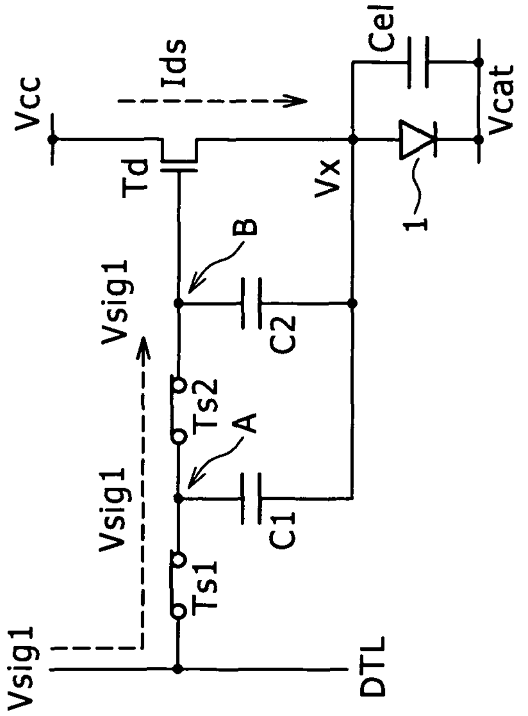

The source voltage of the driving transistor Td when the sampling transistor Ts2 is turned off after the passage of a certain time (time t95) is Vx, as shown in FIG. 29A.

After completion of the mobility correction, at time t95, the scanning pulse WS2 is set to an L-level to turn off the sampling transistor Ts2, and only the sampling transistor Ts1 continues being on.

As shown in FIG. 29B, the horizontal selector 11 supplies a signal value Vsig2 to the signal line DTL in this state. The signal value Vsig2 is thereby input to point A.

At this time, the gate of the driving transistor Td is in a floating state, and the gate potential changes according to change in source potential. Specifically, when the source voltage of the driving transistor Td is changed by a voltage ΔV1 by the current Ids, the gate potential is Vsig1+ΔV1.

Further, at time t96 after the passage of a certain time, the scanning pulse WS1 is set to an L-level to turn off the sampling transistor Ts1. Thus, as shown in FIG. 30A, an end of connection between the capacitance C1 and the sampling transistor Ts1 (point A) changes according to change in source potential of the driving transistor Td. When the source voltage of the driving transistor Td becomes Vx+ΔV1+ΔV2, point A changes to Vsig2+ΔV2, and the gate of the driving transistor Td changes to Vsig1+ΔV1+ΔV2.

Figure 30B:
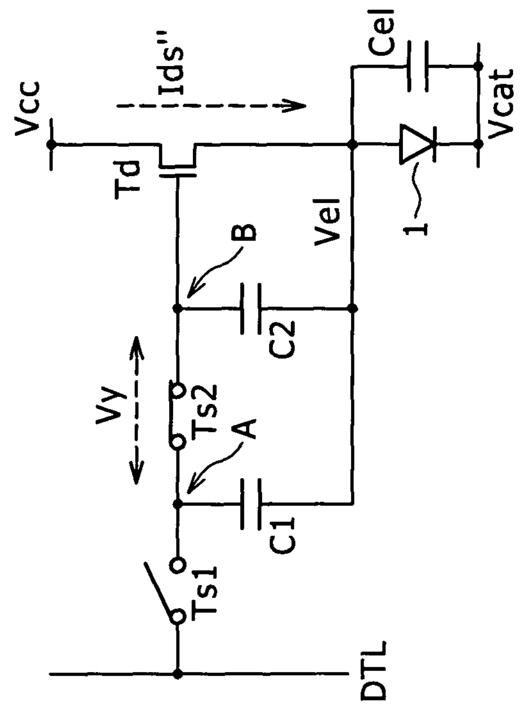
FIGS. 30A and 30B are equivalent circuit diagrams of operation according to the twelfth embodiment.
Figure 30A:
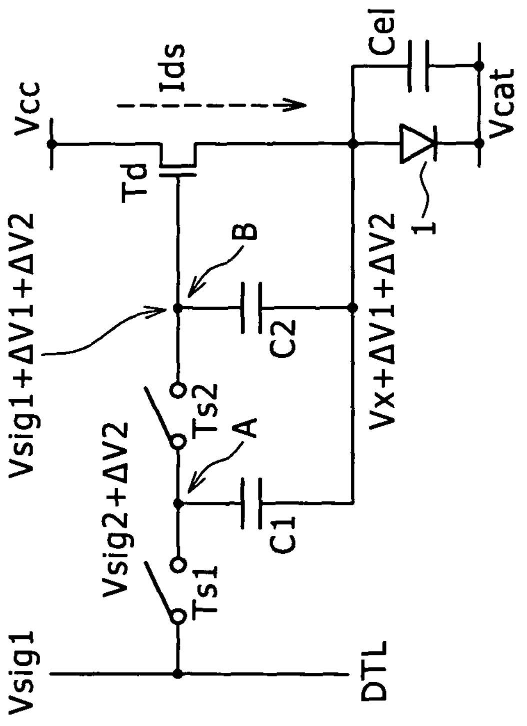

Finally, at time t97, the sampling transistor Ts2 is turned on again to change the gate potential of the driving transistor Td by capacitive coupling (FIG. 30B). Thus, the gate voltage of the driving transistor Td becomes a potential Vy, and the source voltage of the driving transistor Td becomes a potential Vel. After time t98, light is emitted at a gradation corresponding to a signal value for display on the basis of a current Ids" corresponding to the gate-to-source voltage Vgs of the driving transistor Td.

Also in the twelfth embodiment, it is possible to increase the number of gradations, and achieve high color reproducibility at low cost. In addition, a display operation unaffected by variations in threshold voltage Vth or mobility can be realized by the threshold value correcting operation and the mobility correcting operation.

Figure 27:
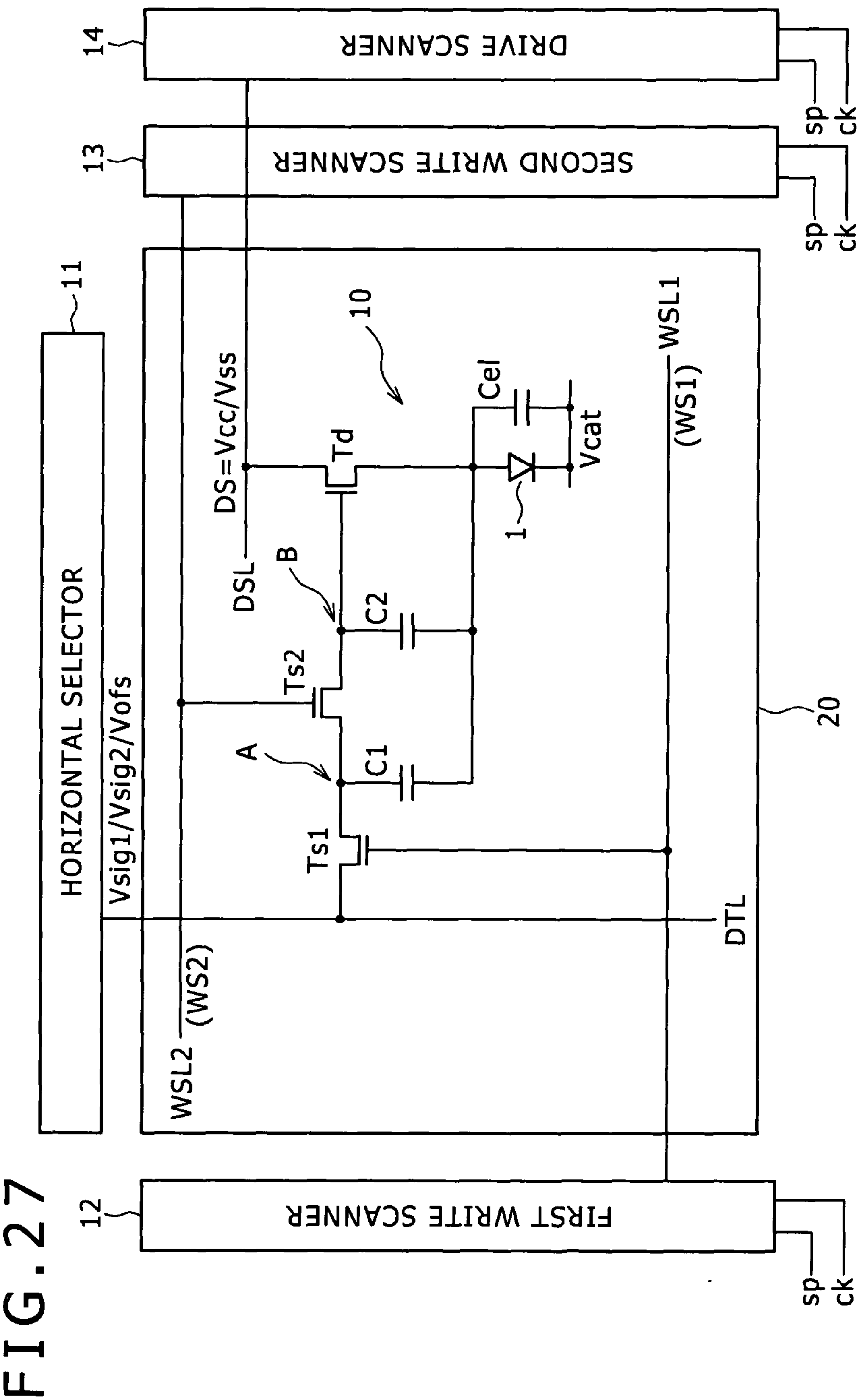
FIG. 27 is a circuit diagram of a pixel circuit according to a twelfth embodiment.

Further, in the pixel circuit configuration of FIG. 27, the driving transistor Td and the sampling transistors Ts1 and Ts2 are all formed by an n-channel type TFT. Therefore an existing amorphous silicon (a-Si) process can be used in TFT creation, which is advantageous in reducing the cost of a TFT substrate and increasing screen size.

Incidentally, as an example of modification of the twelfth embodiment, the sampling transistor Ts1 may be connected between point B, rather than point A, and the signal line DTL.

3. Example of Application to Liquid Crystal Display Device

3-1 Thirteenth Embodiment

An embodiment as a liquid crystal display device will next be described.

Figure 31:
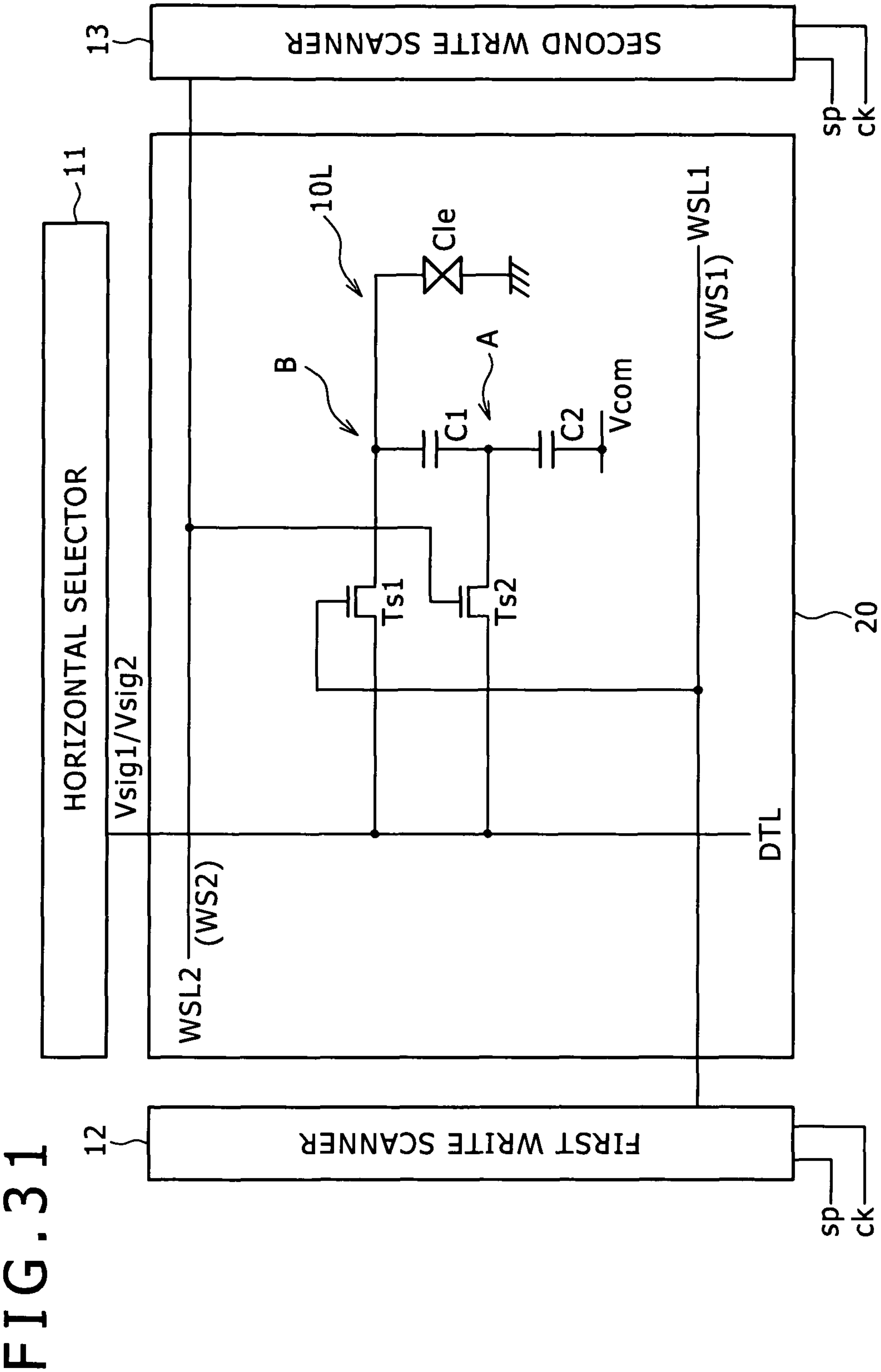
FIG. 31 is a circuit diagram of a pixel circuit according to a thirteenth embodiment.

FIG. 31 shows a configuration of the thirteenth embodiment. A general configuration of the display device is basically the same as in FIG. 1.

A horizontal selector 11 is provided as a signal line driving section for a liquid crystal pixel circuit 10L. The horizontal selector 11 outputs signal values Vsig1 and Vsig2 to a signal line DTL in one horizontal period.

In addition, a first write scanner 12 and a second write scanner 13 are provided as a scanning line driving section.

The liquid crystal pixel circuit 10L includes sampling transistors Ts1 and Ts2 formed by an n-channel TFT, capacitances C1 and C2, and a liquid crystal element Cle.

The capacitance C1 has one end connected to a point of input of a signal value for display to the liquid crystal element Cle (point B). The capacitances C1 and C2 are connected in series with each other between the point of input of the signal value for display to the liquid crystal element Cle (point B) and a common electrode Vcom.

The sampling transistor Ts1, which is a first switch element, is connected between one end of the capacitance C1 and the signal line DTL. The gate of the sampling transistor Ts1 is conduction-controlled by the potential (WS1) of a writing control line WSL1, which is a first scanning line.

The sampling transistor Ts2, which is a second switch element, is connected between another end of the capacitance C1 (point A as a point of connection between the capacitances C1 and C2) and the signal line DTL. The gate of the sampling transistor Ts2 is conduction-controlled by the potential (WS2) of a writing control line WSL2, which is a second scanning line.

While the signal value Vsig1 is output to the signal line DTL, the first write scanner 12 and the second write scanner 13 make the sampling transistors Ts1 and Ts2 conduct to input the signal value Vsig1 to both ends of the capacitance C1. Further, when the signal value Vsig2 is output to the signal line DTL, the first write scanner 12 and the second write scanner 13 make only the sampling transistor Ts2 conduct to input the signal value Vsig2 to point A. Thereby a signal value for display resulting from synthesis of the signal values Vsig1 and Vsig2 is obtained at the input point (point B).

Figure 32A:
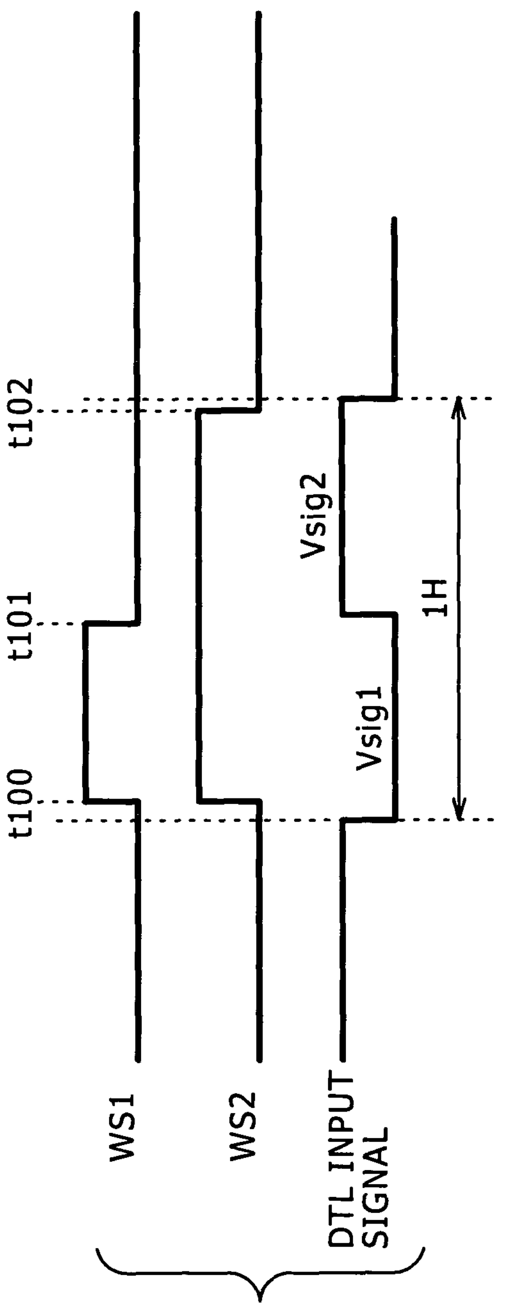
FIGS. 32A and 32B are diagrams of assistance in explaining operating waveforms according to the thirteenth embodiment, a fourteenth embodiment, and a fifteenth embodiment.

FIG. 32A shows operating control waveforms.

Figure 32B:
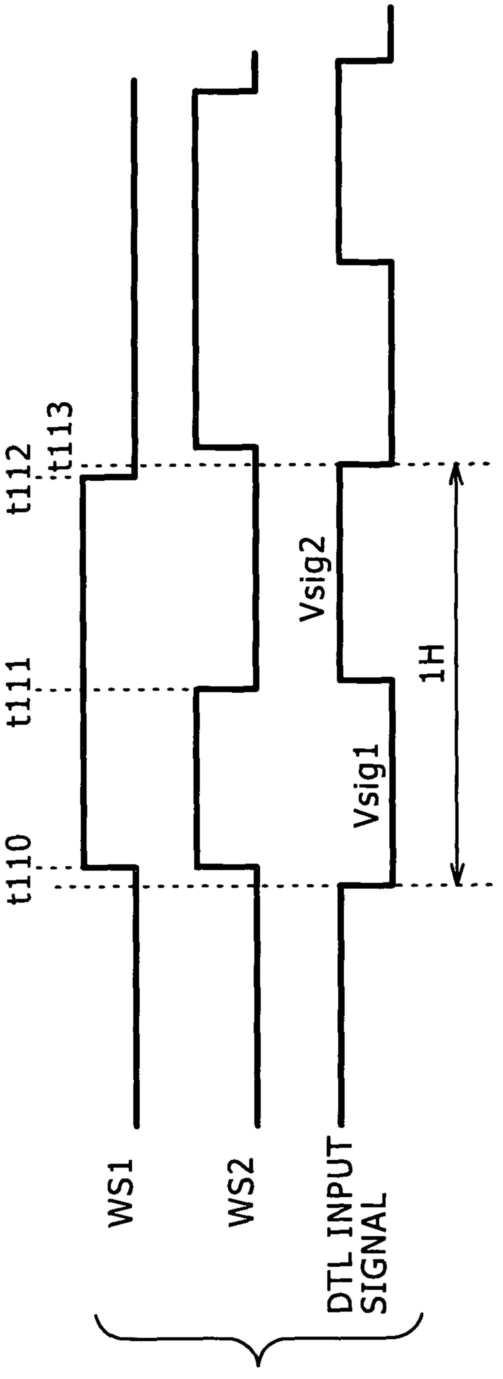

FIGS. 32A and 32B show scanning pulses WS1 and WS2 supplied to the writing control lines WSL1 and WSL2 by the first write scanner 12 and the second write scanner 13. FIGS. 32A and 32B also show a signal value voltage supplied as a DTL input signal to the signal line DTL by the horizontal selector 11.

Display of a previous frame is performed until time t100.

Operation for display of a present frame is performed from time t100.

In a period in which the horizontal selector 11 supplies the potential of the signal value Vsig1 to the signal line DTL, the scanning pulses WS1 and WS2 are both set to an H-level to turn on the sampling transistors Ts1 and Ts2 at time t100.

The signal value Vsig1 is thereby written to point A and point B.

Next, at time t101, the scanning pulse WS1 is set to an L-level to turn off only the sampling transistor Ts1, and the sampling transistor Ts2 is continued in the on state.

Thus, when the horizontal selector 11 outputs the signal value Vsig2 to the signal line DTL, the signal value Vsig2 is written to point A, and the potential of point A changes from the signal value Vsig1 to the signal value Vsig2. Then, an amount of the variation is input to point B via the capacitance C1.

The amount of voltage change (ΔV) of point B at this time is a value expressed by the following (Equation 10).

$$\Delta V = \frac{C1}{C1 + Clc + Cg}(Vsig2 - Vsig1) \qquad \text{[Equation 10]}$$

where "Clc" is the capacitance of the liquid crystal element Cle, and "Cg" is a capacitance excluding the capacitances C1 and Clc, as a capacitance as seen from point B.

As is understood from (Equation 10), the amount of voltage change ΔV is composed of the capacitances C1, Clc, and Cg and a difference between the signal values Vsig1 and Vsig2. A potential applied to the liquid crystal element Cle is Vsig1+ΔV.

This operation controls the transmittance of the liquid crystal element Cle according to the signal value for display Vsig1+ΔV. The liquid crystal pixel circuit 10L makes display at a gradation corresponding to the signal value for display Vsig1+ΔV.

As described above, the present example also generates a signal voltage reflecting a gradation within a pixel using capacitive coupling. It is therefore possible to express many gradations with a small number of gradations of signal values, reduce the cost of the signal driver, and achieve high color reproducibility.

In addition, the voltage of one gradation can be expressed by the values of relatively large signal values Vsig2 and Vsig1. Thus, even when the number of gradations is increased, a maximum signal voltage does not need to be raised, and the cost of the signal driver can be reduced.

3-2 Fourteenth Embodiment

Figure 33:
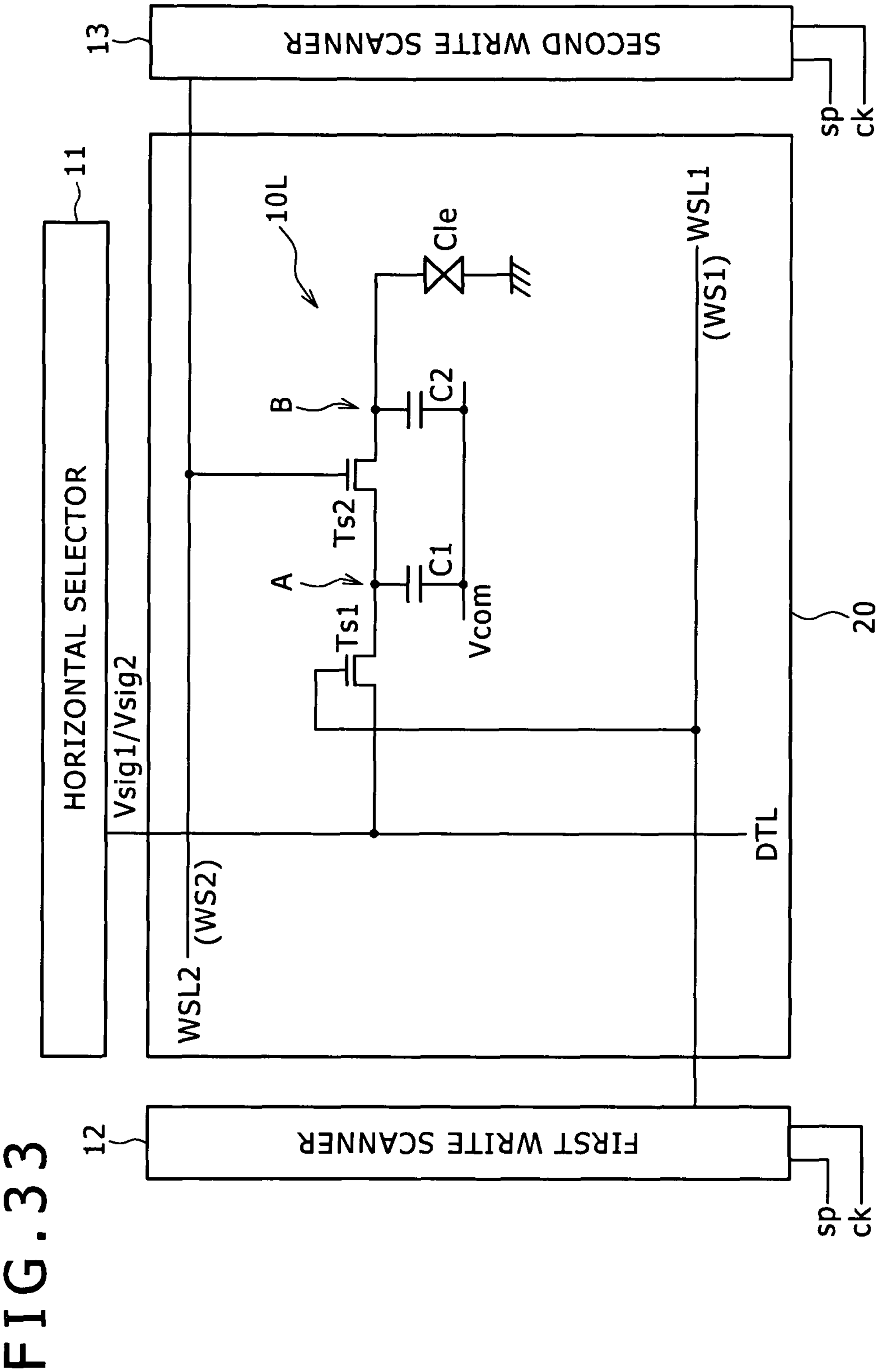
FIG. 33 is a circuit diagram of a pixel circuit according to the fourteenth embodiment.

A fourteenth embodiment is shown in FIG. 33.

A liquid crystal pixel circuit 10L in the present example also includes sampling transistors Ts1 and Ts2 formed by an n-channel TFT, capacitances C1 and C2, and a liquid crystal element Cle.

The sampling transistor Ts1 as a first switch element has one end connected to a signal line DTL, and has a gate connected to a first scanning line (writing control line WSL1). The sampling transistor Ts1 is conduction-controlled by the potential (WS1) of the writing control line WSL1.

The sampling transistor Ts2 as a second switch element has one end and another end connected to point B, which is a point of input of a signal value for display to the liquid crystal element Cle, and another end of the sampling transistor Ts1, respectively. The gate of the sampling transistor Ts2 is connected to a second scanning line (writing control line WSL2). The sampling transistor Ts2 is conduction-controlled by the potential (WS2) of the writing control line WSL2.

The capacitance C1 is connected between a point of connection between the sampling transistors Ts1 and Ts2 (point A) and a common electrode Vcom.

The capacitance C2 is connected between point B and the common electrode Vcom.

While a signal value Vsig1 is output to the signal line DTL, a first write scanner 12 and a second write scanner 13 make the sampling transistors Ts1 and Ts2 conduct to input the signal value Vsig1 to one end of the capacitance C1 (point A) and one end of the capacitance C2 (point B).

Next, when a signal value Vsig2 is output to the signal line DTL, the first write scanner 12 and the second write scanner 13 make only the sampling transistor Ts1 conduct to input the signal value Vsig2 to point A. Thereafter only the sampling transistor Ts2 is made to conduct to connect one end of the capacitance C1 (point A) and one end of the capacitance C2 (point B) to each other. Thus, a signal value for display resulting from synthesis of the signal values Vsig1 and Vsig2 is obtained at point B as an input point.

FIG. 32B shows operating control waveforms.

Display of a previous frame is performed until time t110.

Operation for display of a present frame is performed from time t110.

In a period in which the horizontal selector 11 supplies the potential of the signal value Vsig1 to the signal line DTL, the scanning pulses WS1 and WS2 are both set to an H-level to turn on the sampling transistors Ts1 and Ts2 at time t110.

The signal value Vsig1 is thereby written to point A and point B.

Next, at time till, the scanning pulse WS2 is set to an L-level to turn off only the sampling transistor Ts2, and the sampling transistor Ts1 is continued in the on state.

Thus, when the horizontal selector 11 outputs the signal value Vsig2 to the signal line DTL, the signal value Vsig2 is written to point A, and the potential of point A changes from the signal value Vsig1 to the signal value Vsig2.

Thereafter, the sampling transistor Ts1 is turned off at time t112. The sampling transistor Ts2 is turned on at time t113.

Thus the voltage of point B applied to the liquid crystal can be changed by capacitive coupling.

An amount of voltage change (ΔV) of point B at this time is a value expressed by the following (Equation 11).

$$\Delta V = \frac{C1}{C1 + Clc + C2}(Vsig2 - Vsig1) \quad \text{[Equation 11]}$$

As is understood from (Equation 11), the amount of voltage change ΔV is composed of the capacitances C1, C2, Clc, and Cg and a difference between the signal values Vsig1 and Vsig2. A potential applied to the liquid crystal element Cle is Vsig1+ΔV.

This operation controls the transmittance of the liquid crystal element Cle according to the signal value for display Vsig1+ΔV. The liquid crystal pixel circuit 10L makes display at a gradation corresponding to the signal value for display Vsig1+ΔV.

Thus, effects similar to those of the foregoing thirteenth embodiment are obtained.

3-3 Fifteenth Embodiment

Figure 34:
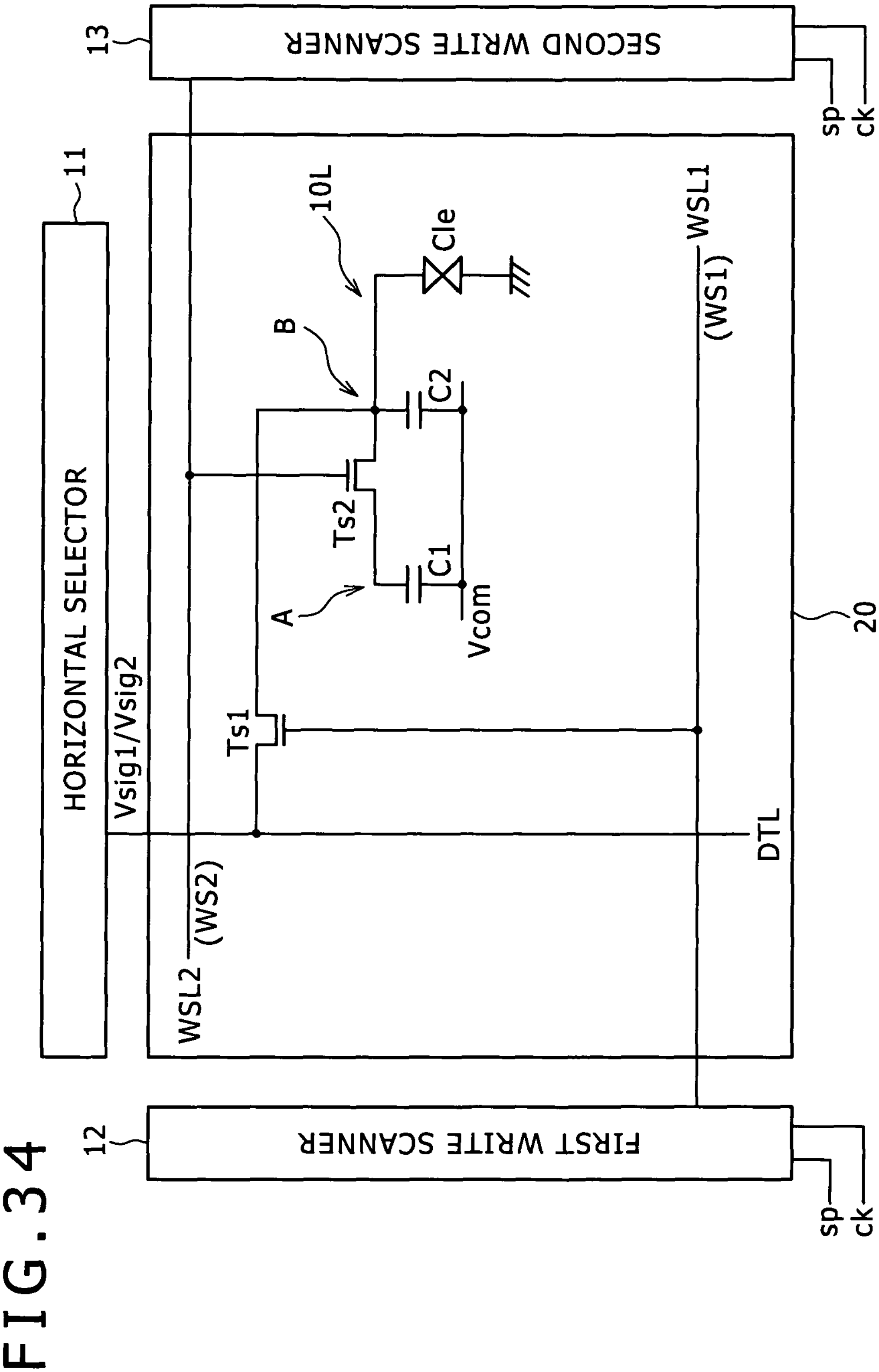
FIG. 34 is a circuit diagram of a pixel circuit according to the fifteenth embodiment.
Figure 35:
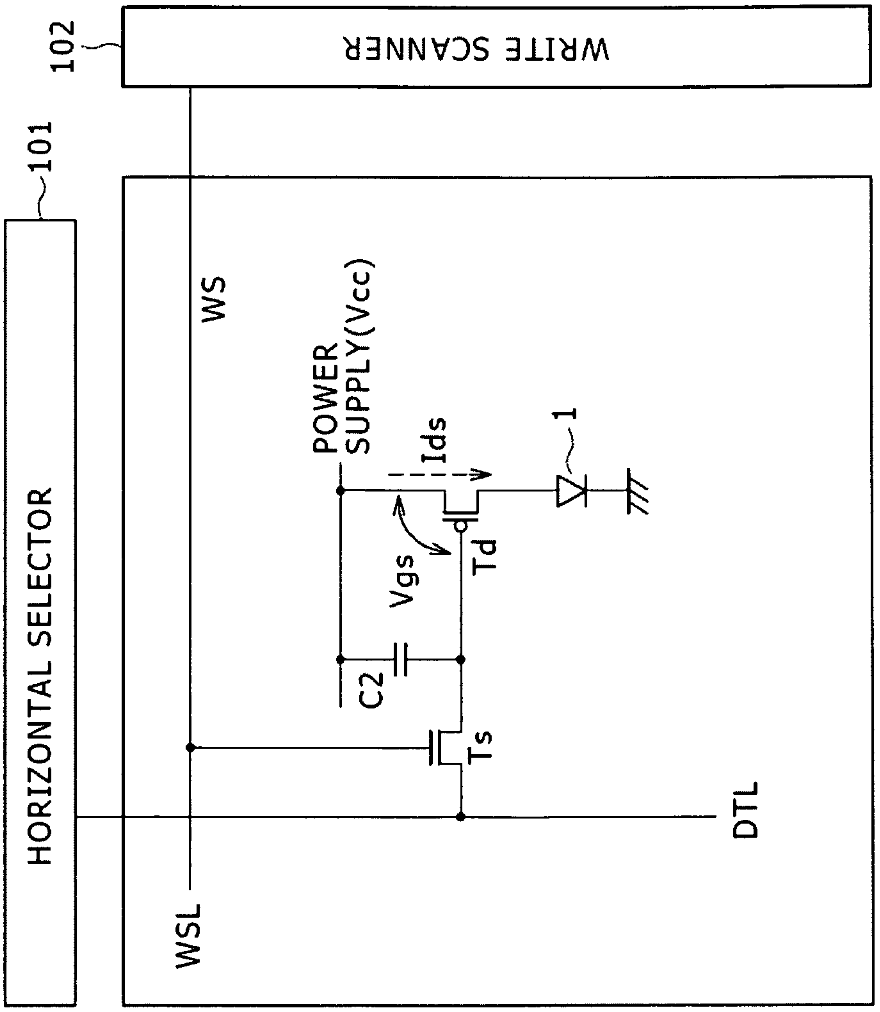
RELATED ART FIG.35
FIG. 35 is a circuit diagram of an existing pixel circuit.

A fifteenth embodiment is shown in FIG. 34.

A pixel circuit 10 of FIG. 34 is different from the fourteenth embodiment of FIG. 33 in that a sampling transistor Ts1 is connected to point B.

Driving waveforms for a liquid crystal pixel circuit 10L are similar to those of FIG. 32B.

In this case, while a signal value Vsig1 is output to a signal line DTL, a first write scanner 12 and a second write scanner 13 make sampling transistors Ts1 and Ts2 conduct to input the signal value Vsig1 to one end of a capacitance C1 (point A) and one end of a capacitance C2 (point B).

Next, when a signal value Vsig2 is output to the signal line DTL, the first write scanner 12 and the second write scanner 13 make only the sampling transistor Ts1 conduct to input the signal value Vsig2 to point B. Thereafter only the sampling transistor Ts2 is made to conduct to connect one end of the capacitance C1 (point A) and one end of the capacitance C2 (point B) to each other. Thereby a signal value for display resulting from synthesis of the signal values Vsig1 and Vsig2 is obtained at point B as an input point.

The fifteenth embodiment also provides similar effects to those of the foregoing thirteenth and fourteenth embodiments.

4. Examples of Modification

While various embodiments have been described above, the present invention is susceptible of more various examples of modification.

For example, while each embodiment has been described supposing that two signal values Vsig1 and Vsig2 are output in one horizontal period, it is possible to output three or more signal values within one horizontal period. That is, when a signal value for display is generated by synthesizing three or more signal values within a pixel circuit, display of still finer gradations can be achieved even with a small number of output gradations of a signal driver.

The present application contains subject matter related to that disclosed in Japanese Priority Patent Application JP 2009-115197 filed in the Japan Patent Office on May 12, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A display device comprising:

a pixel circuit that includes at least one capacitive component and at least one switching component;

a signal line disposed in a form of a column on a pixel array where the pixel array is arranged in a form of a matrix;

at least one scanning line disposed in a form of a row on the pixel array;

a signal line driving section configured to output a plurality of signal potentials to the signal line within one horizontal period, each respective value of the plurality of signal potentials being variably selected from among a plurality of potential values based on an input video signal; and a scanning line driving section configured to cause the at least one switching component of the pixel circuit to sequentially introduce each of the plurality of signal potentials into the capacitive component of the pixel circuit within the one horizontal period by driving the at least one scanning line, wherein the pixel circuit is configured such that the plurality of signal potentials that are sequentially input to the capacitive component are synthesized, thereby generating a display value, the display value corresponding to the value of one of the plurality of signal potentials plus a change amount, the change amount being proportional to a difference between respective values of at least two of the plurality of signal potentials, and the pixel circuit is configured to display at a gradation corresponding to the display value, wherein the plurality of signal potentials includes at least a first signal potential and a second signal potential, values of both the first and second signal potentials being variably selected based on an input video signal, and the pixel circuit generates the display value by synthesizing the first signal potential and the second signal potential input within the one horizontal period, the display value corresponding to the value of the first signal potential plus the change amount, the change amount being proportional to a difference between the value of the first signal potential and the value of the second signal potential multiplied by a constant corresponding to a ratio between capacitances present within the pixel circuit.

2. The display device according to claim 1, wherein said pixel circuit includes:

a light emitting element;

a driving transistor for applying a current corresponding to said signal value for display, said signal value for display being input to the driving transistor, to said light emitting element;

a first switch element having one end connected to said signal line, and conduction-controlled by a potential of a first scanning line;

a first capacitance;

a second capacitance having one end as a point of input of said signal value for display to a gate node of said driving transistor; and a second switch element having one end and another end each connected between one end of said first capacitance and the one end of said second capacitance, one of said one end and said other end of the second switch element being connected to another end of said first switch element, and the second switch element being conduction-controlled by a potential of a second scanning line; and when said first signal value is output to said signal line, said scanning line driving section makes said first switch element and said second switch element conduct to input said first signal value to the one end of said first capacitance and the one end of said second capacitance, when said second signal value is next output to said signal line, said scanning line driving section makes only said first switch element conduct to input said second signal value to one of the one end of said first capacitance and the one end of said second capacitance, and then said scanning line driving section makes only said second switch element conduct to connect the one end of said first capacitance and the one end of said second capacitance to each other, whereby said signal value for display resulting from synthesis of said first signal value and said second signal value is obtained at said input point.

3. The display device according to claim 2, wherein the other end of said first switch element is connected to the one end of said first capacitance, and when said first signal value is output to said signal line, said scanning line driving section makes said first switch element and said second switch element conduct to input said first signal value to the one end of said first capacitance and the one end of said second capacitance, when said second signal value is next output to said signal line, said scanning line driving section makes only said first switch element conduct to input said second signal value to the one end of said first capacitance, and then said scanning line driving section makes only said second switch element conduct to connect the one end of said first capacitance and the one end of said second capacitance to each other, whereby said signal value for display resulting from synthesis of said first signal value and said second signal value is obtained at said input point.

4. The display device according to claim 2, wherein said scanning line driving section supplies scanning pulses of a common waveform, the scanning pulses differing from each other by timing of one horizontal period, to said first scanning line and said second scanning line in each horizontal line of said pixel array.

5. The display device according to claim 2, wherein said second capacitance is formed by a parasitic capacitance of said driving transistor.

6. The display device according to claim 1, wherein the pixel circuit has a function of correcting threshold voltage of a driving transistor.

7. The display device according to claim 1, wherein the pixel circuit has a function of correcting mobility of a driving transistor.

8. The display device according to claim 1, wherein said pixel circuit includes:

a liquid crystal element;

a capacitance having one end as a point of input of said signal value for display to said liquid crystal element;

a first switch element connected between said one end of said capacitance and said signal line, and conduction-controlled by a potential of a first scanning line; and a second switch element connected between another end of said capacitance and said signal line, and conduction-controlled by a potential of a second scanning line; and when said first signal value is output to said signal line, said scanning line driving section makes said first switch element and said second switch element conduct to input said first signal value to both ends of said capacitance, and when said second signal value is output to said signal line, said scanning line driving section makes only said second switch element conduct to input said second signal value to said other end of said capacitance, whereby said signal value for display resulting from synthesis of said first signal value and said second signal value is obtained at said input point.

9. The display device according to claim 1, wherein said pixel circuit includes:

a liquid crystal element;

a first switch element having one end connected to said signal line, and conduction-controlled by a potential of a first scanning line;

a first capacitance;

a second capacitance having one end as a point of input of said signal value for display to said liquid crystal element; and a second switch element having one end and another end each connected between one end of said first capacitance and the one end of said second capacitance, the second switch element being conduction-controlled by a potential of a second scanning line; and when said first signal value is output to said signal line, said scanning line driving section makes said first switch element and said second switch element conduct to input said first signal value to the one end of said first capacitance and the one end of said second capacitance, when said second signal value is next output to said signal line, said scanning line driving section makes only said first switch element conduct to input said second signal value to one of the one end of said first capacitance and the one end of said second capacitance, and then said scanning line driving section makes only said second switch element conduct to connect the one end of said first capacitance and the one end of said second capacitance to each other, whereby said signal value for display resulting from synthesis of said first signal value and said second signal value is obtained at said input point.

10. The display device according to claim 1, wherein the display value is a potential applied to the gate electrode of a driving transistor included in the pixel circuit, the driving transistor being configured to produce a drive current for driving emission of a light emitting unit included in the pixel circuit in accordance with a voltage between the gate electrode and a current electrode of the driving transistor.

11. A display device comprising:

a pixel circuit for generating a signal value for display by synthesizing a plurality of signal values input within one horizontal period, and displaying at a gradation corresponding to the signal value for display;

a signal line disposed in a form of a column on a pixel array where the pixel array is arranged in a form of a matrix;

at least one scanning line disposed in a form of a row on the pixel array;

a signal line driving section configured to output the plurality of signal values to the signal line within one horizontal period; and a scanning line driving section configured to sequentially introduce each signal value of the plurality of signal values, which are carried on the signal line, into the pixel circuit within one horizontal period by driving the at least one scanning line, wherein the plurality of signal values includes at least a first signal value and a second signal value, the pixel circuit generates the signal value for display by synthesizing the first signal value and the second signal value input within one horizontal period, the signal value for display corresponding to a difference between the first signal value and the second signal value multiplied by a constant corresponding to a ratio between capacitances present within the pixel circuit, the pixel circuit includes:

a light emitting element;

a driving transistor for applying a current corresponding to the signal value for display, the signal value for display being input to the driving transistor, to the light emitting element;

a capacitance having a first end as a point of input of the signal value for display to a gate node of the driving transistor;

a first switch element connected between the first end of the capacitance and the signal line, and which is conduction-controlled by a potential of a first scanning line; and a second switch element connected between a second end of the capacitance and the signal line, and which is conduction-controlled by a potential of a second scanning line; and when the first signal value is output to the signal line, the scanning line driving section makes the first switch element and the second switch element conduct to input the first signal value to both the first and second ends of the capacitance, and when the second signal value is output to the signal line, the scanning line driving section makes only the second switch element conduct to input the second signal value to the second end of the capacitance, whereby the signal value for display resulting from synthesis of the first signal value and the second signal value is obtained at the point of input.

12. The display device according to claim 11, wherein said driving transistor, said first switch element, and said second switch element are formed by an n-channel thin film transistor.

13. A display method of a display device, the display device including a pixel circuit that includes at least one capacitive component and at least one switching component, at least one signal line disposed in a form of a column on a pixel array where the pixel array is arranged in a form of a matrix, at least one scanning line disposed in a form of a row on the pixel array, the at least one scanning line controlling conduction of the at least one switching component, a signal line driving section configured to output a plurality of signal potentials to the signal line, and a scanning line driving section configured to cause the at least one switching element to introduce the plurality of signal potentials carried on the signal line into the pixel circuit by driving the at least one scanning line, the display method comprising the steps of:

causing the signal line driving section to output the plurality of signal potentials to the signal line within one horizontal period, each respective value of the plurality of signal potentials being variably selected from among a plurality of potential values based on an input video signal;

causing the scanning line driving section to cause the at least one switching component to sequentially introduce each of the plurality of signal potentials output to the signal line into the capacitive component of the pixel circuit within one horizontal period in such a manner that the capacitive component synthesizes the plurality of signal potentials, thereby generating a display value, the display value corresponding to the value of one of the plurality of signal potentials plus a change amount, the change amount being proportional to a difference between respective values of at least two of the plurality of signal potentials; and causing the pixel circuit to display at a gradation corresponding to the display value, wherein the plurality of signal potentials includes at least a first signal potential and a second signal potential, values of both the first and second signal potentials being variably selected based on an input video signal, and the pixel circuit generates the display value by synthesizing the first signal potential and the second signal potential input within the one horizontal period, the display value corresponding to the value of the first signal potential plus the change amount, the change amount being proportional to a difference between the value of the first signal potential and the value of the second signal potential multiplied by a constant corresponding to a ratio between capacitances present within the pixel circuit.

14. A display device comprising:

a pixel circuit that includes:

a light emitting element, a storage capacitor, at least one switching component, and a driving transistor with a gate electrode connected to one electrode of the storage capacitor, and configured to apply, during a light emitting period, a driving current to the light emitting element, wherein a magnitude of the driving current corresponds to a voltage between the gate electrode and a current electrode of the driving transistor and the light emitting element displays at a gradation corresponding to the driving current;

a signal line that is connected to the pixel circuit and is disposed in a form of a column on a pixel array where the pixel array is arranged in a form of a matrix;

at least one scanning line that is connected to the pixel circuit and is disposed in a form of a row on the pixel array, the at least one scanning line controlling conduction of the at least one switching component;

a signal line driving section configured to output a plurality of signal potentials to the signal line within one horizontal period, each respective value of the plurality of signal potentials being variably selected from among a plurality of potential values based on an input video signal; and a scanning line driving section configured to cause the at least one switching component of the pixel circuit to sequentially introduce each of the plurality of signal potentials into the storage capacitor of the pixel circuit within one horizontal period by driving the at least one scanning line, wherein the pixel circuit is configured such that the plurality of signal potentials that are sequentially input to the storage capacitor are synthesized, thereby generating a display value on the gate electrode of the driving transistor, the display value corresponding to the value of one of the plurality of signal potentials plus a change amount, the change amount being proportional to a difference between respective values of at least two of the plurality of signal potentials, wherein the plurality of signal potentials includes at least a first signal potential and a second signal potential, values of both the first and second signal potentials being variably selected based on an input video signal, and the pixel circuit generates the display value by synthesizing the first signal potential and the second signal potential input within the one horizontal period, the display value corresponding to the value of the first signal potential plus the change amount, the change amount being proportional to a difference between the value of the first signal potential and the value of the second signal potential multiplied by a constant corresponding to a ratio between capacitances present within the pixel circuit.

15. The display device according to claim 14, wherein the pixel circuit has a function of correcting threshold voltage of the driving transistor.

16. The display device according to claim 14, wherein the pixel circuit has a function of correcting mobility of the driving transistor.

* * * * *